(12) United States Patent
Nishioka et al.

(10) Patent No.: US 7,209,295 B2
(45) Date of Patent: *Apr. 24, 2007

(54) OPTICAL SYSTEM, AND OPTICAL APPARATUS

(75) Inventors: Kimihiko Nishioka, Hachioji (JP); Eiji Yasuda, Hachioji (JP); Kentaro Sekiyama, Hachioji (JP); Tetsuo Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 10/359,593

(22) Filed: Feb. 7, 2003

(65) Prior Publication Data

US 2004/0027684 A1    Feb. 12, 2004

(30) Foreign Application Priority Data

Feb. 8, 2002    (JP) ............................. 2002-032939

(51) Int. Cl.
  *G02B 15/14* (2006.01)
(52) U.S. Cl. .................. 359/676; 359/666; 359/684; 359/694; 359/698
(58) Field of Classification Search ................ 359/676, 359/677, 683, 684, 694, 698, 665–667
See application file for complete search history.

(56) References Cited

U.S. PATENT DOCUMENTS

| 4,784,479 A | * | 11/1988 | Ikemori ...................... 359/666 |
| 5,022,745 A | * | 6/1991 | Zayhowski et al. ......... 359/847 |
| 5,124,836 A | * | 6/1992 | Kikuchi ...................... 359/422 |
| 5,212,514 A | * | 5/1993 | Goto ........................... 396/114 |
| 6,128,137 A | * | 10/2000 | Togino ....................... 359/631 |
| 6,437,925 B1 | | 8/2002 | Nishioka |
| 6,464,363 B1 | | 10/2002 | Nishioka et al. |
| 6,618,209 B2 | * | 9/2003 | Nishioka et al. ............ 359/676 |
| 6,914,729 B2 | * | 7/2005 | Mikami ....................... 359/696 |
| 6,927,920 B2 | * | 8/2005 | Nagata ........................ 359/677 |
| 2003/0147146 A1 | * | 8/2003 | Mikami ....................... 359/694 |
| 2004/0201901 A1 | * | 10/2004 | Nagata ........................ 359/676 |
| 2005/0057820 A1 | * | 3/2005 | Nishioka et al. ............ 359/689 |

FOREIGN PATENT DOCUMENTS

JP    2001-004809    1/2001

* cited by examiner

*Primary Examiner*—Scott J. Sugarman
*Assistant Examiner*—Darryl J. Collins
(74) *Attorney, Agent, or Firm*—Pillsbury Winthrop Shaw Pittman, LLP

(57) ABSTRACT

The invention relates to an optical system that has reduced power consumptions, ensures noiseless operations and fast responses, contributes to cost reductions due to simplified mechanical structure, and, albeit having a small outside diameter and small size, is capable of focusing and zooming. The optical system of the invention comprises a variable mirror and a moving optical element group. The optical element group has a zooming function, and the variable mirror has a focusing function. An optical apparatus of the invention comprises such an optical system as mentioned above.

51 Claims, 46 Drawing Sheets f is the focal length within the ZY plane fx is the focal length found from curvature in the x direction The signs of Hv, Dkv, Dok and Fbo are positive in the direction of propagation of light rays.

Trans

Cis

OPTICAL SYSTEM, AND OPTICAL APPARATUS

This application claims benefit of Japanese Application No. 2002-32939 filed in Japan on Feb. 8, 2002, the contents of which are incorporated by this reference.

BACKGROUND OF THE INVENTION

The present invention relates to optical system comprising optical elements having variable optical properties such as variable-focus lenses, variable-focus diffraction optical elements, variable deflection angle prisms and variable-focus mirrors, and an optical system including such optical elements. The present invention is also concerned with optical apparatus such as finders of cameras, digital cameras and TV cameras; viewing optical systems such as telescopes, microscopes and binoculars; spectacles; video projectors; cameras; digital cameras; TV cameras; and endoscopes.

Referring to conventional lenses formed of polished glass materials or molded lenses, their focal lengths cannot be varied because they cannot transform by themselves. For this reason, mechanical structures become complicated, which are used for a certain optical system to move lens groups along the axial direction for focusing and zooming purposes.

Since motors, etc. are used to mechanically move some of the lens groups, there are problems such as increased power consumptions, noisy sounds, slow responses, and time-consuming movement of lens groups.

SUMMARY OF THE INVENTION

In view of such problems with the prior art as mentioned above, a primary object of the present invention is to provide an optical system that has low power consumptions, ensures noiseless operations and fast responses and contributes to cost reductions due to simplified mechanical structure and, albeit having a small outside diameter and compact size, is capable of focusing and zooming. This optical system can be applied to image pickup optical systems such as cameras, digital cameras, TV cameras and cellular phones having an image pickup function, viewing optical systems such as telescopes, binoculars and microscopes, and image pickup optical systems for endoscopes, monitor cameras and compact digital cameras as well as robots' eyes, door scope cameras, car mounted cameras, etc.

The optical system and image pickup apparatus of the invention, for instance, are embodied as follows.

A zoom optical system, comprising:
an optical element having variable optical properties, and
a moving optical element group, wherein:
said moving optical element group has a zooming function, and
said optical element having variable optical properties has a focusing function.

An optical system, comprising:
an optical element having variable optical properties has a zooming or focusing function, wherein:
upon zooming or focusing, said optical element having variable optical properties moves in a given direction.

An optical system, comprising:
an optical element having variable optical properties and moving in a given direction, wherein said optical system satisfies the following condition:

$$0 < |x|/f < 1$$

where x is the variable maximum amount of movement of said optical element having variable optical properties, and f is the focal length of said optical system from which the optical element having variable properties is removed.

A zoom optical system, comprising:
an optical element having variable optical properties,
moving two optical element groups, and
an optical element group interposed between said moving optical element groups, wherein:
said optical element having variable optical properties has a focusing function or a compensator function,
said moving two optical element groups have refracting power of the same sign and move in the same amount of movement, and
the sign of the refracting power of said optical element group is opposite to the sign of the refracting power of said moving optical element groups.

A zoom optical system, comprising:
an optical element having variable optical properties, and
an optical element group having a zooming function, wherein:
said optical element having variable optical properties has a focusing function, and
said optical element having variable optical properties is located in front of said optical element group having a zooming function.

A zoom optical system, comprising:
one optical element group,
an optical element having variable optical properties, and
a moving optical element group.

An optical apparatus, comprising:
a climbing type autofocusing function,
an optical system, and
an optical element having variable optical properties, which element changes from the first state to the fourth state, wherein:
said optical element having variable optical properties changes from the second state to the third state for focusing, and
to change from the first state to the second state and from the third state to the fourth state, said optical element having variable optical properties has an amount of transformation that is only one-third of Sd determined by the following condition (370):

$$Sd = k \times P \times Fno \qquad (370)$$

where Fno is the F-number of the optical system, k is a constant between 2 and 3, and $P = \sqrt{(Px \cdot Py)}$ wherein Px is the size in μm of one pixel of an image pickup device in the x direction and Py is the size in μm of one pixel of the image pickup device in the y direction.

An optical apparatus, comprising:
an optical element having variable optical properties and driven by static electricity, wherein:
upon phototaking, the reflecting surface of said optical element having variable optical properties takes on a concave surface shape within the range of the distance of the object to be phototaken.

An optical apparatus, comprising:
an optical element having variable optical properties, and
an active type autofocusing function.

An optical system, comprising:
a mirror, and
a moving optical element group, wherein:
said moving optical element group has a zooming function, and said optical system has a climbing type autofocusing function.

Still other objects and advantages of the invention will in part be obvious and will in part be apparent from the specification.

The invention accordingly comprises the features of constructions, combinations of elements, and arrangement of parts, which will be exemplified in the construction hereinafter set forth, and the scope of the invention will be indicated in the claims.

BRIEF DESCRIPTION OF THE DRAWINGS

FIGS. 18A and 18B are tables wherein the values of the respective conditions in the respective examples are tabulated.

FIG. 47 is illustrative of what state the variable-focus lens of FIG. 46 is transformed in.

DESCRIPTION OF THE PREFERRED EMBODIMENTS

Figure 1:
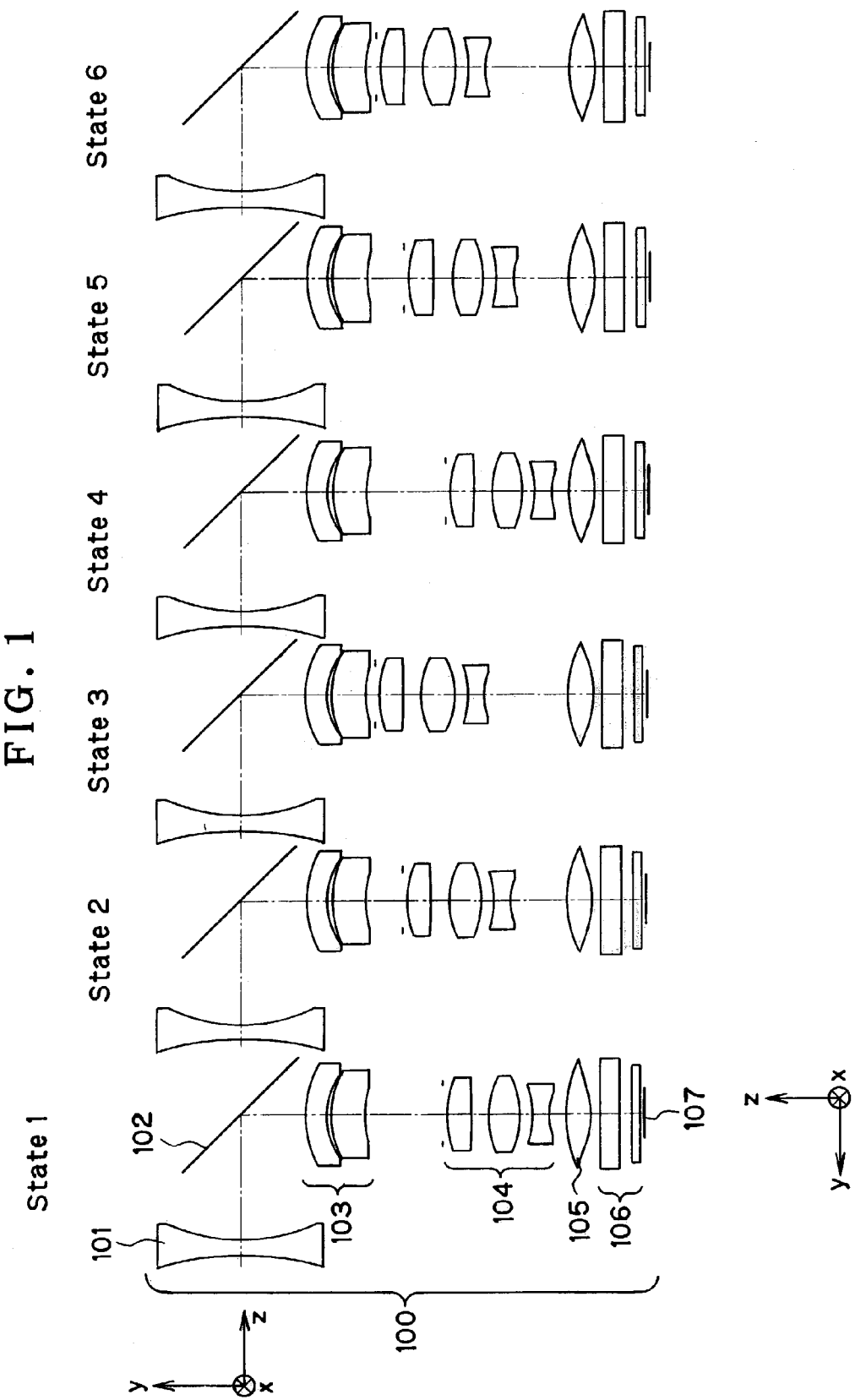
FIG. 1 is illustrative in section of Embodiment 1 of the invention.

Prior to giving an account of the embodiments of the invention, the subject matters of the invention disclosed herein are first set forth in the form of specific embodiments (1) to (49). Then, the optical elements applied to the optical system of the invention and the optical apparatus using the same are explained with reference to rotationally asymmetric surfaces. Then, the examples of the optical system and optical apparatus of the invention are given. Then, the embodiments of the optical element having variable optical properties, which may be used with the optical system and optical apparatus of the invention, are given in the form of variable optical elements.

The present invention is embodied as follows.

(1) A zoom optical system comprising a variable mirror and a moving optical element group, wherein the optical element group has a zooming function and the variable mirror has a focusing function.

(2) The zoom optical system according to (1) above, wherein the moving optical element group has negative power.

(3) An image pickup apparatus comprising a variable mirror and having a climbing type autofocusing function, wherein in addition to having the amount of transformation, QR, needed for focusing, the variable mirror has at both ends of QR the amount of transformation needed for changing focus by at least one-third of Sd determined by the following formula (370):

$$Sd = k \times P \times Fno \qquad (370)$$

where Fno is the F-number of a phototaking optical system, k is a constant (for instance, between 2 and 3), and $P = \sqrt{(Px \cdot Py)}$ wherein Px is the size in µm of one pixel of an image pickup device in the x direction and Py is the size in µm of one pixel of the image pickup device in the y direction.

(4) A zoom optical system comprising a variable mirror and a moving optical element group, wherein the optical element group has a zooming function and the variable mirror has a focusing function and a compensator function.

(5) The zoom optical system according to any one of (1) to (4) above, which comprises a first optical element group, a variable mirror or a variable-focus lens located in the rear of the first optical element group, and a zooming optical element group located in the rear thereof.

(6) The zoom optical system according to any one of (1) to (5) above, which, in order from its front, a first optical element group, a variable mirror or a variable-focus lens, a second optical element group or an air separation, a zooming optical element group, and an optical element group.

(7) An image pickup optical system comprising a variable mirror, characterized in that upon zooming or focusing, the variable mirror transforms while translating in a substantially vertical direction with respect to the reflecting surface of the variable mirror.

(8) An image pickup optical system comprising a variable mirror, characterized in that upon zooming or focusing, the variable mirror transforms while translating in a certain direction.

(9) An image pickup optical system comprising a variable mirror, characterized by satisfying the following condition:

$$0 < |x|/f < 1$$

where x is the maximum amount of translation of the variable mirror and f is the focal length of the optical system.

(10) The image pickup optical system according to (9) above, which depends on (7) or (8) above.

(11) The image pickup optical system according to any one of (1) to (10) above, wherein there is one moving lens group.

(12) A zoom optical system comprising a variable mirror, wherein:

two optical element groups before and after a certain optical element group move constantly in the same amount for zooming, said moving optical element groups have powers of the same sign, said optical element group interposed between said moving optical element groups has power of the opposite sign, and said variable mirror has a focusing function or a compensator function.

(13) The zoom optical system according to (12) above, wherein the moving two optical element groups have positive power.

(14) The zoom optical system according to (12) above, wherein the moving two optical element groups have negative power.

(15) The zoom optical system according to (12) above, which comprises, in order from the front thereof, a group having negative power, a variable mirror, a front moving group, a group interposed between moving groups, and a rear moving group.

(16) A zoom optical system comprising a variable mirror and a zooming group having a zooming function, characterized in that the variable mirror has a focusing function and is located in front of the zooming group.

(17) A zoom optical system comprising a variable mirror and a moving optical element group, characterized in that the optical element group is a zooming group having a zooming function, and the variable mirror has a focusing function and a compensator function and is located in front of the zooming group.

(18) The zoom optical system according to (16) or (17) above, which depends on any one of (7) to (15) above.

(19) The zoom optical system according to any one of (1) to (18) above, which comprises a rotationally symmetric lens and a variable mirror.

(20) The zoom optical system according to any one of (1) to (18) above, which consists of a rotationally symmetric lens and a variable mirror.

(21) The zoom optical system according to any one of (1) to (20) above, which satisfies conditions (301) to (304).

(22) The zoom optical system according to any one of (1) to (20) above, which satisfies conditions (305) to (309).

(23) The zoom optical system according to any one of (1) to (20) above, which satisfies conditions (311) to (314).

(24) The zoom optical system according to any one of (1) to (20) above, which satisfies formulae (316) to (321).

(25) The zoom optical system according to any one of (1) to (20) above, which satisfies conditions (322) to (323).

(26) The zoom optical system according to any one of (1) to (20) above, which satisfies conditions (324) to (326).

(27) The zoom optical system according to any one of (1) to (20) above, which satisfies conditions (327) to (329).

(28) The zoom optical system according to any one of (1) to (20) above, which satisfies conditions (330) to (333).

(29) The zoom optical system according to any one of (1) to (20) above, which satisfies conditions (335) to (336).

(30) The zoom optical system according to any one of (1) to (20) above, which satisfies conditions (340) to (347).

(31) The zoom optical system according to any one of (1) to (20) above, which satisfies at least two of conditions (301) to (347).

(32) The zoom optical system according to any one of (1) to (20) above, which satisfies at least one of conditions (340) to (347) and at least one of conditions (301) to (336).

(33) The zoom optical system according to any one of (1) to (29) above, characterized in that an aperture stop is located in the rear of the variable mirror.

(34) The zoom optical system according to any one of (1) to (16), wherein the moving optical element group has positive power.

(34') The zoom optical system according to any one of (1) to (16), wherein the moving optical element group has negative power.

(35) An image pickup apparatus comprising a variable mirror driven by static electricity, characterized in that upon phototaking, the variable mirror takes on a concave surface shape within the range of the distance of the object to be phototaken.

(36) The image pickup apparatus according to (35) above, which has a climbing type autofocusing function wherein the high frequency component of the phototaken object image is detected while changing focus with respect to the object, so that the high frequency component reaching a maximum is determined as attaining focus.

(37) The image pickup apparatus according to (36) above, which includes a state such that when the focus with respect to the object is changed upon autofocusing, the variable mirror turns to a planar shape.

(38) An image pickup apparatus comprising a variable mirror and having a climbing type autofocusing function, wherein in addition to having the amount of transformation, QR, needed for focusing, the variable mirror has at both ends of QR the amount of transformation needed for changing focus by at least Sd determined by condition (370).

(39) An image pickup apparatus comprising a variable mirror and having a climbing type autofocusing function, wherein in addition to having the amount of transformation, QR, needed for focusing and as a compensator, the variable mirror has at both ends of QR the amount of transformation needed for changing focus by at least Sd determined by condition (370).

(40) An image pickup apparatus comprising a variable mirror and having a climbing type autofocusing function, wherein in addition to having the amount of transformation, QR, needed for focusing and as a compensator, the variable mirror has at both ends of QR the amount of transformation needed for changing focus by at least one-third of Sd determined by condition (370).

(41) The image pickup apparatus according to any one of (3) and (38) to (40) above, characterized by having a feature as recited in (35) above.

(42) An image pickup apparatus comprising a variable mirror, wherein an active type autofocusing is performed.

(43) An electronic image pickup apparatus comprising a variable mirror and an image pickup device, wherein an active type autofocusing is performed.

(44) The image pickup apparatus according to any one of (35) to (43) above, which comprises an optical system as recited in any one of (1) to (34') above.

(45) An image pickup apparatus, which meets condition (102).

(46) The image pickup apparatus according to any one of (1) to (34') above, characterized by comprising an image pickup device, wherein an optical element located nearest to an object and the image pickup device are fixed in place.

(47) The image pickup apparatus according to (44) above, characterized by comprising an image pickup device, wherein an optical element located nearest to an object and the image pickup device are fixed in place.

(48) The optical system or image pickup apparatus according to any one of (1) to (47) above, characterized in that an ordinary mirror is used in place of the variable mirror.

(49) The optical system or image pickup apparatus according to any one of (1) to (47) above, characterized in that a variable-focus lens is used in place of the variable mirror.

Rotationally Asymmetric Surface

The variable-shape mirror is one of optical elements having variable optical properties, in which the surface shape can freely turn to a convex shape, a planar shape or a concave shape to thereby freely change optical power or aberrations, so that even when there is a change in the distance from the image pickup system to the object, only the transformation of the mirror is needed for focusing. In this case, the mirror may take the form of a rotationally symmetric curved surface; to make better correction for aberrations, however, it is desired that the mirror take the form of a rotationally asymmetric surface or a free-form surface.

The detailed reasons are given below. First, an account is given of the coordinate system and rotationally asymmetric surface used. Here let the Z-axis be given by an optical axis defined by a straight line indicative of an axial chief ray arriving at the first surface of the optical system. Then let the Y-axis be defined by an axis that is orthogonal with respect to the Z-axis and lies within the decentered surface of each of the surfaces forming a decentration optical system. Then let the X-axis be defined by an axis that is orthogonal with respect to the Y-axis. Light rays are traced forwardly from the object toward the image plane. It is noted that the term "decentration" means one or both of displacement (shift) and tilt.

In general, a spherical lens system composed only of spherical lenses is designed such that aberrations produced at spherical surfaces, for instance, spherical aberrations, coma and field curvature are mutually corrected at some surfaces to reduce the aberrations as a whole.

To make satisfactory correction for aberrations with a reduced number of surfaces, on the other hand, rotationally symmetric aspheric surfaces are used. This is to reduce various aberrations produced at spherical surfaces.

In decentered optical systems, however, it is impossible to correct rotationally asymmetric aberrations due to decentration with a rotationally symmetric optical system. Among the rotationally asymmetric aberrations produced by decentration there are distortion and field curvature as well as astigmatism and coma that are produced even on the optical axis.

Figure 14:
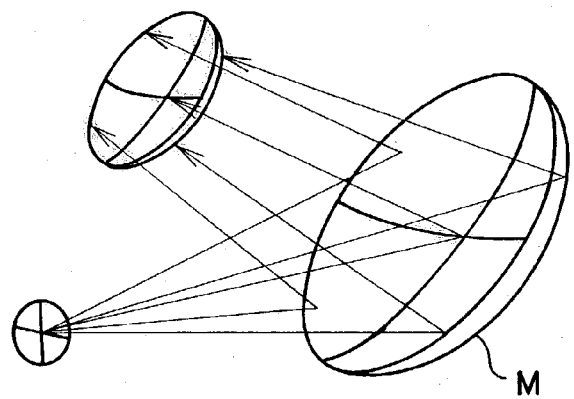
FIG. 14 is illustrative of rotationally asymmetric field curvature.

First, the rotationally asymmetric field curvature is explained. For instance, consider light rays incident from an object point at infinity on a decentered concave mirror. The light rays are reflected at the concave mirror to form an image. When the image plane side is air, however, the rear focal length of a part from the concave surface to the image plane becomes half the radius of curvature of the concave mirror portion the light rays strike, whereupon the image plane is tilted with respect to an axial chief ray, as shown in FIG. 14. It is thus impossible to make correction for rotationally asymmetric field curvature with a rotationally symmetric optical system.

To correct the tilting field curvature with the concave mirror M itself, which is the source of producing that field curvature, the concave mirror M must be made up of a rotationally asymmetric surface in such a way as to have a strong curvature (strong refracting power) in the Y-axis positive direction and a weak curvature (weak refracting power) in the Y-axis negative direction. By locating another rotationally asymmetric surface having the same effect as the aforesaid arrangement in the optical system, it is also possible to achieve a flat image plane with a reduced number of surfaces.

In view of correction of aberrations, the rotationally asymmetric surface should preferably be defined by a surface of rotationally asymmetric shape having no axis of rotational symmetry both within and without that surface, because the degree of freedom is increased.

Figure 15:
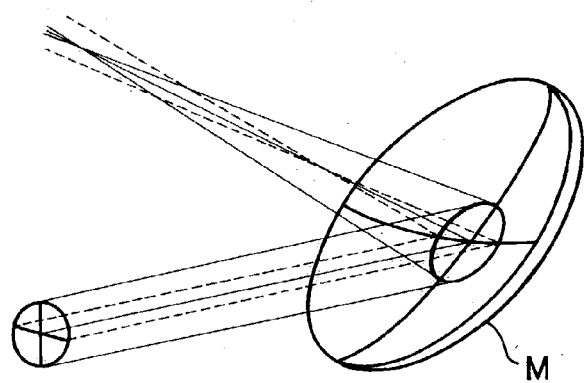
FIG. 15 is illustrative of rotationally asymmetric astigmatism.

Next, the rotationally asymmetric astigmatism is explained. As in the foregoing explanation, such astigmatism as shown in FIG. 15 is produced at a decentered concave mirror M even with respect to an axial chief ray. This astigmatism can be corrected by making the curvatures of a rotationally asymmetric surface in the X- and Y-axis directions properly different from each other, as in the foregoing case.

Figure 16:
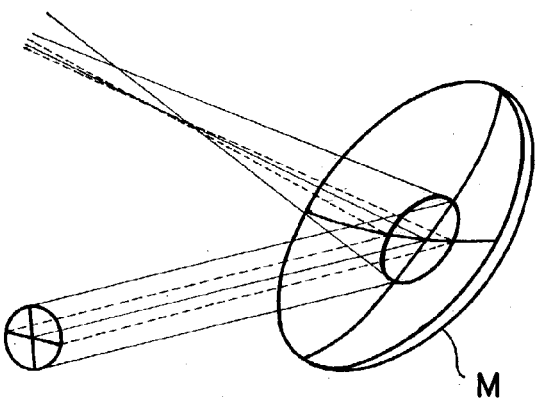
FIG. 16 is illustrative of rotationally asymmetric coma.

Next, the rotationally asymmetric coma is explained. As in the foregoing explanation, such coma as shown in FIG. 16 is produced at a decentered concave mirror M even with respect to an axial chief ray. This coma can be corrected by varying the tilt of a rotationally asymmetric surface off and off the origin of the X-axis thereof and properly varying the tilt of the surface depending on the positive or negative of the Y-axis.

The decentration optical system of the invention may also be constructed using at least one surface having the aforesaid reflecting action while decentered with respect to an axial chief ray so that the reflecting surface is allowed to have a rotationally asymmetric surface shape and power. With such an arrangement, decentration aberrations produced due to the power imparted to the reflecting surface can be corrected at that surface itself, and the occurrence of chromatic aberration itself can be reduced by slacking the power of the refracting surfaces of a prism.

It is then desired for correction of decentration aberrations that the variable-shape mirror that is one of the reflecting surfaces forming the decentration optical system of the invention be composed of a rotationally asymmetric surface.

According to the invention as explained above, it is possible to provide an optical apparatus or the like, in which zooming or focusing is simply performed by transformation of the surface shape of the variable mirror without driving lens groups to and fro.

It is here noted that the free-form surface used herein is defined by the following formula (a). The Z-axis of this defining formula provides the axis of the free-form surface.

$$Z = cr^2/[1+\sqrt{\{1-(1+k)c^2r^2\}}] + \Sigma_{(j=2-N)} C_j X^m Y^n \quad (a)$$

Here the first term of formula (a) is a spherical term and the second term is a free-form surface term.
In the spherical term:
c is the curvature of the apex,
k is the conic or conical coefficient,
$r = \sqrt{(X^2+Y^2)}$, and
N is a natural number of 2 or greater.
The free-form surface term is $$\sum_{(j=2-N)} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 + C_{20} XY^4 + C_{21} Y^5 +$$
$$C_{22} X^6 + C_{23} X^5 Y + C_{24} X^4 Y^2 + C_{25} X^3 Y^3 C_{26} X^2 Y^4 C_{27} XY^5 + C_{28} Y^6 +$$
$$C_{29} X^7 + C_{30} X^6 Y + C_{31} X^5 Y^2 + C_{32} X^4 Y^3 + C_{33} X^3 Y^4 + C_{34} X^2 Y^5 +$$
$$C_{35} XY^6 + C_{36} Y^7 + \cdots$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. Likewise, by reducing all the odd-numbered terms for Y to zero, the free-form surface can have only one symmetric surface parallel with the X-Z plane.

Among other free-form surface defining formulae, there is Zernike polynomial given by the following formula (b). The shape of this surface is defined by the following formula. The axis for Zernike polynomial is given by the Z-axis of the defining formula (b). The rotationally asymmetric surface is defined by polar coordinates for the height of the Z-axis with respect to the X-Y plane provided that R is the distance from the Z-axis within the X-Y plane and A is the azimuth angle around the Z axis, as expressed by the angle of rotation measured from the X-axis.

$$x = R \times \cos(A)$$

$$y = R \times \sin(A)$$

$$Z = D_2 + D_3 R \cos(A) + D_4 R \sin(A) + D_5 R^2 \cos(2A) + D_6(R^2 - 1) + \quad (b)$$
$$D_7 R^2 \sin(2A) + D_8 R^3 \cos(3A) + D_9(3R^3 - 2R)\cos(A) +$$
$$D_{10}(3R^3 - 2R)\sin(A) + D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$

-continued $$D_{20}(10R^5 - 12R^3 + 3R)\sin(A) + D_{21}(5R^5 - 4R^3)\sin(3A) +$$
$$D_{22}R^5\sin(5A) + D_{23}R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29}R^6\sin(6A) + \cdots$$

Here $D_m$ (m is an integer of 2 or greater) is a coefficient. It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . are used.

The aforesaid defining formulae are given for the purpose of illustrating surfaces of rotationally asymmetric curved shape, and so it is understood that the same effects are obtainable even with any other defining formula. So long as mathematically equivalent values are obtained, the free-form surface may be expressed by other definitions.

In the invention, by reducing all the odd-numbered terms for x in formula (a) to zero, a free-form surface having a symmetric plane parallel with the y-z plane is obtained.

For the decentrated surface, the amount of decentration of the apex position of that surface from a reference surface in an optical system (X, Y and Z in the X-, Y- and Z-axis directions, respectively) and the center axis of that surface (for the free-form surface, the angle of tilt around the Z-axis of the aforesaid formula (a) ($\alpha$, $\beta$, $\gamma$ (°)) are given.

Referring to the order of decentration, decentrations are performed in the X, Y and Z directions, respectively, and the coordinate system is then rotated in the order of $\alpha$, $\beta$ and $\gamma$. This coordinate system provides local coordinates for the mirror surface. Thereafter, to define a coordinate system for reflected light rays, the coordinate system is rotated in the order of $\alpha$, $\beta$ and $\gamma$ to give a defining coordinate system.

When only the tilt of the reflecting surface is indicated, too, the angle of tilt of the center axis of that surface is given as the amount of decentration.

Aspheric surface shape is given by the following formula (c):

$$z = (y^2/r)/[1+\{1-(1+k)\cdot(y/r)^2\}^{1/2}] + ay^4 + by^6 + cy^8 + dy^{10} \quad (c)$$

where z is the direction of the optical axis, y is a direction orthogonal with respect to the optical axis, k is a conical coefficient, and a, b, c and d are aspheric coefficients.

It is noted that the explanations regarding the aforesaid numerical data are common to the numerical data on the examples of the invention.

EMBODIMENTS

Figure 8:
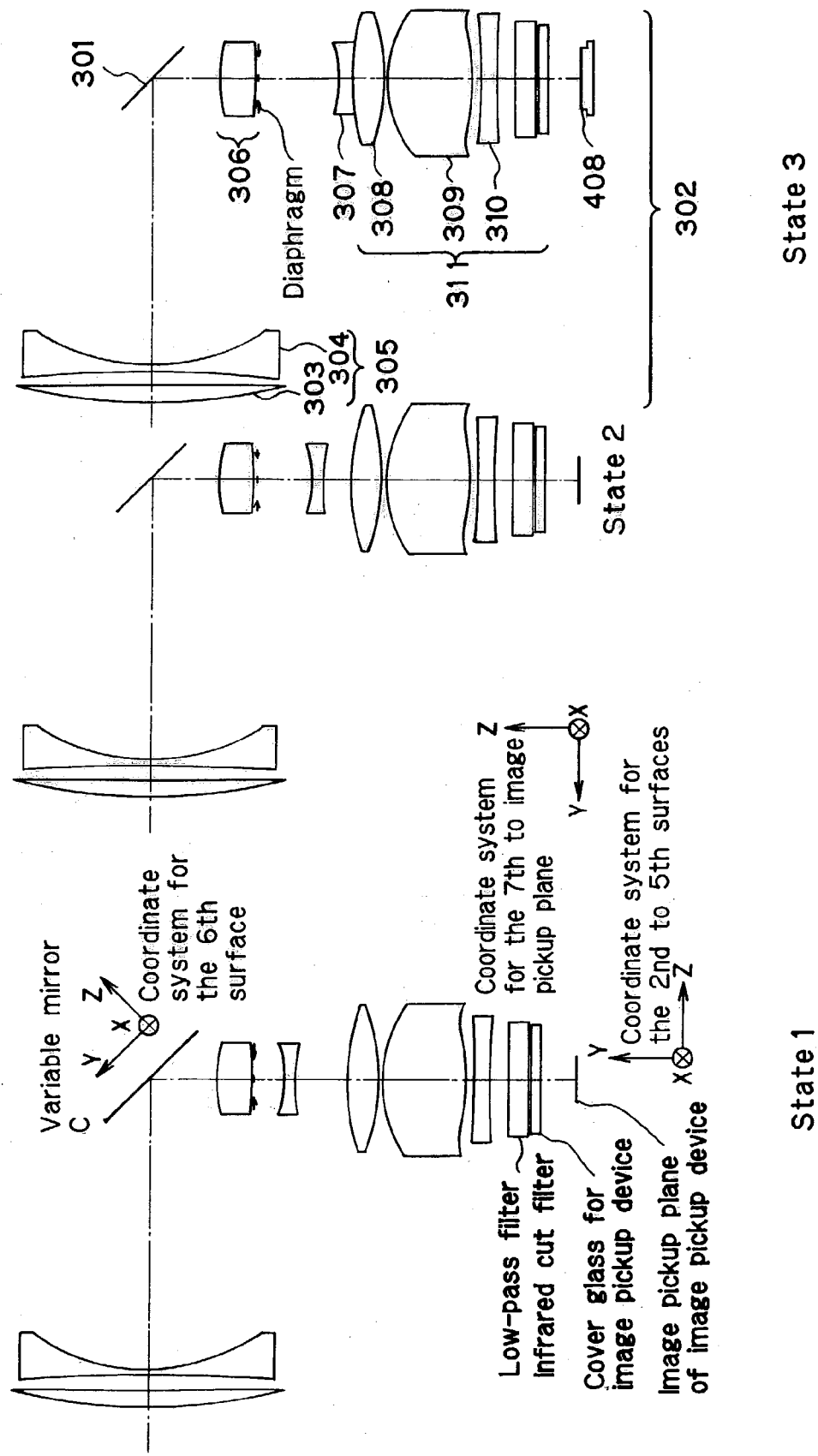
FIG. 8 is illustrative in section of Embodiment 8 of the invention.

FIG. 8 shows one embodiment of the invention (corresponding to Embodiment 8 given later), that is, a 1.8:1 power zoom optical system 302 comprising a variable mirror 301 as an optical element having variable optical properties. This zoom optical system is used with electronic image pickup systems such as digital cameras and TV cameras.

The zoom optical system is made up of a first lens group 305 consisting of a convex lens 303 and a concave lens 304, a variable mirror 301 located in the rear thereof, a lens group 306 having convex power, a variator (zooming group) 307 having concave power and a fourth lens group 311 consisting of convex lenses 308 and 309 and a concave lens 310.

The variator 307 translates on a straight line toward the Z-axis for zooming. Although this causes focus movement, that focus movement is compensated for by transformation of the variable mirror 301. That is, the variable mirror 301 has a compensator function. When there is a change in the object distance, the variable mirror 301 is transformed to form an image on 408. In other words, the movement of the lenses is not always required for focusing. Thus, the variable mirror 301 has two functions, a compensator function and a focusing function.

A merit of performing zooming with a concave lens is that the same zoom ratio is achievable in a more reduced amount of movement as compared with the case where zooming is performed with a convex lens. To attain a zoom optical system of higher performance, it is desired to satisfy at least one of the following conditions at least in a certain zooming state.

For reducing the length of the optical system, it is preferable to comply with:

$$0.3 < |\beta v| < 6 \quad (301)$$

where $\beta v$ is the magnification of the variator (the moving optical element group). This is because the object-to-image distance Io of the lens system becomes shortest when the magnification is −1 as can be seen from condition (306). In other words, the optical system should preferably include a zooming state where the absolute value of the magnification of the variator becomes 1. If $$0.5 < |\beta v| < 4.0 \quad (302)$$

it is then possible to achieve a zoom optical system of smaller size. If $$0.6 < |\beta v| < 2.5 \quad (303)$$

it is then possible to achieve a zoom optical system of much smaller size. Especially when the variator has concave power, it is preferable to satisfy $$0.7 < |\beta v| < 3.0 \quad (304)$$

because much more size reductions are attainable.

Let $\beta vw$ be the magnification of the variator at the wide-angle end and $\beta vT$ be the magnification of the variator at the telephoto end. Then, it is preferable to satisfy the following condition (305):

$$\beta vw \cdot \beta vT < 5 \quad (305)$$

This is because when the same zoom ratio is achieved, the object-to-image distance Io of the variator becomes shortest at $\beta vw \cdot \beta vT = 1$. The object-to-image distance Io is given by $$Io = fv(-\beta v - 1/\beta v + 2) \quad (306)$$

where fv is the focal length of the variator. Thus, the aforesaid conclusion is obtained.

For much more size reductions, it is preferable to satisfy the following condition (307):

$$0.3 < \beta vw \cdot \beta vT < 3 \quad (307)$$

where $\beta v$ is the magnification of the variator. It is also possible to keep aberrations in good condition because the amount of transformation of the variable mirror as the compensator becomes small in the neighborhood of $\beta v = -1$.

More preferably, $$0.5 < \beta vw \cdot \beta vT < 2 \quad (308)$$

When the variator has positive power, it is preferable to comply with $$0.8 < \beta vw \cdot \beta vT < 1.6 \qquad (309)$$

This is because a zoom lens of by far smaller size is achievable. Aberrations, too, are kept in good condition for the same reasons as explained in conjunction with conditions (307) and (308).

For the focal length fv of the variator, it is desired to comply with the following condition (311), where f is the focal length of the optical system 302. It is noted that f varies depending on the azimuth angle when the variable mirror turns to a free-form surface shape. In the invention, however, f is defined by a focal length calculated on the basis of a paraxial light ray in the Y-Z plane. As for the calculation of f, the power of the variable mirror is factored out. In other words, the power of the variable mirror is 0.

$$-3 < fv/f < 15 \qquad (311)$$

As the lower limit of −3 to fv/f is not reached, the zooming efficiency by concave power decreases and so the effect of the zoom lens becomes slender. As the upper limit of 15 to fv/f is exceeded, Io is longer than defined by condition (306) and so the overall lens length becomes unacceptably long.

More preferably for further lens size reductions, $$-2 < fv/f < 5 \qquad (312)$$

From condition (306), it is noted that the smaller |fv|, the more reduced the amount of transformation of the variable mirror as the compenstor is, and this is favorable for aberrations.

If $$0.5 < fv/f < 5 \qquad (313)$$

then the power of the variator becomes positive, so that the height of a chief ray upon zooming to the wide-angle end can favorably be lowered.

If $$-3 < fv/f < -0.2 \qquad (314)$$

then the power of the variator becomes negative, so that the magnification of the variator can favorably be largely varied in a reduced amount of lens movement.

For the focal length f1 of the first lens group, it is desired to meet the following condition (316):

$$f1/f < 0 \qquad (316)$$

This is favorable for setting up a wide-angle lens of the retrofocus type where concave power is given to the first lens group. The lower limit to the following condition (318) is needed for preventing the absolute value of the magnification β4 of the fourth lens group from becoming excessively small. This is because when the power of the variable mirror is negligibly small, $$f = f1 \cdot \beta 2 \cdot \beta v \cdot \beta 4 \qquad (317)$$

However, if |β2|≈1 and |βv|≈1, then f1 and β4 have an inverse proportion relation at a fixed f value. Here β2 is the magnification of an optical system sandwiched between the variable mirror and the variator. If that optical system is formed of an air separation, then β2=1. If $$-20 < f1/f < -0.2 \qquad (318)$$

|β4| becomes so small that aberrations produced at the lens system located in front of the fourth group can favorably be reduced. Exceeding the upper limit of −0.2 to f1/f in condition (318) is not preferably because the Petzval sum becomes excessively negative, ending up with the occurrence of field curvature. More preferably for aberrations, $$-12 < f1/f < -0.6 \qquad (319)$$

When the variator has convex power, it is more preferable for wide-angle arrangement and aberrations to satisfy the following condition (320):

$$-5 < f1/f < -0.6 \qquad (320)$$

When the variator has concave power, it is more preferable to comply with the following condition (321):

$$-20 < f1/f21 - 1 \qquad (321)$$

This is favorable for further lens size reductions because the height of light rays at the first group is lowered.

An optical system located in the rear of the variator and as far as an image plane is here called the fourth group. It is then preferable to comply with:

$$0.1 < |\beta 4| < 1.3 \qquad (322)$$

where β4 is the magnification of the fourth group. As |β4| falls below the lower limit, aberrations produced at the fourth group increase. Exceeding the upper limit to |β4| causes |f1| to become smaller than defined by condition (317) and the Petzval sum to become excessively negative. More preferably for aberrations, $$0.2 < |\beta 4| < 0.9 \qquad (323)$$

Here let Hv be the front focal position of an optical system defined by a combination of the variator with the second group. Regarding the sign of that position, the direction of propagation of light rays is taken as positive, and the origin thereof is defined by the apex of the foremost surface of the second group. The second group used herein refers to an optical system interposed between the variable mirror and the variator, for which an air separation may be used. It is then preferable to comply with the following condition (324):

$$-0.2 < -Hv/fv \qquad (324)$$

This is because the variator cannot be brought close to the first group for the reason that there must be a space for locating the variable mirror in front of the variator; in other words, this is to prevent the zooming range of the variator from being restricted. More preferably, $$-0.07 < -Hv/fv < 30 \qquad (325)$$

When the variator has convex power, it is preferable for aberrations to comply with the following condition (326)):

$$0 < -Hv/fv < 2 \qquad (326)$$

This is because the variator does not take the form of a strong telephoto type.

Here let Dkv be the length from the variable mirror to the variator as calculated on an air basis provided that the direction of propagation of light rays is taken as positive. When the variator has convex power, it is desired to satisfy the following condition (327):

$$0 \leq |(Dkv + Hv)/fv| < 3 \qquad (327)$$

Dkv+Hv is an amount indicative of to what degree the principal point position of the optical system composed of the variator + the second group is displaced from the variable mirror. The smaller that displacement, the smaller the amount of transformation of the variable mirror is and so the more reduced aberrations is. More preferably, $$0 \leq |(Dkv+Hv)/fv| < 2 \quad (328)$$

When the variator has concave power, it is preferable to comply with the following condition (329):

$$|(Dkv+Hv)/fv| < 500 \quad (329)$$

Exceeding the upper limit to the value of |(Dkv+Hv)/fv| makes correction of aberrations difficult.

Here let DoK be the distance from the final surface of the first group to the variable mirror and Fbo be the rear focal position of the first group as measured from the final surface of the first group provided that the direction of propagation of light rays is taken as positive. When the variator has positive power, it is preferable to satisfy the following condition (330):

$$0 < (Dok-Fbo)/fv < 5 \quad (330)$$

Dok−Fbo gives the distance of an image of the first group as viewed from the variable mirror. Since the magnification of the variator is in the neighborhood of −1, when the principal point of the variabor is in the neighborhood of the variable mirror, it becomes $$(Dok-Fbo)/fv \approx 2$$

At this time, the amount of transformation of the variable mirror can become smallest and so aberrations are reduced. Thus, any deviation from condition (330) gives rise to increased aberrations. More preferably, $$0.3 < (Dok-Fbo)/fv < 3.5 \quad (331)$$

When the variator has concave power, it is preferable to comply with:

$$-60 < (Dok-Fbo)/fv < -3 \quad (332)$$

This is because the object point with respect to the optical system in the rear of the first lens group is located at a sufficiently far position, so that aberrations can be reduced. Falling below the lower limit to (Dok−Fbo)/fv in condition (332) is not preferable because the first group projects largely, resulting in an increase in the size of the lens system and making a wide-angle arrangement difficult. Exceeding the upper limit causes the object point with respect to the optical system following the first group to be located at a near distance, resulting in increased aberrations. More preferably, $$-30 < (Dok-Fbo)/fv < -5 \quad (333)$$

When the fourth group is a fixed group, it is preferable to provide an aspheric surface therein. This is because the tilt of field curvature that occurs in the case of a nearby object (the bending of the image plane in the opposite direction to the direction of propagation of light rays) can be reduced.

The angle of incidence, $\Phi$, of an axial light ray on the variable mirror should be in the range defined by the following condition (335):

$$39° < \Phi < 55° \quad (335)$$

This is favorable for designing, mechanically fabricating, machining, and assembling a cuboidal body for TV cameras, digital cameras, etc. More preferably, $$40° < \Phi < 50° \quad (336)$$

It is noted that a variable-focus lens may be used in place of the variable mirror. The aforesaid conditions, for the most part, are based on paraxial theories, and so hold true for the variable-focus lens.

Commonly to the optical systems disclosed herein, an aperture stop should preferably be located in the rear of the variable mirror for the reason that when the aperture stop is located in front of the variable mirror, the distance from the stop to the group in the rear of the variable mirror becomes too long, and so the height of a chief ray becomes too large at the group in the rear of the stop, making correction of off-axis aberrations difficult.

Figure 17:
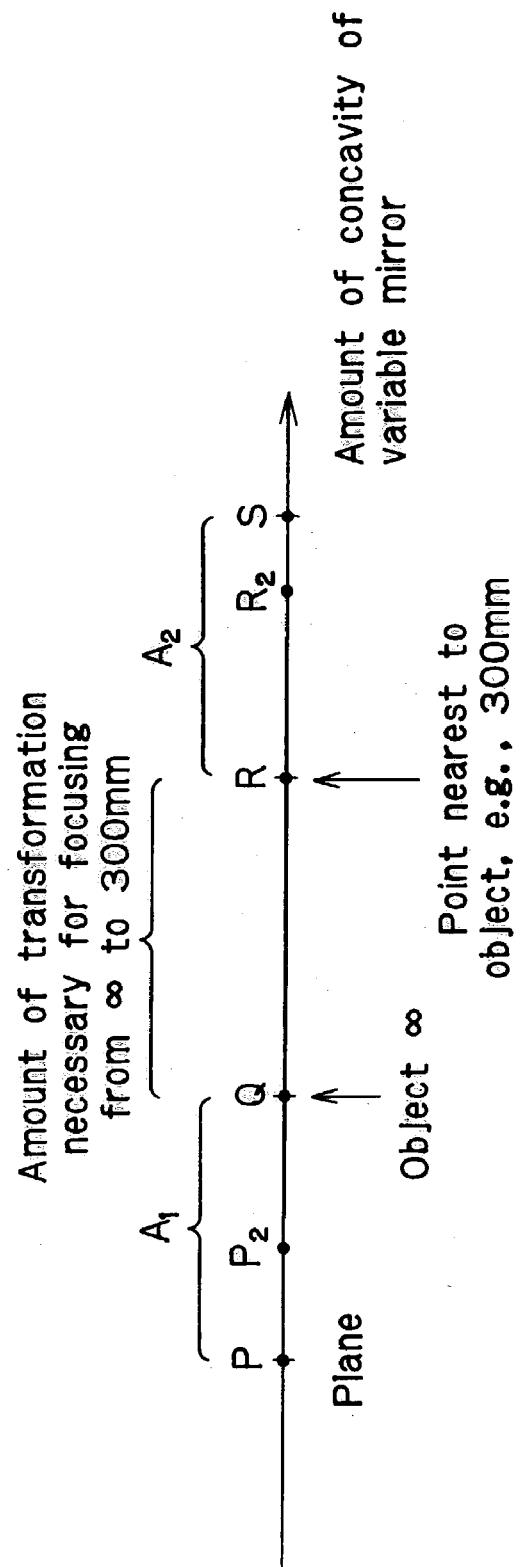
FIG. 17 is illustrative of the amount of transformation of a variable mirror and how an image pickup system operates.

FIG. 17 is illustrative of the amount of transformation (depression) of the variable mirror and how the image pickup system operates. The optical system of the image pickup apparatus may be made up of either a zoom optical system or a single-focus optical system. Upon phototaking, the shape of the variable mirror is in the second state Q to third state R shown in FIG. 17. Upon auto-focusing prior to phototaking, the shape of the variable mirror is in the first state P2 to fourth state R2. P-P2 and R2-S are margins for absorption of variations on fabrication; P2 may match with P and R2 may match with S.

The amount of a change in depression from P2 to Q and from R to R2 should preferably be larger than the amount of depression necessary to change focus by the focal depth Sd of the image pickup system, given by the following condition (370):

$$Sd = k \times P \times Fno \quad (370)$$

where Fno is the F-number of the phototaking optical system, k is a constant (for instance, between 2 and 3), and P=√(Px·Py) wherein Px is the size in μm of one pixel of an image pickup device in the x direction and Py is the size in μm of one pixel of the image pickup device in the y direction. This is because an object image blurred to a certain extent is preferable for detecting focus position by auto-focusing.

To enhance autofocusing precision, the amount of depression from P2 to Q and from R to R2 should be larger than the amount corresponding to a focus change that is preferably at least twice, and more preferably at least four times, as large as Sd.

It is here noted that when it is impossible to ensure a large amount of transformation of the variable mirror, the amount of depression from P2 to Q and from R to R2 should preferably be about one-third of Sd. This is because auto-focusing is feasible for most subjects except subjects of low contrast.

Although the foregoing discussions have been based on the concave transformation of the variable mirror, it is understood that condition 370 and the conditions for changes in the amounts of transformation P2Q and RR2 hold true for convex transformation and concave transformation of the variable mirror inclusive of the following discussions.

In the case of an image pickup apparatus comprising a zoom optical system, QR may include the amount of transformation of the variable mirror as the compensator in association with zooming. It is understood that when the variable mirror has no compensator function, QR should include the amount of transformation commensurate with focusing alone.

For the active autofocusing mode wherein infrared light or the like is projected onto a subject to find distance from the intensity of the reflected light, the transformation of the variable mirror corresponding to P2Q and RR2 is unnecessary. This is favorable because the amount of transformation of the variable mirror becomes small and so the aberrations of the image pickup optical system are reduced.

It is understood that either the climbing autofocusing mode or the active autofocusing mode may be applied to the optical system of the invention. For the invention, however, both the autofocusing modes may be used in combination. It is noted that not only auto-focusing but also manual focusing may be applied to the optical apparatus of the invention.

In Embodiment 4 given later, the aforesaid contrast autofocusing mode is used provided that k=2 and P=2.5 µm. In FIG. 17 assuming that the variable mirror is used as the optical element having variable optical properties, the variable amount is indicated as abscissa. However, for other optical elements having variable optical properties such as liquid crystal lenses, a parameter fit for each optical element should be indicated as abscissa.

The invention for autofocusing as explained with reference to FIG. 17 and condition (370), etc. may be applied just only to the variable mirror having variable shape but also to optical apparatus using the optical elements having variable optical properties, e.g., invariable-shape variable-focus mirrors and variable-focus lenses.

That is, it is acceptable to replace the abscissa of FIG. 17 by the focal length of the optical element having variable optical properties. In this case, Q is corresponding to the focal length of the optical element having variable optical properties at the time an object is at infinity, R is corresponding to the focal length of the optical element having variable optical properties at the time the object distance is nearest, P2Q is corresponding to a margin on a far point side for a change in the focal length of the optical element having variable optical properties for focusing, RR2 is corresponding to a margin on a near point side for a change in the focal length of the optical element having variable optical properties for focusing, PP2 is a margin for a change in the focal length of the optical element having variable optical properties for absorption of variations of errors on fabrication, and R2S is a margin for a change in the focal length of the optical element having variable optical properties for absorption of variations of errors on fabrication.

In this case, too, the change in the focal lengths P2Q and RR2 should preferably be larger than the change in the forcal length of the optical element having variable optical properties, which is used to change focus by Sd determined by condition (370), one-third of Sd or twice as large as Sd. On the assumption of the aforesaid considerations, the foregoing discussions may also be applied to optical apparatus using ordinary optical elements having variable optical properties.

Commonly to the invention, the focal length of the whole optical system is represented by f. This focal length f is calculated while the variable mirror is taken as a plane irrespective of whether it is in a concave state or a convex state; that is, f is the focal length of the system from which the variable mirror is removed.

In the invention, it is desired that the variable mirror be located in front of the lens group contributing primarily to zooming. This is because when the variable mirror has a focusing function, the power of the variable mirror changes with changing object distance; that is, if the zooming group is located in the rear of the variable mirror, focusing can then be performed while, irrespective of the magnification of the zooming group, the power of the variable mirror is changed depending on the object distance. Thus, the idea behind optical design and variable mirror control can be so simplified that the image pickup system can easily be designed. This merit goes true for the case where the variable mirror has or has not a compensator function.

Embodiments 1–13 are now given below. It is here noted that the lenses and image pickup device except the variator are fixed to a lens barrel or the like. In some embodiments the variable mirror is fixed at its center while, in some embodiments, the variable mirror is fixed at its periphery.

In what follows, specific embodiments of the inventive image pickup apparatus will be explained with reference to the accompanying drawings.

Embodiments 1 to 13 are shown in section in FIGS. 1 to 13.

In the lens data about Embodiments 1 to 13, "ASP", "FFS", "DM", and "OB" are an aspheric surface, a free-form surface, a variable-shape mirror and an object distance, respectively. The refractive index and Abbe number are given on a d-line (587.56 nm) basis, and the length is given in mm. The variable spaces Di (i=1, 2, . . . ) are indicated in Embodiments 1–8 and 13 by values found at the wide-angle end, in the standard state and at the telephoto end, respectively, and in Embodiments 9–12 by values found at the telephoto end, in the standard state and at the wide-angle end, respectively. So long as the zooming state is indicated in the same term ("wide-angle", "standard" and "telephoto", the spaces Di have the same value even at different object distances. In each embodiment, two plane-parallel plates are inserted nearest to the image side; however, cover glasses for the image pickup device, IR cut filters and low-pass filters are actually inserted.

The terms with respect to the free-form surfaces, aspheric surfaces, etc., on which no data are given, are zero.

Figure 18A:
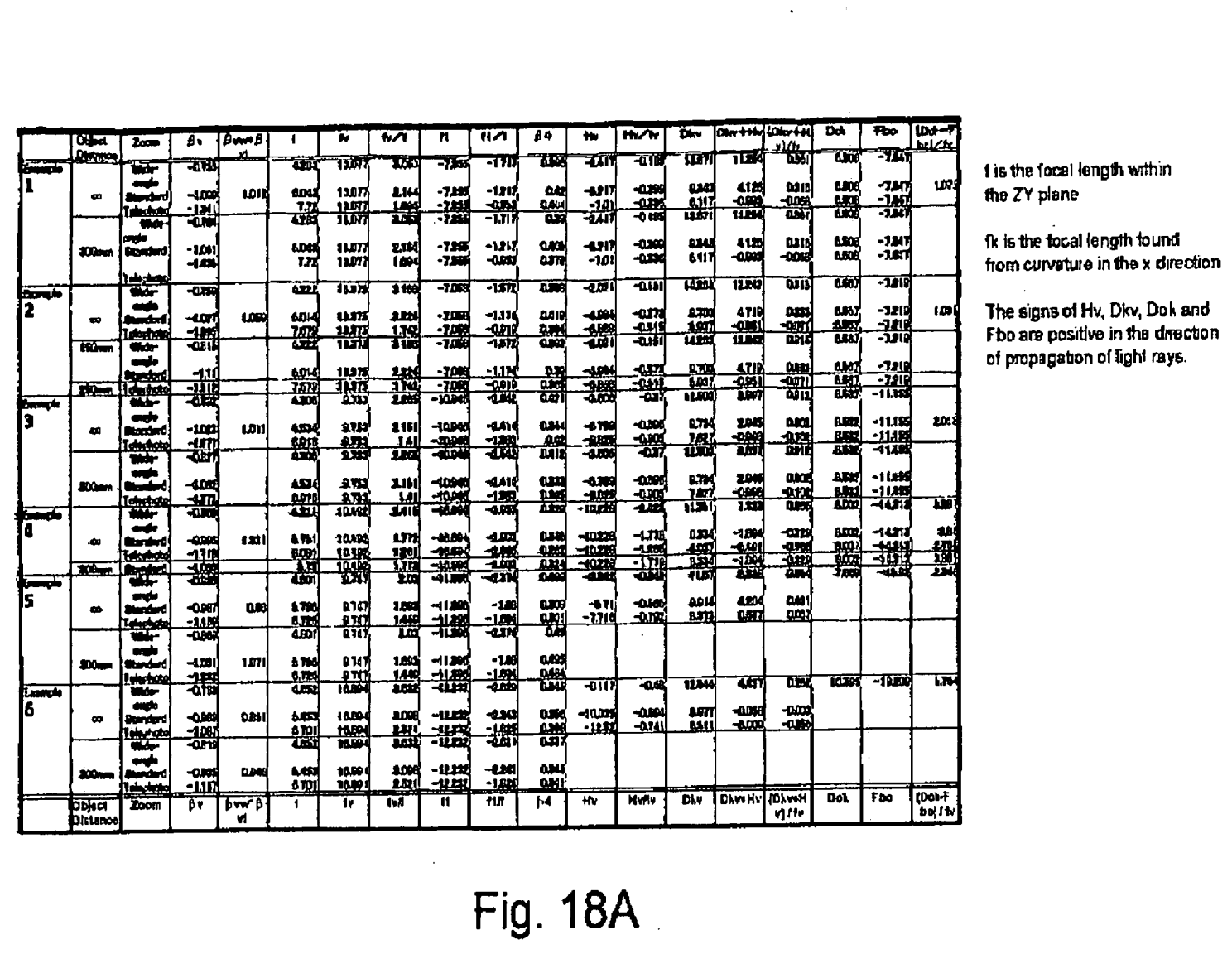
Figure 18B:
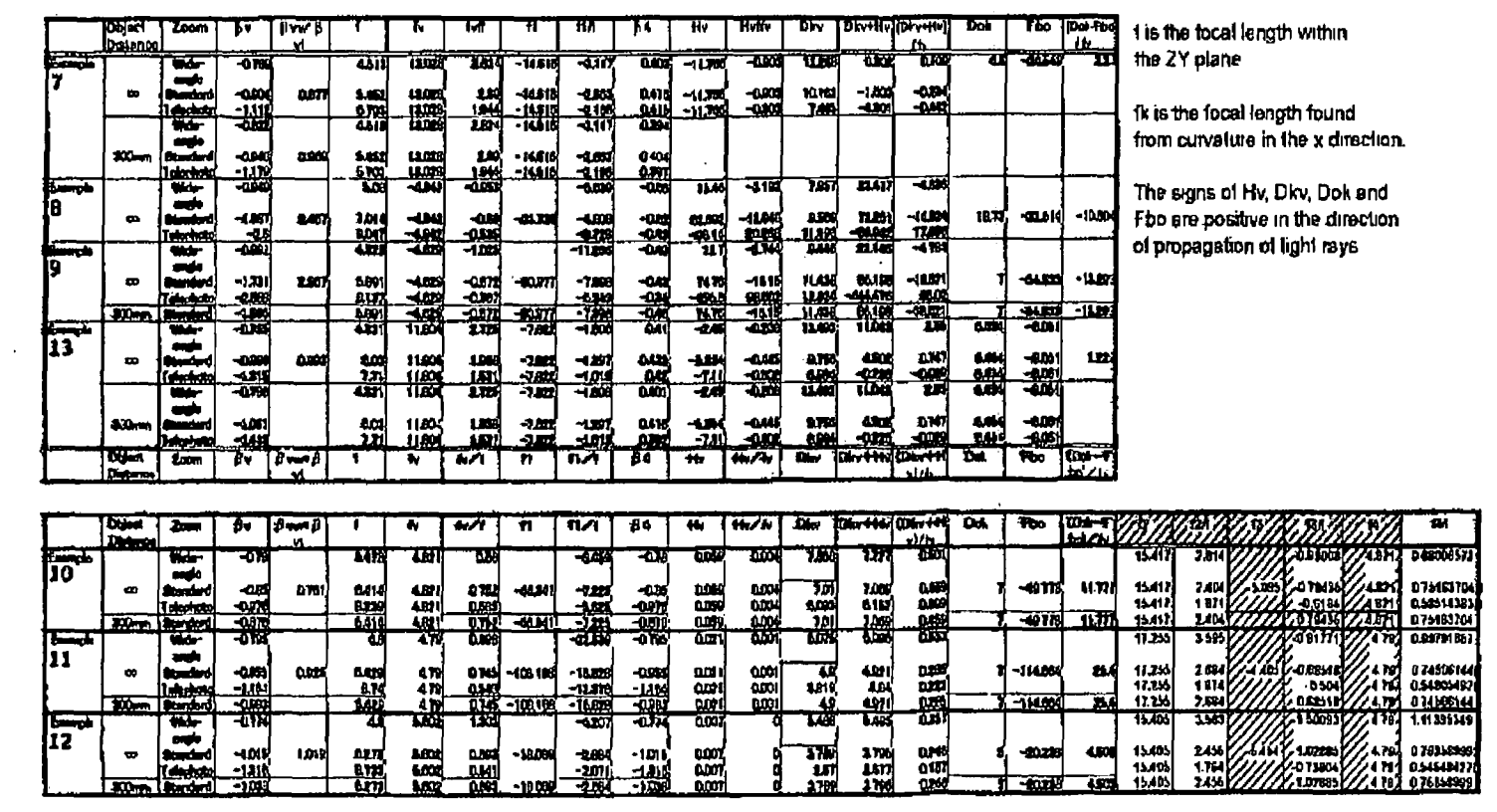

The values of the conditions in the respective embodiments are tabulated in FIG. 18.

Embodiment 1

|  | OD | ZO | FD | DAV |
| --- | --- | --- | --- | --- |
| State 1 | ∞ | WD | 4.125 | 62.44° |
| State 2 | ∞ | SS | 5.775 | 46.82° |
| State 3 | ∞ | TE | 7.425 | 37.22° |
| State 4 | 300 mm | WD | | |
| State 5 | 300 mm | SS | | |
| State 6 | 300 mm | TE | | |

-continued

Fno.: 2.84~3.50
Image pickup surface size: 4.4 mm × 3.3 mm

| Sno | ROC | SS | DC | RI | Ano |
|---|---|---|---|---|---|
| OS | ∞ | (OD) | | | |
| 1 | −20.37 | 1.00 | | 1.6346 | 52.3 |
| 2 | ASP[1] | 8.53 | | | |
| 3 | ∞ | 0.00 | | | |
| 4 | FFS[1] (DM) | 0.00 | DC[1] | | |
| 5 | ∞ | −4.50 | | | |
| 6 | −6.53 | −1.50 | | 1.6575 | 33.0 |
| 7 | −4.97 | −0.31 | | | |
| 8 | −5.73 | −2.46 | | 1.7440 | 44.8 |
| 9 | −6.93 | D1 = −5.38~−2.61~−0.70 | | | |
| 10 | Stop surface | −0.30 | | | |
| 11 | ASP[2] | −1.65 | | 1.5891 | 61.1 |
| 12 | 42.39 | −1.13 | | | |
| 13 | −5.33 | −2.23 | | 1.4875 | 70.4 |
| 14 | 6.58 | −0.87 | | | |
| 15 | 5.84 | −1.16 | | 1.7545 | 28.2 |
| 16 | −3.91 | D2 = −1.36~−4.13~−6.04 | | | |
| 17 | −9.07 | −1.69 | | 1.6167 | 60.5 |
| 18 | ASP[3] | −0.61 | | | |
| 19 | ∞ | −1.44 | | 1.5477 | 62.8 |
| 20 | ∞ | −0.80 | | | |
| 21 | ∞ | −0.60 | | 1.5163 | 64.1 |
| 22 | ∞ | −0.30 | | | |
| IP | ∞ | | | | |

ASP[1]

|   | ROC |   | 10.74, |   | k |   | 0.0000 |
|---|---|---|---|---|---|---|---|
| a | −3.1561 × 10⁻⁴, | b | 7.4345 × 10⁻⁶, | c | −2.9402 × 10⁻⁷, | d | 3.8352 × 10⁻⁹, |

ASP[2]

|   | ROC |   | −7.58, |   | k |   | 0.0000 |
|---|---|---|---|---|---|---|---|
| a | 7.2406 × 10⁻⁴, | b | 3.3243 × 10⁻⁵, | c | −2.1395 × 10⁻⁶, | d | 6.9150 × 10⁻⁷, |

ASP[3]

|   | ROC |   | 6.09, |   | k |   | 0.0000 |
|---|---|---|---|---|---|---|---|
| a | −3.0714 × 10⁻³, | b | 1.1814 × 10⁻⁴, | c | −4.5515 × 10⁻⁶, | d | 6.6703 × 10⁻⁸, |

FFS[1]

|  | State 1 | State 2 | State 3 | State 4 | State 5 | State 6 |
|---|---|---|---|---|---|---|
| C4 | −3.9028 × 10⁻⁴ | 0.0000 | −2.1318 × 10⁻⁴ | −7.1316 × 10⁻⁴ | −2.7737 × 10⁻⁴ | −5.3988 × 10⁻⁴ |
| C6 | −2.0669 × 10⁻⁴ | 0.0000 | −1.1191 × 10⁻⁴ | −3.8008 × 10⁻⁴ | −1.4380 × 10⁻⁴ | −2.7559 × 10⁻⁴ |
| C8 | −1.1153 × 10⁻⁵ | 0.0000 | −1.1113 × 10⁻⁶ | −1.1264 × 10⁻⁵ | −1.0592 × 10⁻⁶ | −5.0322 × 10⁻⁶ |
| C10 | −4.8904 × 10⁻⁶ | 0.0000 | −2.1291 × 10⁻⁶ | −6.9295 × 10⁻⁶ | −1.7984 × 10⁻⁶ | −4.2218 × 10⁻⁶ |
| C11 | 1.2709 × 10⁻⁵ | 0.0000 | −1.4733 × 10⁻⁶ | 1.5502 × 10⁻⁵ | 3.1151 × 10⁻⁷ | −1.0475 × 10⁻⁶ |
| C13 | 1.3639 × 10⁻⁵ | 0.0000 | −5.5535 × 10⁻⁷ | 1.6105 × 10⁻⁵ | 1.7493 × 10⁻⁶ | 9.5344 × 10⁻⁷ |
| C15 | 3.2175 × 10⁻⁶ | 0.0000 | −2.1544 × 10⁻⁷ | 3.7671 × 10⁻⁶ | −1.5870 × 10⁻⁷ | −3.8757 × 10⁻⁷ |

DC[1]

| X | 0.00 | Y | decy | Z | decz |
|---|---|---|---|---|---|
| α | 45.00 | β | 0.00 | γ | 0.00 |

|  | State 1 | State 2 | State 3 | State 4 | State 5 | State 6 |
|---|---|---|---|---|---|---|
| decy | 0.003 | 0 | 0.003 | 0.007 | 0.004 | 0.005 |
| decz | 0.003 | 0 | 0.003 | 0.007 | 0.004 | 0.005 |

OD: object distance
ZO: zoom
FD: focal distance
DAV: diagonal angle of view
WD: wide-angle
SD: standard state
TE: telephoto
Sno: surface number
ROC: radius of curvature
SS: surface spacing
DC: decentration
RI: refractive index
Ano: Abbe number
IP: image plane As shown in FIG. 1, Embodiment 1 is directed to an image pickup apparatus 100 comprising a variable mirror, which is used with digital cameras.

This embodiment is made up of four lens groups, one variable mirror, a plane-parallel plate and a solid-state image pickup device. The variable mirror 102 is interposed between a first lens group 101 having negative power and a second lens group 103 having a meniscus form of positive power. A third lens group 104 is a variator having positive power, and translates in a parallel direction with the optical axis to change the angle of view of the optical system. A fourth lens group 105 is a lens group located just before a solid-state image pickup device 107 and having positive power. A plane-parallel plate 106 represents an IR cut filter, a low-pass filter, a cover glass for the image pickup device, etc.

In this embodiment, the third lens group 104 functions as the variator, and the variable mirror functions as a compensator and a focusing means upon changes in the object distance. Thus, a 1.8:1 power zoom optical system is achievable.

Embodiment 2

|  | OD | ZO | FD | DAV |
|---|---|---|---|---|
| State 1 | ∞ | WD | 4.2 | 61.53° |
| State 2 | ∞ | SD | 6.3 | 43.29° |
| State 3 | ∞ | TE | 8.4 | 33.15° |
| State 4 | 300 mm | WD | | |
| State 5 | 300 mm | SD | | |
| State 6 | 300 mm | TE | | |

Fno.: 2.84~3.49
Image pickup surface size: 4.4 mm × 3.3 mm

| Sno | ROC | SS | DC | RI | Ano |
|---|---|---|---|---|---|
| OS | ∞ | (OD) | | | |
| 1 | −16.83 | 1.01 | DC[1] | 1.7748 | 50.1 |
| 2 | ASP[1] | 6.51 | DC[1] | | |
| 3 | ∞ | 0.00 | | | |
| 4 | FFS[1] (DM) | 0.00 | DC[3] | | |
| 5 | ∞ | −4.00 | | | |
| 6 | −7.66 | −1.37 | | 1.7359 | 31.0 |
| 7 | −6.63 | −0.16 | | | |
| 8 | −11.46 | −1.20 | | 1.7850 | 45.2 |
| 9 | −26.59 | D1 = −8.05~−3.73~−0.10 | | | |
| 10 | Stop surface | −0.10 | | | |
| 11 | ASP[2] | −2.50 | DC[4] | 1.5764 | 60.3 |
| 12 | −43.52 | −1.38 | DC[4] | | |
| 13 | −5.62 | −2.53 | DC[5] | 1.4900 | 70.0 |
| 14 | 6.86 | −0.87 | DC[5] | | |
| 15 | 5.31 | −1.00 | DC[6] | 1.7625 | 28.2 |
| 16 | ASP[3] | D2 = −0.62~−4.95~−8.58 | DC[6] | | |
| 17 | −7.77 | −2.75 | | 1.5111 | 67.0 |
| 18 | 6.00 | −0.18 | | | |
| 19 | 5.46 | −1.47 | | 1.7441 | 42.1 |
| 20 | ASP[4] | −0.46 | | | |
| 21 | ∞ | −1.44 | | 1.5477 | 62.8 |
| 22 | ∞ | −0.80 | | | |
| 23 | ∞ | −0.60 | | 1.5163 | 64.1 |
| 24 | ∞ | −0.50 | | | |
| IP | ∞ | 0.00 | DC[7] | | |

ASP[1]

|   | ROC |   | 8.84, |   | k |   | 0.0000 |
|---|---|---|---|---|---|---|---|
| a | $-7.3333 \times 10^{-4}$, | b | $2.0902 \times 10^{-5}$, | c | $-1.4698 \times 10^{-6}$, | d | $3.8957 \times 10^{-8}$, |

ASP[2]

|   | ROC |   | −6.92, |   | k |   | 0.0000 |
|---|---|---|---|---|---|---|---|
| a | $3.4834 \times 10^{-4}$, | b | $1.2367 \times 10^{-5}$, | c | $6.8848 \times 10^{-7}$, | d | $7.0789 \times 10^{-8}$, |

ASP[3]

|   | ROC |   | −5.12, |   | k |   | 0.0000 |
|---|---|---|---|---|---|---|---|
| a | $-1.5211 \times 10^{-3}$, | b | $5.1273 \times 10^{-5}$, | c | $-1.1665 \times 10^{-5}$, | d | $6.4114 \times 10^{-7}$, |

ASP[4]

|   | ROC |   | 5.65, |   | k |   | 0.0000 |
|---|---|---|---|---|---|---|---|
| a | $-2.5044 \times 10^{-3}$, | b | $1.0252 \times 10^{-4}$, | c | $-4.3124 \times 10^{-6}$, | d | $8.6293 \times 10^{-8}$, |

FFS[1]

|  | State 1 | State 2 | State 3 | State 4 | State 5 | State 6 |
|---|---|---|---|---|---|---|
| C4 | $-7.7351 \times 10^{-4}$ | 0.0000 | $-3.6890 \times 10^{-4}$ | $-1.0612 \times 10^{-3}$ | $-2.8544 \times 10^{-4}$ | $-6.5807 \times 10^{-4}$ |
| C6 | $-3.8970 \times 10^{-4}$ | 0.0000 | $-1.8472 \times 10^{-4}$ | $-5.3605 \times 10^{-4}$ | $-1.4050 \times 10^{-4}$ | $-3.3171 \times 10^{-4}$ |

-continued

| | | | | | | |
|---|---|---|---|---|---|---|
| C8 | $-1.7161 \times 10^{-5}$ | 0.0000 | $-1.0527 \times 10^{-5}$ | $-2.1366 \times 10^{-5}$ | $-8.9812 \times 10^{-6}$ | $-1.6304 \times 10^{-5}$ |
| C10 | $-8.1320 \times 10^{-6}$ | 0.0000 | $-5.5679 \times 10^{-6}$ | $-1.0448 \times 10^{-5}$ | $-3.9280 \times 10^{-6}$ | $-1.0714 \times 10^{-5}$ |
| C11 | $1.2801 \times 10^{-5}$ | 0.0000 | $-3.3904 \times 10^{-7}$ | $1.5724 \times 10^{-5}$ | $4.9259 \times 10^{-7}$ | $-1.4891 \times 10^{-6}$ |
| C13 | $1.3267 \times 10^{-5}$ | 0.0000 | $-8.2321 \times 10^{-7}$ | $1.5533 \times 10^{-5}$ | $1.8986 \times 10^{-6}$ | $-8.0202 \times 10^{-7}$ |
| C15 | $2.9429 \times 10^{-6}$ | 0.0000 | $-2.2205 \times 10^{-7}$ | $3.3239 \times 10^{-6}$ | $-2.2832 \times 10^{-7}$ | $-7.4651 \times 10^{-7}$ |

DC[1]

| X | 0.00 | Y | 0.12 | Z | 0.00 |
|---|---|---|---|---|---|
| α | 0.00 | β | 0.00 | γ | 0.00 |

DC[3]

| X | 0.00 | Y | decy | Z | decz |
|---|---|---|---|---|---|
| α | 45 | β | 0.00 | γ | 0.00 |

| | State 1 | State 2 | State 3 | State 4 | State 5 | State 6 |
|---|---|---|---|---|---|---|
| decy | 0.005 | 0 | 0.003 | 0.007 | 0.004 | 0.005 |
| decz | 0.005 | 0 | 0.003 | 0.007 | 0.004 | 0.005 |

DC[4]

| X | 0.00 | Y | −0.07 | Z | 0.00 |
|---|---|---|---|---|---|
| α | 0.00 | β | 0.00 | γ | 0.00 |

DC[5]

| X | 0.00 | Y | −0.05 | Z | 0.00 |
|---|---|---|---|---|---|
| α | 0.00 | β | 0.00 | γ | 0.00 |

DC[6]

| X | 0.00 | Y | −0.04 | Z | 0.00 |
|---|---|---|---|---|---|
| α | 0.00 | β | 0.00 | γ | 0.00 |

DC[7]

| X | 0.00 | Y | −0.03 | Z | 0.00 |
|---|---|---|---|---|---|
| α | −1.74 | β | 0.00 | γ | 0.00 |

Figure 2:
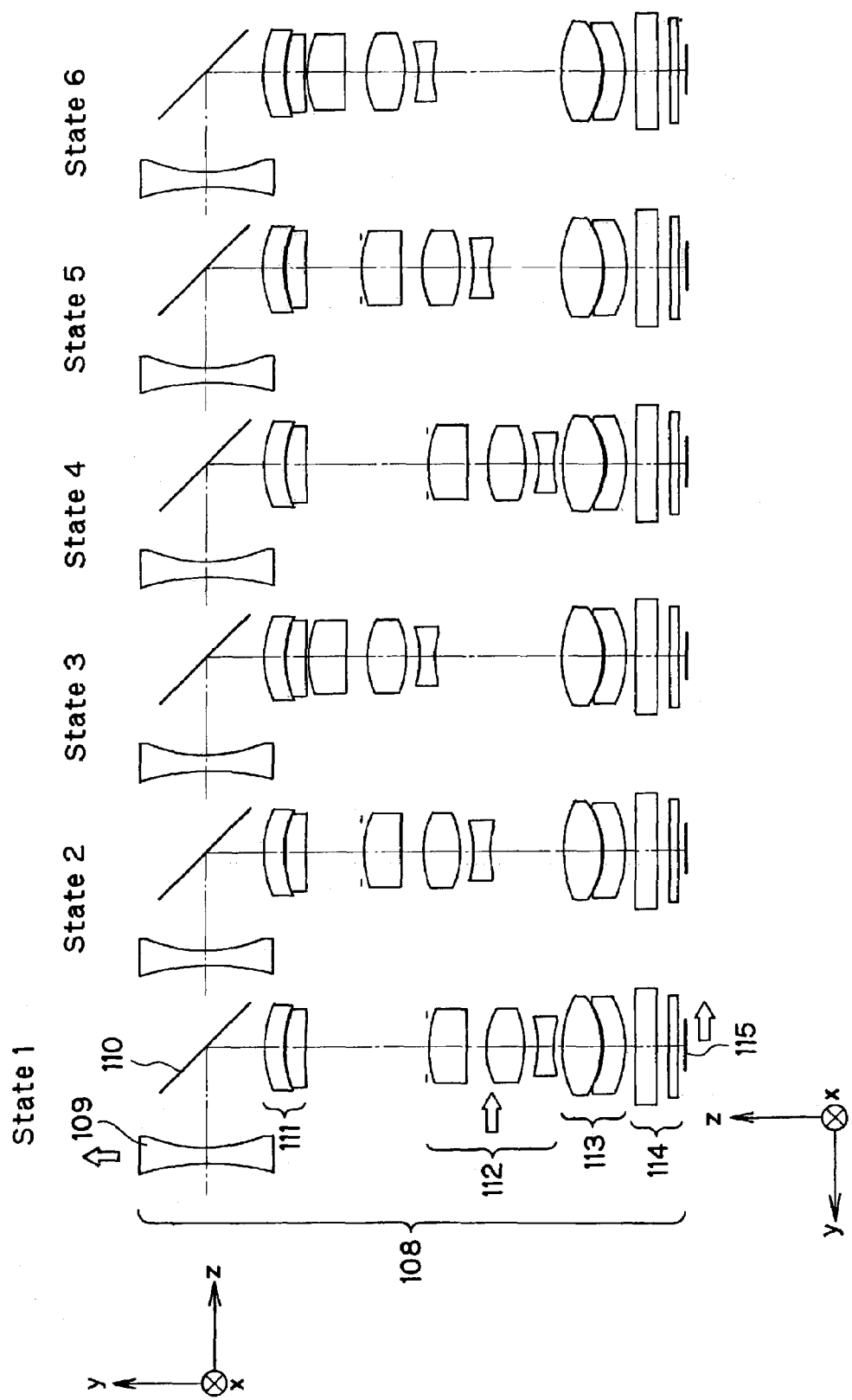
FIG. 2 is illustrative in section of Embodiment 2 of the invention.

As shown in FIG. 2, Embodiment 2 is directed to an image pickup apparatus 108 comprising a variable mirror, which is used with digital cameras.

This embodiment is much the same in construction as Embodiment 1 with the exception that the fourth lens group is composed of two lenses so that aberrations such as chromatic aberration of magnification can be reduced. Thus, Embodiment 2 provides a 2.0:1 power zoom optical system.

In Embodiment 2, displacements are added to the lenses in the first lens group 109 and the third lens group 112 and the image pickup surface of a solid-state image pickup device in a direction vertical to the z-axis (the direction indicated by an arrow in FIG. 2). In addition, the image pickup surface of the solid-state image pickup device 115 is provided with a tilt with the center of rotation defined by the X-axis. Although the variable mirror 110 is transformed into a free-form surface shape to reduce decentration aberrations due to reflection, yet some decentration aberrations remain. For such aberrations the displacements added to the lenses and the tilt applied to the image pickup surface are effective.

The addition of the displacements in the direction indicated by the arrow in FIG. 2 is effective for reducing trapezium distortion unique to a bending optical system.

It is then desired to satisfy the following condition (101):

$$0 < |\Delta|/f < 0.2 \quad (101)$$

where Δ is the amount of displacement added to each lens, and f is the focal length of the optical system.

By displacing the respective lenses within the range defined by condition (101), it is possible to effectively reduce aberrations such as trapezium distortion. As the upper limit of 0.2 is exceeded, the amount of displacements becomes too large and so aberrations of rim rays become large, making well-balanced correction of aberrations difficult.

It is also desired to comply with the following condition (102):

$$0 < |C| < 15 \quad (102)$$

where C (deg) is the amount of tilt added to the image pickup surface of the solid-state image pickup device.

By tilting the image pickup surface within the range defined by condition (102), aberrations including asymmetric components can effectively be reduced. As the upper limit of 15 is exceeded, differences in the angle of tilt of a chief ray of incident light between both ends of an image plane become too large, resulting in a change in brightness at both ends of the image plane by virtue of shading, etc.

More preferably in view of shading, $$0 < |C| < 8 \quad (103)$$

Most preferably, $$0 < |C| < 3 \quad (103\text{-}2)$$

Embodiment 3

|  | OD | ZO | FD | DAV |
|---|---|---|---|---|
| State 1 | ∞ | WD | 4.2 | 61.53° |
| State 2 | ∞ | SD | 6.3 | 43.29° |
| State 3 | ∞ | TE | 8.4 | 33.15° |
| State 4 | 150 mm | WD | | |
| State 5 | 150 mm | SD | | |
| State 6 | 250 mm | TE | | |

Fno.: 2.84~3.49
Image pickup surface size: 4.4 mm × 3.3 mm

| Sno | ROC | SS | DC | RI | Ano |
|---|---|---|---|---|---|
| SS | ∞ | (OD) | | | |
| 1 | −19.22 | 1.00 | DC[1] | 1.7800 | 50.0 |
| 2 | ASP[1] | 6.57 | DC[1] | | |
| 3 | ∞ | 0.00 | | | |
| 4 | FFS[1] (DM) | 0.00 | DC[3] | | |
| 5 | ∞ | −4.00 | | | |
| 6 | −7.55 | −1.45 | | 1.7742 | 26.1 |
| 7 | −6.44 | −0.20 | | | |
| 8 | −10.73 | −1.29 | | 1.7888 | 43.6 |
| 9 | −24.90 | D1 = −8.53~−3.97~−0.20 | | | |
| 10 | Stop surface | −0.10 | | | |
| 11 | ASP[2] | −2.35 | DC[4] | 1.5755 | 60.3 |
| 12 | −55.56 | −1.34 | DC[4] | | |
| 13 | −5.75 | −2.61 | DC[5] | 1.4900 | 70.0 |
| 14 | 6.87 | −0.83 | DC[5] | | |
| 15 | 5.53 | −1.00 | DC[6] | 1.7646 | 28.8 |
| 16 | ASP[3] | D2 = −0.62~−5.18~−8.95 | DC[6] | | |
| 17 | −7.35 | −2.80 | | 1.4900 | 70.0 |
| 18 | 6.58 | −0.21 | | | |
| 19 | 6.00 | −2.02 | | 1.6773 | 45.5 |
| 20 | ASP[4] | −0.30 | | | |
| 21 | ∞ | −1.44 | | 1.5477 | 62.8 |
| 22 | ∞ | −0.80 | | | |
| 23 | ∞ | −0.60 | | 1.5163 | 64.1 |
| 24 | ∞ | −0.50 | | | |
| IP | ∞ | 0.00 | DC[7] | | |

ASP[1]

| | ROC | | 7.89, | | k | | 0.0000 | |
|---|---|---|---|---|---|---|---|---|
| a | $-7.8557 \times 10^{-4}$, | b | $2.1256 \times 10^{-5}$, | c | $-1.5582 \times 10^{-6}$, | d | $4.1906 \times 10^{-8}$, | |

ASP[2]

| | ROC | | −7.08, | | k | | 0.0000 | |
|---|---|---|---|---|---|---|---|---|
| a | $3.2960 \times 10^{-4}$, | b | $1.0965 \times 10^{-5}$, | c | $5.8519 \times 10^{-7}$, | d | $9.2692 \times 10^{-8}$, | |

ASP[3]

| | ROC | | −5.09, | | k | | 0.0000 | |
|---|---|---|---|---|---|---|---|---|
| a | $-1.5174 \times 10^{-3}$, | b | $5.8085 \times 10^{-5}$, | c | $-1.6827 \times 10^{-5}$, | d | $1.3452 \times 10^{-6}$, | |

ASP[4]

| | ROC | | 5.70, | | k | | 0.0000 | |
|---|---|---|---|---|---|---|---|---|
| a | $-2.9815 \times 10^{-3}$, | b | $1.1211 \times 10^{-4}$, | c | $-3.8893 \times 10^{-6}$, | d | $5.0634 \times 10^{-8}$, | |

FFS[1]

| | State 1 | State 2 | State 3 | State 4 | State 5 | State 6 |
|---|---|---|---|---|---|---|
| C4  | $-7.2761 \times 10^{-4}$ | 0.0000 | $-4.1810 \times 10^{-4}$ | $-1.2865 \times 10^{-3}$ | $-5.5229 \times 10^{-4}$ | $-7.5325 \times 10^{-4}$ |
| C6  | $-3.6010 \times 10^{-4}$ | 0.0000 | $-2.0911 \times 10^{-4}$ | $-6.5292 \times 10^{-4}$ | $-2.7621 \times 10^{-4}$ | $-3.7969 \times 10^{-4}$ |
| C8  | $-1.2874 \times 10^{-5}$ | 0.0000 | $-1.1582 \times 10^{-5}$ | $-2.3385 \times 10^{-5}$ | $-1.1856 \times 10^{-5}$ | $-1.9045 \times 10^{-5}$ |
| C10 | $-6.2363 \times 10^{-6}$ | 0.0000 | $-5.7799 \times 10^{-6}$ | $-1.2413 \times 10^{-5}$ | $-6.6142 \times 10^{-6}$ | $-1.2098 \times 10^{-5}$ |
| C11 | $8.5992 \times 10^{-6}$ | 0.0000 | $-1.2374 \times 10^{-6}$ | $1.3026 \times 10^{-5}$ | $4.8420 \times 10^{-7}$ | $-2.8955 \times 10^{-6}$ |
| C13 | $8.0045 \times 10^{-6}$ | 0.0000 | $-1.7717 \times 10^{-6}$ | $1.2539 \times 10^{-5}$ | $2.4473 \times 10^{-6}$ | $-2.3267 \times 10^{-6}$ |
| C15 | $1.8452 \times 10^{-6}$ | 0.0000 | $-4.6466 \times 10^{-7}$ | $2.5536 \times 10^{-6}$ | $-3.7355 \times 10^{-7}$ | $-1.1379 \times 10^{-6}$ |

DC[1]

| X | 0.00 | Y | 0.17 | Z | 0.00 |
|---|---|---|---|---|---|
| α | 0.00 | β | 0.00 | γ | 0.00 |

-continued

DC[3]

| | | | | | |
|---|---|---|---|---|---|
| X | 0.00 | Y | decy | Z | decz |
| α | 45 | β | 0.00 | γ | 0.00 |

| | State 1 | State 2 | State 3 | State 4 | State 5 | State 6 |
|---|---|---|---|---|---|---|
| decy | 0.005 | 0 | 0.004 | 0.007 | 0.004 | 0.006 |
| decz | 0.005 | 0 | 0.004 | 0.007 | 0.004 | 0.006 |

DC[4]

| | | | | | |
|---|---|---|---|---|---|
| X | 0.00 | Y | −0.09 | Z | 0.00 |
| α | 0.00 | β | 0.00 | γ | 0.00 |

DC[5]

| | | | | | |
|---|---|---|---|---|---|
| X | 0.00 | Y | −0.07 | Z | 0.00 |
| α | 0.00 | β | 0.00 | γ | 0.00 |

DC[6]

| | | | | | |
|---|---|---|---|---|---|
| X | 0.00 | Y | −0.06 | Z | 0.00 |
| α | 0.00 | β | 0.00 | γ | 0.00 |

DC[7]

| | | | | | |
|---|---|---|---|---|---|
| X | 0.00 | Y | −0.05 | Z | 0.00 |
| α | −2.16 | β | 0.00 | γ | 0.00 |

Figure 3:
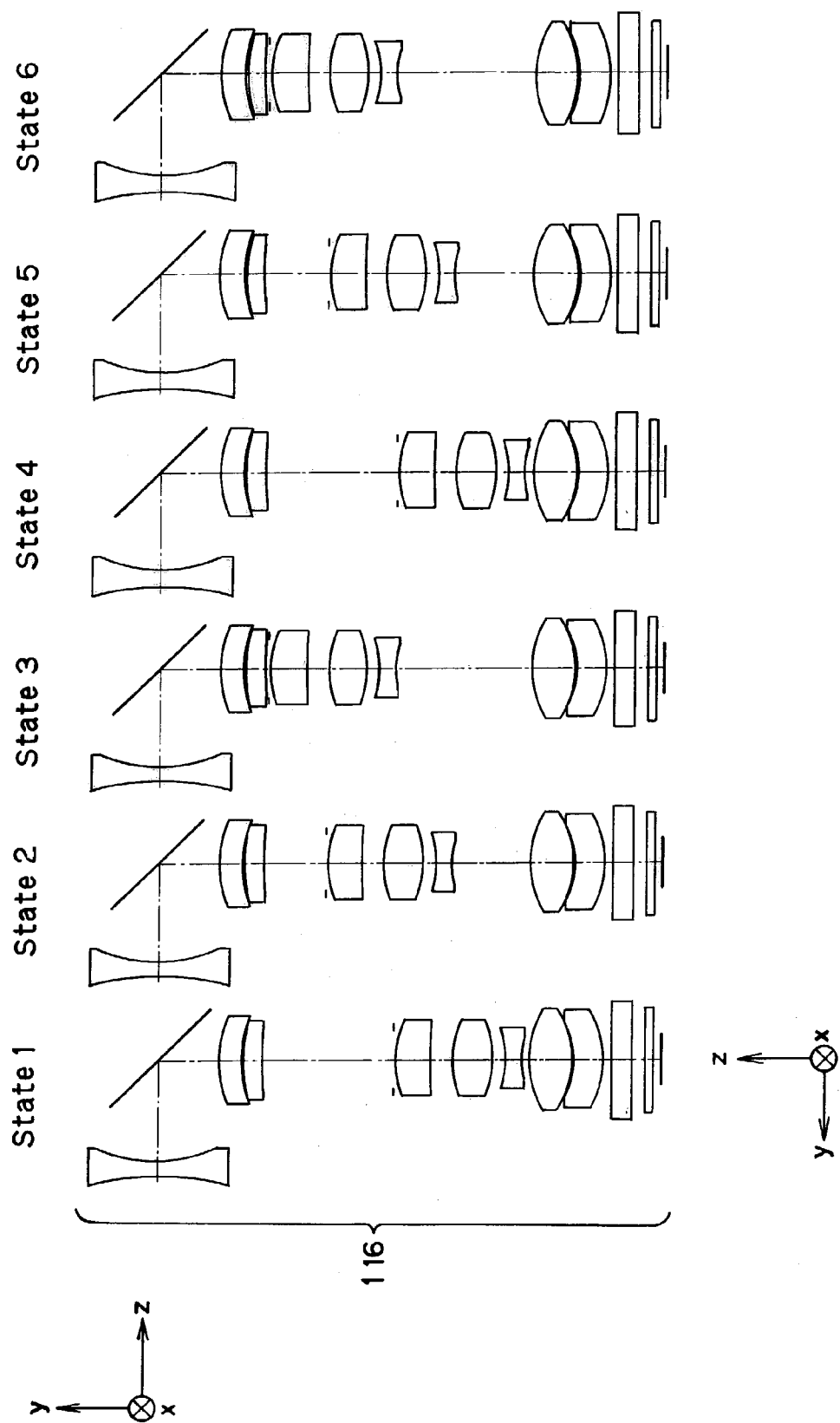
FIG. 3 is illustrative in section of Embodiment 3 of the invention.

As shown in FIG. 3, Embodiment 3 is directed to an image pickup apparatus 116 comprising a variable mirror, which is used with digital cameras.

This embodiment is much the same in construction as Embodiment 2 with the exception that the displacements added to the respective lenses and the tilt added to the image pickup device are increased in such a way as to enable focusing to a near point of up to 150 mm. The zoom ratio is 2.0.

Embodiment 4

| | OD | ZO | Fno. | FD |
|---|---|---|---|---|
| State 1 | ∞ | WD | 2.8449 | 4.22127 |
| State 2 | ∞ | SD | 3.1912 | 5.75071 |
| State 3 | ∞ | TE | 3.4907 | 8.08140 |
| State 5 | 300 mm | SD | 3.1912 | 5.75071 |

Image pickup surface size: X 4 mm × Y 3 mm
Px = Py = 2.5 μm

| Sno | ROC | SS | DC | RI | Ano |
|---|---|---|---|---|---|
| OS | ∞ | (OD) | | | |
| 1 | 39.4929 | 1.0000 | | 1.78472 | 25.68 |
| 2 | 474.3906 | 7.2046 | | | |
| 3 | −42.6405 | 0.5000 | | 1.88300 | 40.76 |
| 4 | ASP[1] | 8.0018 | | | |
| 5 | FFS[1] (DM) | −0.0018 | DC[1] | | |
| 6 | 999.0000 | −0.3000 | | | |
| 7 | 999.0000 | −0.2307 | | | |
| 8 | 999.0000 | −0.5000 | | | |
| 9 | 999.0000 | D1 = −10.3161~−7.2986~−3.0040 | | | |
| 10 | Stop surface | −0.0027 | | | |
| 11 | ASP[2] | −1.5000 | | 1.58913 | 61.14 |
| 12 | 35.8649 | −0.3000 | | | |
| 13 | −5.1025 | −1.9963 | | 1.49700 | 81.54 |
| 14 | 7.2438 | −0.2906 | | | |
| 15 | −8.7222 | −1.0482 | | 1.51633 | 64.14 |
| 16 | −6.4397 | −0.6000 | | | |
| 17 | 8.8339 | −0.3631 | | 1.78472 | 25.68 |
| 18 | ASP[3] | D2 = −0.8526~−3.8655~−8.1673 | | | |
| 19 | −5.6538 | −2.0000 | | 1.58913 | 61.14 |
| 20 | ASP[4] | −0.7069 | | | |
| 21 | ∞ | −1.4400 | | 1.54771 | 62.84 |
| 22 | ∞ | −0.1000 | | | |
| 23 | ∞ | −0.6000 | | 1.51633 | 64.14 |
| 24 | ∞ | −0.1000 | | | |
| IP | ∞ | | | | |

-continued

ASP[1]

| | ROC | | 12.5383, | | k | | 0 | |
|---|---|---|---|---|---|---|---|---|
| a | $-3.7625 \times 10^{-4}$, | b | $1.6313 \times 10^{-5}$, | c | $-5.6290 \times 10^{-7}$, | d | $6.9835 \times 10^{-9}$, |

ASP[2]

| | ROC | | -10.8213, | | k | | 0 | |
|---|---|---|---|---|---|---|---|---|
| a | $1.3870 \times 10^{-3}$, | b | $3.0924 \times 10^{-5}$, | c | $7.9884 \times 10^{-6}$, | d | $-8.1500 \times 10^{-7}$, |

ASP[3]

| | ROC | | -3.1489, | | k | | 0 | |
|---|---|---|---|---|---|---|---|---|
| a | $-7.5029 \times 10^{-9}$, | b | $-8.0505 \times 10^{-9}$, | c | $-1.2342 \times 10^{-5}$, | d | $-1.9009 \times 10^{-5}$, |

ASP[4]

| | ROC | | 4.6193, | | k | | 0 | |
|---|---|---|---|---|---|---|---|---|
| a | $-8.9627 \times 10^{-3}$, | b | $4.0263 \times 10^{-4}$, | c | $-1.2792 \times 10^{-5}$, | d | $2.4193 \times 10^{-11}$, |

FFS[1]

| | ROC | ∞, | k | 0 |
|---|---|---|---|---|

| | State 1 | State 2 | State 3 | State 5 |
|---|---|---|---|---|
| C4 | $-2.7980 \times 10^{-3}$ | $-1.0000 \times 10^{-3}$ | $-1.4138 \times 10^{-3}$ | $-1.7067 \times 10^{-3}$ |
| C6 | $-1.2465 \times 10^{-3}$ | $-7.0000 \times 10^{-4}$ | $-6.7280 \times 10^{-4}$ | $-7.8841 \times 10^{-4}$ |
| C8 | $-1.2017 \times 10^{-5}$ | 0.0000 | $2.7504 \times 10^{-5}$ | $3.1915 \times 10^{-5}$ |
| C10 | $-8.9620 \times 10^{-6}$ | 0.0000 | $-1.2445 \times 10^{-5}$ | $2.7793 \times 10^{-6}$ |
| C11 | $3.7102 \times 10^{-5}$ | 0.0000 | $3.3091 \times 10^{-5}$ | $-1.7423 \times 10^{-7}$ |
| C13 | $1.9287 \times 10^{-5}$ | 0.0000 | $2.5108 \times 10^{-5}$ | $-3.3681 \times 10^{-6}$ |
| C15 | $4.3329 \times 10^{-6}$ | 0.0000 | $7.7926 \times 10^{-6}$ | $-2.4196 \times 10^{-6}$ |

DC[1]

| X | 0.00 | Y | 0.00 | Z | 0.00 |
|---|---|---|---|---|---|
| α | -45.00 | β | 0.00 | γ | 0.00 |

Figure 4:
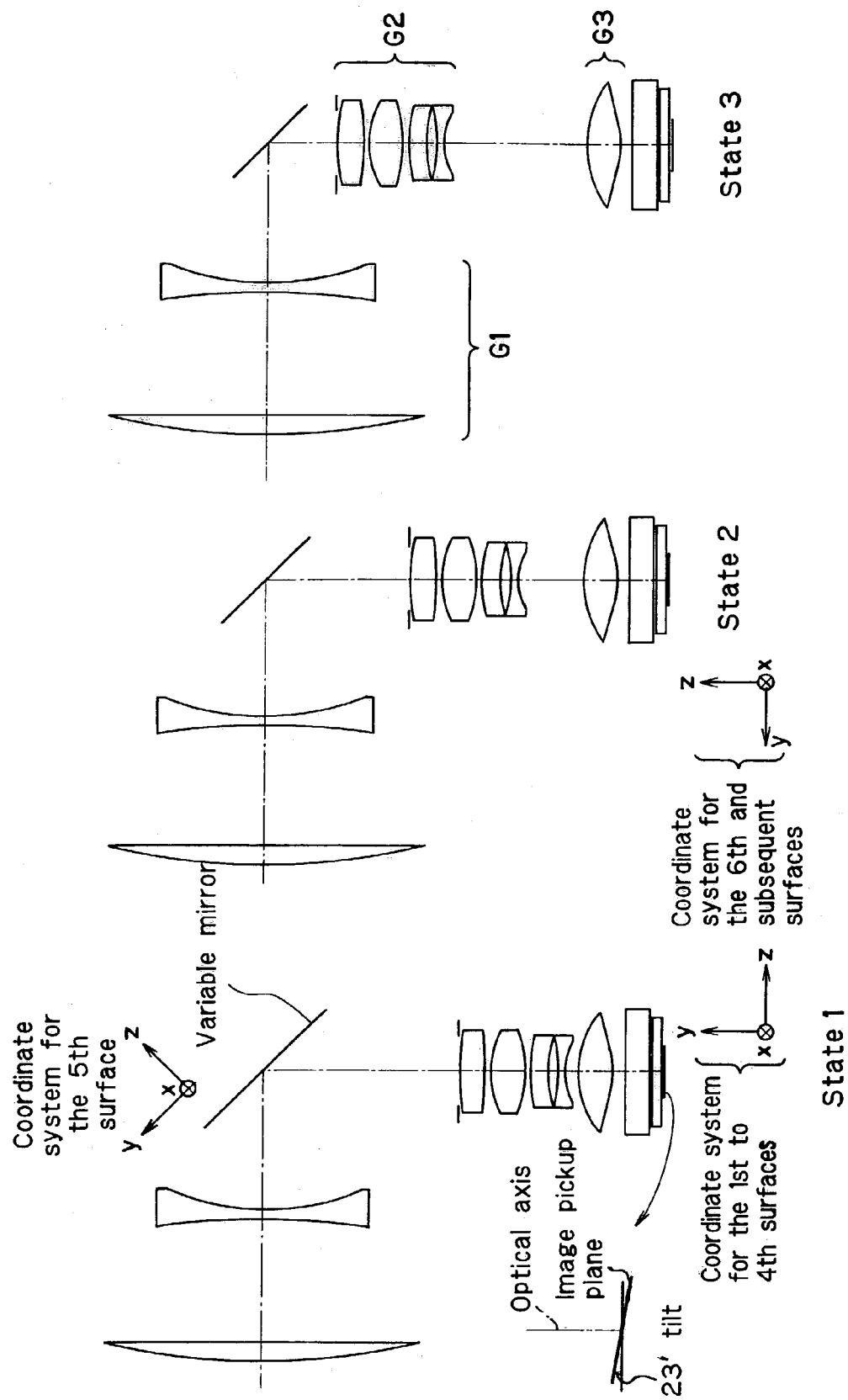
FIG. 4 is illustrative in section of Embodiment 4 of the invention.

FIG. 4 is illustrative in section of Embodiment 4. Embodiment 4 is directed to a 2:1 power zoom lens used with digital cameras, TV cameras, etc. The instant zoom lens is made up of a first lens group G1 having negative power, a second lens group G2 having positive power and a third lens group G3 having positive power. The origin of a coordinate system is defined by the center of the first surface. The fifth surface is formed of a variable mirror that assumes a concave surface in all states. The 6th to 9th surfaces are virtual surfaces. The Z of a coordinate system for the 6th and subsequent surfaces is opposite in direction, and so the signs of R, D and an aspheric surface coefficient are opposite to actual ones.

Although the variable mirror is transformed while the center of the reflecting surface remains fixed, it is understood that the variable mirror may be transformed while the periphery of the reflecting surface remains fixed.

The optical axis of the optical system bends 90° at a point of intersection with the variable mirror. The point of intersection of the optical axis with the variable mirror defines the origin of the surface shape of the variable mirror.

The directions of the coordinate axes are shown in FIG. 4. Care must be taken of the fact that those directions differ with the 1st to 4th surfaces, the 5th surface, and the 6th and subsequent surfaces. As shown, the image pickup surface of an image pickup device is tilted 23'. This is to obtain the best resolution whenever the tilt of an image plane changes in association with the transformation of the variable mirror.

The variable mirror is transformed to compensate for focus movement caused upon zooming by movement of the lens groups and attain focus upon an object distance change.

The 11th to 18th surfaces forms together the zooming lens group G2 that moves along the optical axis.

While the static electricity driven variable mirror is used in the instant embodiment, it is noted that this mirror is transformed into only a concave surface inclusive of a planar surface. In this embodiment, therefore, the variable mirror in the standard state does not assume a planar surface even when an object is at infinity. A focus position is shifted from the design position due to errors on fabrication such as errors in lens parts, lens barrel parts and on assembling. Even at such a focus position, the shape of the variable mirror can be brought close to a planar shape thereby attaining focus.

When the contrast detecting (climbing) type auto-focusing is performed, the variable mirror is transformed to move the focus position. Then, the high frequency component of a subject image is detected so that the high frequency component reaching a maximum is judged as attaining focus. To move the focus position beyond a point at infinity, the variable mirror must be placed in a concave shape in all states.

Embodiment 5

| | OD | ZO | Fno. | FD | DAV |
|---|---|---|---|---|---|
| State 1 | ∞ | WD | 3.022 | 4.801 | 61.2° |
| State 2 | ∞ | SD | 3.411 | 5.756 | 49.84° |

-continued

| | | | | | |
|---|---|---|---|---|---|
| State 3 | ∞ | TE | 3.740 | 6.726 | 42.2° |
| State 4 | 300 mm | WD | 3.001 | 4.801 | |
| State 5 | 300 mm | SD | 3.392 | 5.756 | |
| State 6 | 300 mm | TE | 3.721 | 6.726 | |

Image pickup surface size: 4 mm × 3 mm

| Sno | ROC | SS | DC | RI | Ano |
|---|---|---|---|---|---|
| OS | ∞ | (OD) | | | |
| 1 | −24.306 | 1.2 | | 1.71297 | 31.69 |
| 2 | ASP[1] | 2.2345 | | | |
| 3 | 73.3434 | 2 | | 1.50461 | 66.38 |
| 4 | −70.0057 | 7.0688 | | | |
| 5 | FFS[1] (DM) | −4.2914 | DC[1] | | |
| 6 | −6.4021 | −1.0841 | | 1.71164 | 50.41 |
| 7 | −5.1257 | −0.3865 | | | |
| 8 | −5.6419 | −2.3267 | | 1.89494 | 24.58 |
| 9 | −5.7514 | D1 = −4.29597~−2.53996~−0.99848 | | | |
| 10 | Stop surface | −0.835 | | | |
| 11 | ASP[2] | −2.0224 | | 1.58913 | 61.14 |
| 12 | 17.503 | −1.0067 | | | |
| 13 | −6.0673 | −2.153 | | 1.497 | 81.54 |
| 14 | 8.6875 | −0.8413 | | | |
| 15 | 14.8278 | −1.0216 | | 1.84666 | 23.78 |
| 16 | −3.8628 | D2 = −1.71739~−3.47341~−5.01488 | | | |
| 17 | −16.9294 | −2.0604 | | 1.58913 | 61.14 |
| 18 | ASP[3] | −1.2241 | | | |
| 19 | ∞ | −1.44 | | 1.54771 | 62.84 |
| 20 | ∞ | −0.8 | | | |
| 21 | ∞ | −0.6 | | 1.51633 | 64.14 |
| 22 | ∞ | −0.5 | | | |
| IP | ∞ | | | | |

ASP[1]

| | ROC | | 9.4392, | | k | | 0.0000 | | |
|---|---|---|---|---|---|---|---|---|---|
| a | −2.0683 × 10⁻⁴, | b | 1.1006 × 10⁻⁶, | c | −8.0740 × 10⁻⁸, | d | 5.4537 × 10⁻¹⁰, | | |

ASP[2]

| | ROC | | −8.9634, | | k | | 0.0000 | |
|---|---|---|---|---|---|---|---|---|
| a | 8.1855 × 10⁻⁴, | b | 2.9005 × 10⁻⁵, | c | −2.9963 × 10⁻⁶, | d | 3.7358 × 10⁻⁷, | |

ASP[3]

| | ROC | | 6.9002, | | k | | 0.0000 | |
|---|---|---|---|---|---|---|---|---|
| a | −1.0905 × 10⁻³, | b | 7.2538 × 10⁻⁵, | c | −7.1600 × 10⁻⁶, | d | 3.4177 × 10⁻⁷, | |

DC[1]

| X | 0 | Y | 0 | Z | 0 |
|---|---|---|---|---|---|
| α | −45 | β | 0 | γ | 0 |

FFS[1]

| | State 1 | State 2 | State 3 | State 4 | State 5 | State 6 |
|---|---|---|---|---|---|---|
| C4 | −2.2433 × 10⁻⁴ | 0.0000 | −9.3831 × 10⁻⁵ | −5.0582 × 10⁻⁴ | −2.6002 × 10⁻⁴ | −3.8015 × 10⁻⁴ |
| C6 | −1.1925 × 10⁻⁴ | 0.0000 | −5.1098 × 10⁻⁵ | −2.5619 × 10⁻⁴ | −1.2941 × 10⁻⁴ | −1.8895 × 10⁻⁴ |
| C8 | −2.8598 × 10⁻⁶ | 0.0000 | −1.6606 × 10⁻⁷ | −4.9422 × 10⁻⁶ | −1.1846 × 10⁻⁶ | −1.0426 × 10⁻⁶ |
| C10 | −1.6824 × 10⁻⁶ | 0.0000 | −8.8244 × 10⁻⁷ | −2.9138 × 10⁻⁶ | −1.4327 × 10⁻⁶ | −2.9231 × 10⁻⁶ |
| C11 | 6.7042 × 10⁻⁶ | 0.0000 | −2.1354 × 10⁻⁶ | 8.3102 × 10⁻⁶ | 1.1080 × 10⁻⁶ | −5.1439 × 10⁻⁷ |
| C13 | 6.9240 × 10⁻⁶ | 0.0000 | −1.9547 × 10⁻⁶ | 8.3939 × 10⁻⁶ | 8.3965 × 10⁻⁷ | −8.9360 × 10⁻⁷ |
| C15 | 1.7668 × 10⁻⁶ | 0.0000 | −4.1945 × 10⁻⁷ | 1.9693 × 10⁻⁶ | 1.2489 × 10⁻⁷ | −3.5666 × 10⁻⁷ |

Figure 5:
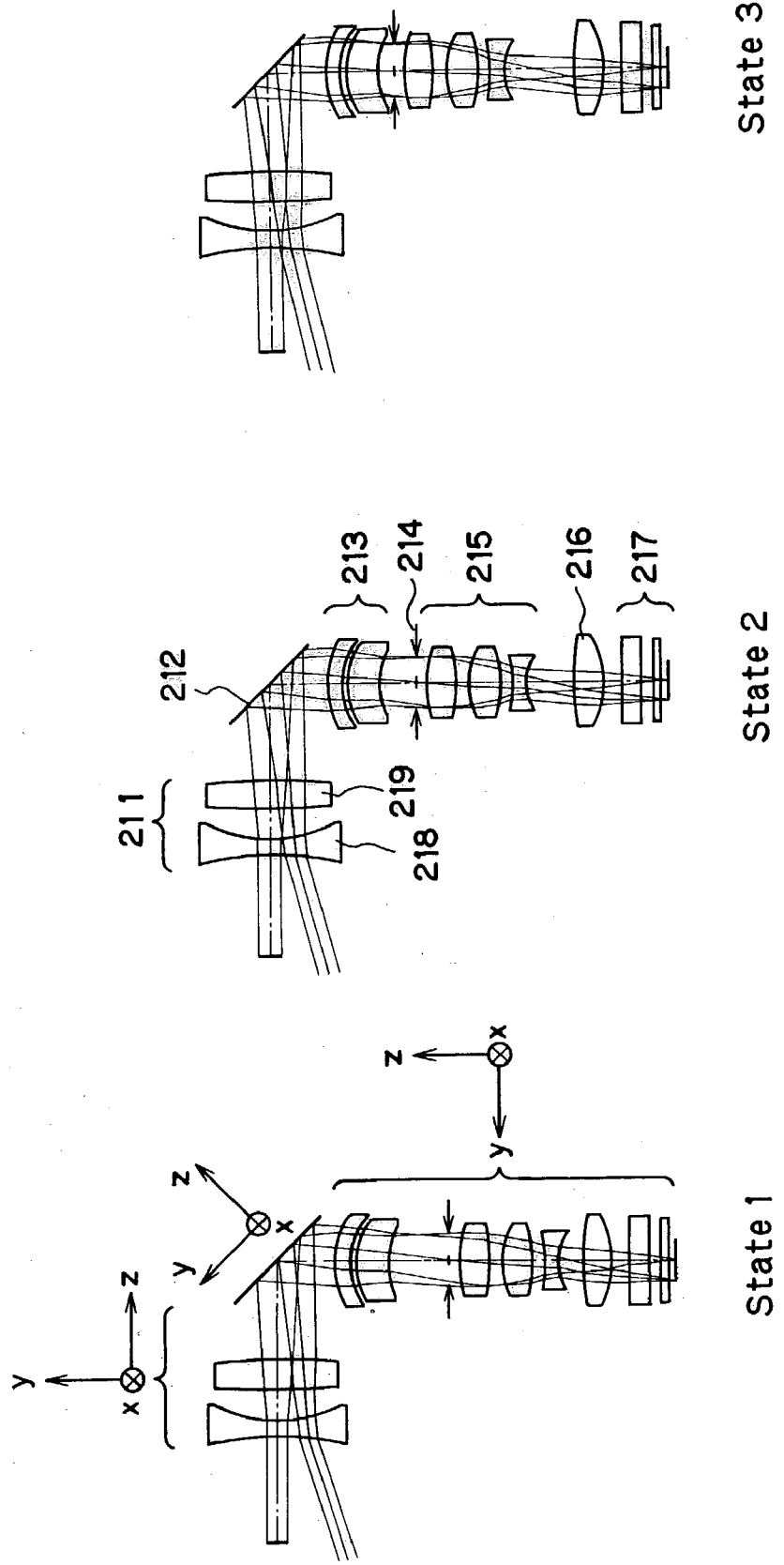
FIG. 5 is illustrative in section of Embodiment 5 of the invention.

As shown in FIG. 5, Embodiment 5 is directed to a 1.4:1 power zoom image pickup optical system used with digital cameras, TV cameras, etc.

The instant zoom image pickup optical system is generally of the retrofocus type that is made up of a lens group 211 having negative power, a variable mirror 212, a lens group 213 having positive power, an aperture stop 214, a lens group 215 having positive power, a lens group 216 having positive power, and an IR cut filter/moiré removal filter 217. The lens group 215 having positive power is a variator that moves along the optical axis of the optical system (along the z-axis direction in FIG. 5) for zooming.

The variable mirror 212 has a combined compensator and focusing lens function, and transforms to compensate for a shift of the focus position in association with zooming and a focus shift in association with a change in the object distance. This variable mirror assumes a planar shape at an object distance ∞ and in the standard zooming state, and a free-form surface shape in otherwise states.

The lens group 211 having negative power is composed of two lenses, i.e., a concave lens 218 and a convex lens 219. This is effective just only for slacking strong negative distortion produced at the concave lens 218 but also for lowering the height of rays at the concave lens 218. As a result of these two effects, the load of an aspheric surface used in the optical system on correction of aberrations is so reduced that the amount of aspherizing can be slacked, resulting in easier fabrication.

Shown in FIG. 5 are ray diagrams for the optical system typically at an object distance ∞ and in zooming states at the wide-angle end, in the standard state and at the telephoto end, respectively. The coordinate system shown in FIG. 5 is common to the respective states; however, care must be taken of the fact that another coordinate system is used on the image side of the optical system with respect to the variable mirror 212, a further coordinate is used for the variable mirror 212, and a further coordinate system is used on the image side of the optical system with respect to the variable mirror 212.

Embodiment 6

|  | OD | ZO | Fno. | FD | DAV |
|---|---|---|---|---|---|
| State 1 | ∞ | WD | 3.980 | 4.652 | 57.1° |
| State 2 | ∞ | SD | 4.477 | 5.453 | 49.2° |
| State 3 | ∞ | TE | 5.149 | 6.701 | 40.5° |
| State 4 | 300 mm | WD | 3.961 | 4.652 | |
| State 5 | 300 mm | SD | 4.459 | 5.453 | |
| State 6 | 300 mm | TE | 5.133 | 6.701 | |

Image pickup surface size 4 mm × 3 mm

| Sno | ROC | SS | DC | RI | Ano |
|---|---|---|---|---|---|
| OS | ∞ | (OD) | | | |
| 1 | −38.5523 | 2.045 | | 1.744 | 44.78 |
| 2 | ASP[1] | 3.1074 | | | |
| 3 | 63.3299 | 3.3731 | | 1.51633 | 64.14 |
| 4 | −55.7768 | 10.5953 | | | |
| 5 | FFS[1] (DM) | −4.5963 | DC[1] | | |
| 6 | −106.8041 | −2.0514 | | 1.92286 | 18.9 |
| 7 | −4240.8114 | D1 = −6.80213~−4.23488~−0.76948 | | | |
| 8 | Stop surface | −0.0787 | | | |
| 9 | ASP[2] | −6.2388 | | 1.5725 | 57.74 |
| 10 | 23.4652 | −1.2298 | | | |
| 11 | −8.3423 | −2.3156 | | 1.52249 | 59.84 |
| 12 | 11.2443 | −0.8167 | | | |
| 13 | 10.9717 | −1.0734 | | 1.84666 | 23.78 |
| 14 | −4.447 | D2 = −0.68903~−3.25628~−6.72167 | | | |
| 15 | −9.0599 | −3.7612 | | 1.5725 | 57.74 |
| 16 | ASP[3] | −1.5817 | | | |
| 17 | ∞ | −1.44 | | 1.54771 | 62.84 |
| 18 | ∞ | −0.8 | | | |
| 19 | ∞ | −0.6 | | 1.51633 | 64.14 |
| 20 | ∞ | −0.5 | | | |
| IP | ∞ | | | | |

ASP[1]

|  | ROC | 8.6410, | | k | 0.0000 | | |
|---|---|---|---|---|---|---|---|
| A | −4.5614 × 10$^{-4}$, | B | 2.9660 × 10$^{-6}$, | C | −1.3571 × 10$^{-7}$, | D | 1.5429 × 10$^{-9}$, |

ASP[2]

|  | ROC | −9.4088, | | k | 0.0000 | | |
|---|---|---|---|---|---|---|---|
| a | 2.6088 × 10$^{-4}$, | b | 5.8088 × 10$^{-6}$, | c | −2.4412 × 10$^{-7}$, | d | 2.0243 × 10$^{-8}$, |

ASP[3]

|  | ROC | −9.0075, | | k | 0.0000 | | |
|---|---|---|---|---|---|---|---|
| a | −1.3159 × 10$^{-3}$, | b | 6.5552 × 10$^{-5}$, | c | −5.2821 × 10$^{-6}$, | d | 2.0025 × 10$^{-7}$, |

FFS[1]

| | State 1 | State 2 | State 3 | State 4 | State 5 | State 6 |
|---|---|---|---|---|---|---|
| C4 | −2.4155 × 10$^{-4}$ | 0.0000 | 2.7301 × 10$^{-5}$ | −4.2833 × 10$^{-4}$ | −1.7222 × 10$^{-4}$ | −1.5675 × 10$^{-4}$ |
| C6 | −1.1909 × 10$^{-4}$ | 0.0000 | 1.5481 × 10$^{-5}$ | −2.1381 × 10$^{-4}$ | −9.1215 × 10$^{-5}$ | −7.6576 × 10$^{-5}$ |
| C8 | −3.5587 × 10$^{-6}$ | 0.0000 | 3.8957 × 10$^{-8}$ | −2.8029 × 10$^{-6}$ | 8.3713 × 10$^{-7}$ | 5.9061 × 10$^{-7}$ |
| C10 | −1.6571 × 10$^{-6}$ | 0.0000 | −6.1292 × 10$^{-8}$ | −1.8332 × 10$^{-6}$ | −6.6528 × 10$^{-7}$ | −1.6575 × 10$^{-6}$ |
| C11 | 9.5081 × 10$^{-6}$ | 0.0000 | −3.0453 × 10$^{-6}$ | 8.4450 × 10$^{-6}$ | −1.5904 × 10$^{-6}$ | −4.5466 × 10$^{-6}$ |
| C13 | 8.9905 × 10$^{-6}$ | 0.0000 | −3.2328 × 10$^{-6}$ | 8.0447 × 10$^{-6}$ | −1.2389 × 10$^{-6}$ | −4.7765 × 10$^{-6}$ |
| C15 | 2.3001 × 10$^{-6}$ | 0.0000 | −8.8762 × 10$^{-7}$ | 1.9921 × 10$^{-6}$ | −2.5879 × 10$^{-7}$ | −1.2345 × 10$^{-6}$ |

-continued

DC[1]

| X | 0 | Y | 0 | Z | 0 |
|---|---|---|---|---|---|
| α | −45 | β | 0 | γ | 0 |

Figure 6:
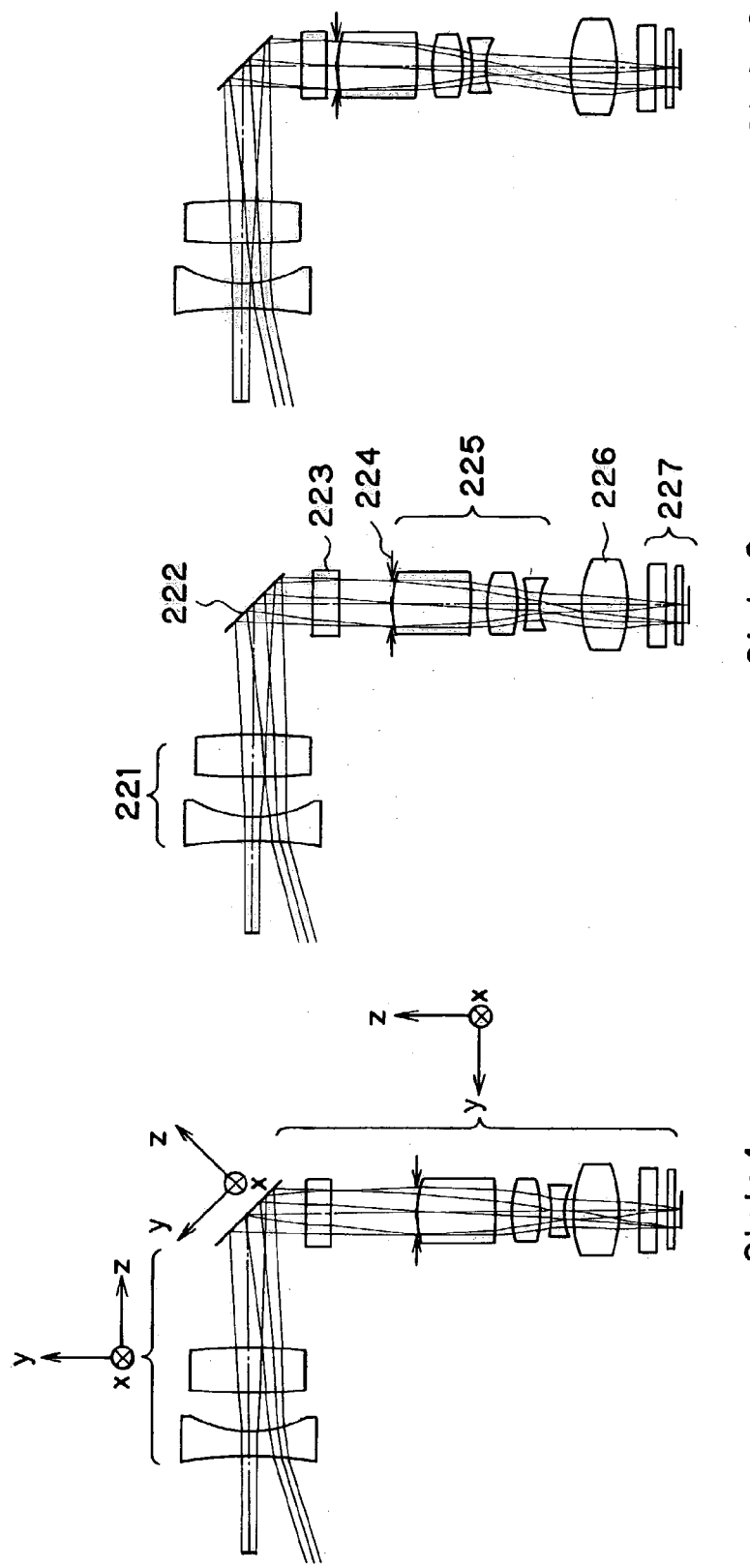
FIG. 6 is illustrative in section of Embodiment 6 of the invention.

As shown in FIG. 6, Embodiment 6 is directed to a 1.4:1 power zoom image pickup optical system used with digital cameras, TV cameras, etc.

The instant optical system is generally of the retrofocus type composed of a lens group 221 having negative power, a variable mirror 222, a lens group 223 having positive power, an aperture stop 224, a lens group 225 having positive power, a lens group 226 having positive power and an IR cut filter/moiré removal filter 227. The lens group 225 having positive power is a variator that moves along the optical axis of the optical system (along the z-axis direction in FIG. 6) for zooming.

The variable mirror 222 has a combined compensator and focusing lens function, and transforms to compensate for a shift of the focus position in association with zooming and a focus shift in association with a change in the object distance. This variable mirror assumes a planar shape at an object distance ∞ and in the standard zooming state, and a free-form surface shape in otherwise states.

In the instant embodiment, the lens group 223 having positive refracting power is composed of one lens, and so is smaller in the number of lenses than the lens group 213 having positive refracting power, used in Embodiment 5. Thus, further cost reductions are achievable.

Shown in FIG. 6 are ray diagrams for the optical system typically at an object distance ∞ and in zooming states at the wide-angle end, in the standard state and at the telephoto end, respectively. The coordinate system shown in FIG. 6 is common to the respective states; however, care must be taken of the fact that another coordinate system is used on the image side of the optical system with respect to the variable mirror 222, a further coordinate is used for the variable mirror 222, and a further coordinate system is used on the image side of the optical system with respect to the variable mirror 222.

Embodiment 7

|  | OD | ZO | Fno. | FD | DAV |
|---|---|---|---|---|---|
| State 1 | ∞ | WD | 3.416 | 4.613 | 57.7° |
| State 2 | ∞ | SD | 3.859 | 5.452 | 48.8° |
| State 3 | ∞ | TE | 4.415 | 6.703 | 39.8° |
| State 4 | 300 mm | WD | 3.393 | 4.613 |  |
| State 5 | 300 mm | SD | 3.839 | 5.452 |  |
| State 6 | 300 mm | TE | 4.394 | 6.703 |  |

Image pickup surface size 4 mm × 3 mm

| Sno | ROC | SS | DC | RI | Ano |
|---|---|---|---|---|---|
| OS | ∞ | (OD) |  |  |  |
| 1 | −28.7616 | 1.6339 |  | 1.72916 | 54.68 |
| 2 | ASP[1] | 5.017 |  |  |  |
| 3 | 54.6152 | 2.9255 |  | 1.497 | 81.54 |
| 4 | −49.9256 | 4.5 |  |  |  |
| 5 | FFS[1] (DM) | D1 = −12.1381~−10.03316~−7.33504 | DC[1] |  |  |
| 6 | Stop surface | −0.1297 |  |  |  |
| 7 | ASP[2] | −5.2993 |  | 1.58313 | 59.38 |
| 8 | 22.9382 | −1.1742 |  |  |  |
| 9 | −6.7237 | −2.2996 |  | 1.456 | 90.33 |
| 10 | 9.6725 | −0.8548 |  |  |  |
| 11 | 9.7133 | −1.0241 |  | 1.72151 | 29.23 |
| 12 | −3.9774 | D2 = −1.10099~−3.20589~−5.90401 |  |  |  |
| 13 | −11.478 | −2.244 |  | 1.603 | 65.44 |
| 14 | ASP[3] | −1.4865 |  |  |  |
| 15 | ∞ | −1.44 |  | 1.54771 | 62.84 |
| 16 | ∞ | −0.8 |  |  |  |
| 17 | ∞ | −0.6 |  | 1.51633 | 64.14 |
| 18 | ∞ | −0.5 |  |  |  |
| IP | ∞ |  |  |  |  |

ASP[1]

ROC   10.0576,   k   0.0000
a  $-4.0835 \times 10^{-4}$,  b  $4.3979 \times 10^{-6}$,  c  $-1.5633 \times 10^{-7}$,  d  $1.9974 \times 10^{-9}$,

ASP[2]

ROC   −9.1682,   k   0.0000
a  $3.4194 \times 10^{-4}$,  b  $2.4869 \times 10^{-9}$,  c  $9.8662 \times 10^{-7}$,  d  $-5.8064 \times 10^{-8}$, -continued

ASP[3]

| | ROC | | 7.7704, | k | | 0.0000 | |
|---|---|---|---|---|---|---|---|
| a | $-1.5911 \times 10^{-3}$, | b | $8.6440 \times 10^{-5}$, | c | $-7.3116 \times 10^{-6}$, | d | $2.9293 \times 10^{-7}$, |

FFS[1]

| | State 1 | State 2 | State 3 | State 4 | State 5 | State 6 |
|---|---|---|---|---|---|---|
| C4 | $-3.2829 \times 10^{-4}$ | 0.0000 | $-2.6321 \times 10^{-6}$ | $-6.0794 \times 10^{-4}$ | $-2.5035 \times 10^{-4}$ | $-2.8099 \times 10^{-4}$ |
| C6 | $-1.6462 \times 10^{-4}$ | 0.0000 | $-5.8132 \times 10^{-6}$ | $-3.0603 \times 10^{-4}$ | $-1.2764 \times 10^{-4}$ | $-1.4301 \times 10^{-4}$ |
| C8 | $-8.0161 \times 10^{-6}$ | 0.0000 | $1.3356 \times 10^{-6}$ | $-5.9070 \times 10^{-6}$ | $2.6211 \times 10^{-6}$ | $3.7096 \times 10^{-6}$ |
| C10 | $-3.1928 \times 10^{-6}$ | 0.0000 | $1.6332 \times 10^{-7}$ | $-2.6085 \times 10^{-6}$ | $2.7854 \times 10^{-7}$ | $-8.1693 \times 10^{-7}$ |
| C11 | $1.1826 \times 10^{-5}$ | 0.0000 | $-4.6352 \times 10^{-6}$ | $1.1156 \times 10^{-5}$ | $-1.8158 \times 10^{-6}$ | $-6.0249 \times 10^{-6}$ |
| C13 | $1.1056 \times 10^{-5}$ | 0.0000 | $-4.1022 \times 10^{-6}$ | $1.0686 \times 10^{-5}$ | $-1.3540 \times 10^{-6}$ | $-5.7482 \times 10^{-6}$ |
| C15 | $2.8228 \times 10^{-6}$ | 0.0000 | $-1.0533 \times 10^{-6}$ | $2.5287 \times 10^{-6}$ | $-5.8769 \times 10^{-7}$ | $-1.5497 \times 10^{-6}$ |

DC[1]

| X | 0 | Y | 0 | Z | 0 |
|---|---|---|---|---|---|
| α | $-45$ | β | 0 | γ | 0 |

Figure 7:
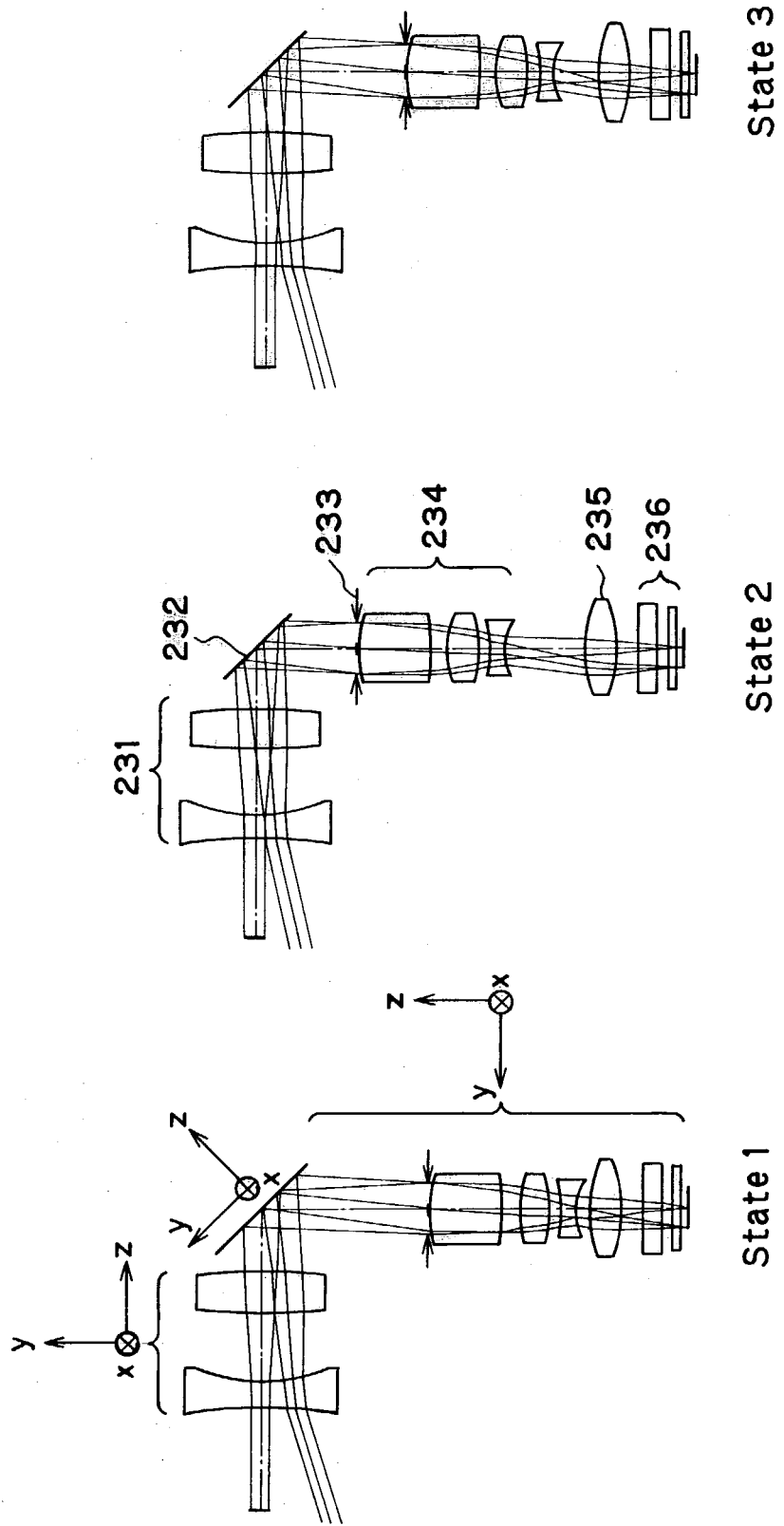
FIG. 7 is illustrative in section of Embodiment 7 of the invention.

As shown in FIG. 7, Embodiment 7 is directed to a 1.4:1 power zoom image pickup optical system used with digital cameras, TV cameras, etc.

The instant optical system is generally of the retrofocus type composed of a lens group 231 having negative power, a variable mirror 232, an aperture stop 233, a lens group 234 having positive power, a lens group 235 having positive power and an IR cut filter/moiré removal filter 236. The lens group 234 having positive power is a variator that moves along the optical axis of the optical system (along the z-axis direction in FIG. 7) for zooming.

The variable mirror 232 has a combined compensator and focusing lens function, and transforms to compensate for a shift of the focus position in association with zooming and a focus shift in association with a change in the object distance. This variable mirror assumes a planar shape at an object distance ∞ and in the standard zooming state, and a free-form surface shape in otherwise states.

In the instant embodiment, there is no lens group having positive power, which corresponds to the lens group 213 having positive power in Embodiment 5 and the lens group 223 having positive power in Embodiment 6. This can just only reduce the number of lenses and achieve cost reductions but also enlarge the range of movement of the variator, i.e., the lens group 234 having positive power. It is thus possible to obtain an optical system having a high zoom ratio.

Shown in FIG. 7 are ray diagrams for the optical system typically at an object distance ∞ and in zooming states at the wide-angle end, in the standard state and at the telephoto end, respectively. The coordinate system shown in FIG. 7 is common to the respective states; however, care must be taken of the fact that another coordinate system is used on the image side of the optical system with respect to the variable mirror 232, a further coordinate is used for the variable mirror 232, and a further coordinate system is used on the image side of the optical system with respect to the variable mirror 232.

Embodiment 8

| | OD | ZO | Fno. | FD |
|---|---|---|---|---|
| State 1 | ∞ | WD | 5.0000 | 9.04749 |
| State 2 | ∞ | SD | 3.8000 | 7.01436 |
| State 3 | ∞ | TE | 2.8000 | 5.08010 |

Image pickup surface size X 4 mm × Y 3 mm
Px = Py = 5 μm

| Sno | ROC | SS | DC | RI | Ano |
|---|---|---|---|---|---|
| OS | ∞ | (OD) | | | |
| 1 | ∞ | 0.0000 | | | |
| 2 | 35.1214 | 1.0000 | | 1.78472 | 25.68 |
| 3 | 167.8232 | 1.0000 | | | |
| 4 | 130.3582 | 0.2969 | | 1.51633 | 64.14 |
| 5 | ASP[1] | 18.7302 | | | |
| 6 | FFS[1] (DM) | $-4.3019$ | DC[1] | | |
| 7 | ∞ | 0.0000 | | | |
| 8 | $-7.7555$ | $-2.3000$ | | 1.58913 | 61.14 |
| 9 | 32.1532 | $-0.1123$ | | | |
| | Stop surface | | | | |
| 10 | 1000.0000 | $-0.1000$ | | | |
| 11 | 1000.0000 | D1 = $-4.25292\sim-2.62378\sim-1.01260$ | | | |

-continued

| | | | | |
|---|---|---|---|---|
| 12 | ∞ | −0.7833 | | |
| 13 | ASP[2] | −0.1000 | | |
| 14 | 1000.0000 | −0.1000 | | |
| 15 | 5.7308 | −0.6694 | 1.84666 | 23.78 |
| 16 | −15.1681 | −0.2586 | | |
| 17 | 1000.0000 | −0.1000 | | |
| 18 | ASP[3] | D2 = 0.24107~−1.36283~−2.96276 | | |
| 19 | −15.3016 | −2.0000 | 1.69680 | 55.53 |
| 20 | 13.8966 | −0.3000 | | |
| 21 | −8.9786 | −5.3922 | 1.58913 | 61.14 |
| 22 | ASP[4] | −0.6387 | | |
| 23 | 49.9212 | −1.0000 | 1.51633 | 64.14 |
| 24 | −69.5147 | −1.1964 | | |
| 25 | ∞ | −1.4400 | 1.54771 | 62.84 |
| 26 | ∞ | −0.1000 | | |
| 27 | ∞ | −0.6000 | 1.51633 | 64.14 |
| 28 | ∞ | −2.1000 | | |
| IP | ∞ | | | |

ASP[1]

| | ROC | | 11.4689, | k | 0 | | |
|---|---|---|---|---|---|---|---|
| a | $-1.4142 \times 10^{-4}$, | b | $1.4501 \times 10^{-7}$, | c | $1.0445 \times 10^{-8}$, | d | $-4.0703 \times 10^{-13}$, |

ASP[2]

| ROC | 1000.0000, | k | 0 |
|---|---|---|---|

ASP[3]

| ROC | 1000.0000, | k | 0 |
|---|---|---|---|

ASP[4]

| | ROC | | 11.0623, | k | 0 | | |
|---|---|---|---|---|---|---|---|
| a | $-2.8728 \times 10^{-3}$, | b | $1.4022 \times 10^{-4}$, | c | $-3.9838 \times 10^{-6}$, | d | $3.4424 \times 10^{-10}$, |

FFS[1]

| ROC | ∞, | k | 0 |
|---|---|---|---|

| | State 1 | State 2 | State 3 |
|---|---|---|---|
| C4 | $1.6713 \times 10^{-3}$ | 0.0000 | $-7.2848 \times 10^{-4}$ |
| C6 | $1.0083 \times 10^{-3}$ | 0.0000 | $-8.1095 \times 10^{-4}$ |
| C8 | $-1.1132 \times 10^{-4}$ | 0.0000 | $3.4637 \times 10^{-5}$ |
| C10 | $-1.8948 \times 10^{-5}$ | 0.0000 | $2.3972 \times 10^{-6}$ |
| C11 | $8.9426 \times 10^{-5}$ | 0.0000 | $-4.4633 \times 10^{-5}$ |
| C13 | $3.1405 \times 10^{-5}$ | 0.0000 | $4.9175 \times 10^{-5}$ |
| C15 | $1.8300 \times 10^{-5}$ | 0.0000 | $-9.5845 \times 10^{-6}$ |

DC[1]

| X | 0.00 | Y | 0.00 | Z | 0.00 |
|---|---|---|---|---|---|
| α | −45.00 | β | 0.00 | γ | 0.00 |

FIG. 8 is illustrative in section of Embodiment 8. Reference numeral 305 is a first lens group, 306 a second lens group, 307 a third lens group, and 311 a fourth lens group. In the instant embodiment, a concave lens 307 formed of the 15th and 16th surfaces is moved for zooming at a zoom ratio of 1.8. The 6th surface provides a variable mirror that is transformed to cause focus movement in association with zooming and focus movement in association with a change in the object distance. A merit of this embodiment wherein zooming is performed with the concave lens 307 is that large zooming is achievable in a smaller amount of movement of the lens as compared with the case where zooming is performed with the positive lens.

Embodiment 9

| | OD | ZO | Fno. | FD |
|---|---|---|---|---|
| State 1 | ∞ | TE | 5.0000 | 8.15692 |
| State 2 | ∞ | SD | 3.8000 | 6.89107 |
| State 3 | ∞ | WD | 2.8000 | 4.52486 |
| State 5 | 300 mm | SD | 3.8000 | 6.89107 |

Image pickup surface size X 4 mm × Y 3 mm

Px = Py = 5 μm

-continued

| Sno | ROC | SS | DC | RI | Ano |
|-----|-----|-----|-----|-----|-----|
| OS | ∞ | (OD) | | | |
| 1 | ∞ | 0.0000 | | | |
| 2 | −303.0641 | 0.7000 | | 1.51633 | 64.14 |
| 3 | 9.2736 | 1.0000 | | | |
| 4 | 20.6261 | 1.2000 | | 1.78472 | 25.68 |
| 5 | ASP[1] | 7.0000 | | | |
| 6 | FFS[1] (DM) | −7.2293 | DC[1] | | |
| 7 | ∞ | 0.0000 | | | |
| 8 | −6.7720 | −2.3000 | | 1.58913 | 61.14 |
| 9 | 70.7255 | −0.0225 | | | |
|   | Stop surface | | | | |
| 10 | ∞ | −0.1000 | | | |
| 11 | ∞ | D1 = −2.74171~−1.85566~−0.13614 | | | |
| 12 | ∞ | −0.7833 | | | |
| 13 | ASP[2] | −1.0000 | | 1.69680 | 55.53 |
| 14 | 189.1667 | −0.4000 | | | |
| 15 | 4.6448 | −1.2571 | | 1.84666 | 23.78 |
| 16 | −22.3831 | −0.1403 | | | |
| 17 | ∞ | −0.1000 | | | |
| 18 | ASP[3] | D2 = −0.29533~−1.23656~−3.19451 | | | |
| 19 | −14.4658 | −2.0000 | | 1.69680 | 55.53 |
| 20 | 9.9717 | −0.3000 | | | |
| 21 | −9.2901 | −3.5540 | | 1.58913 | 61.14 |
| 22 | ASP[4] | −0.3626 | | | |
| 23 | 107.3171 | −0.8865 | | 1.51633 | 64.14 |
| 24 | −291.5336 | −0.6489 | | | |
| 25 | ∞ | −1.4400 | | 1.54771 | 62.84 |
| 26 | ∞ | −0.1000 | | | |
| 27 | ∞ | −0.6000 | | 1.51633 | 64.14 |
| 28 | ∞ | −2.1000 | | | |
| IP | ∞ | | | | |

ASP[1]

|   | ROC | 342.4201 | k | | 0 | |
|---|-----|----------|---|---|---|---|
| a | −9.1895 × 10⁻⁵ | b | 5.4102 × 10⁻⁷ | c | −2.4185 × 10⁻⁸ | d | −2.3500 × 10⁻¹¹ |

ASP[2]

ROC   −186.8247   k   0

ASP[3]

ROC   ∞   k   0

ASP[4]

|   | ROC | 9.1729 | k | | 0 | |
|---|-----|--------|---|---|---|---|
| a | −3.2236 × 10⁻³ | b | 1.6799 × 10⁻⁴ | c | −5.5687 × 10⁻⁶ | d | 5.0927 × 10⁻¹⁰ |

FFS[1]

ROC   ∞   k   0

|     | State 1 | State 2 | State 3 | State 5 |
|-----|---------|---------|---------|---------|
| C4  | 2.2386 × 10⁻³ | 1.5000 × 10⁻³ | 5.5152 × 10⁻⁴ | 4.7137 × 10⁻⁴ |
| C6  | 1.4954 × 10⁻³ | 1.0000 × 10⁻³ | 3.2716 × 10⁻⁴ | 3.3428 × 10⁻⁴ |
| C8  | −5.4914 × 10⁻⁵ | 0.0000 | −7.2448 × 10⁻⁶ | 2.5619 × 10⁻⁵ |
| C10 | −8.2461 × 10⁻⁷ | 0.0000 | 1.7986 × 10⁻⁶ | 6.2461 × 10⁻⁶ |
| C11 | 1.0352 × 10⁻⁵ | 0.0000 | 1.1053 × 10⁻⁷ | −2.7914 × 10⁻⁵ |
| C13 | −3.9167 × 10⁻⁵ | 0.0000 | −5.9980 × 10⁻⁶ | 1.2558 × 10⁻⁵ |
| C15 | −1.2899 × 10⁻⁷ | 0.0000 | −3.8539 × 10⁻⁷ | −1.2580 × 10⁻⁵ |

DC[1]

| X | 0.00 | Y | 0.00 | Z | 0.00 |
|---|------|---|------|---|------|
| α | −45.00 | β | 0.00 | γ | 0.00 |

Figure 9:
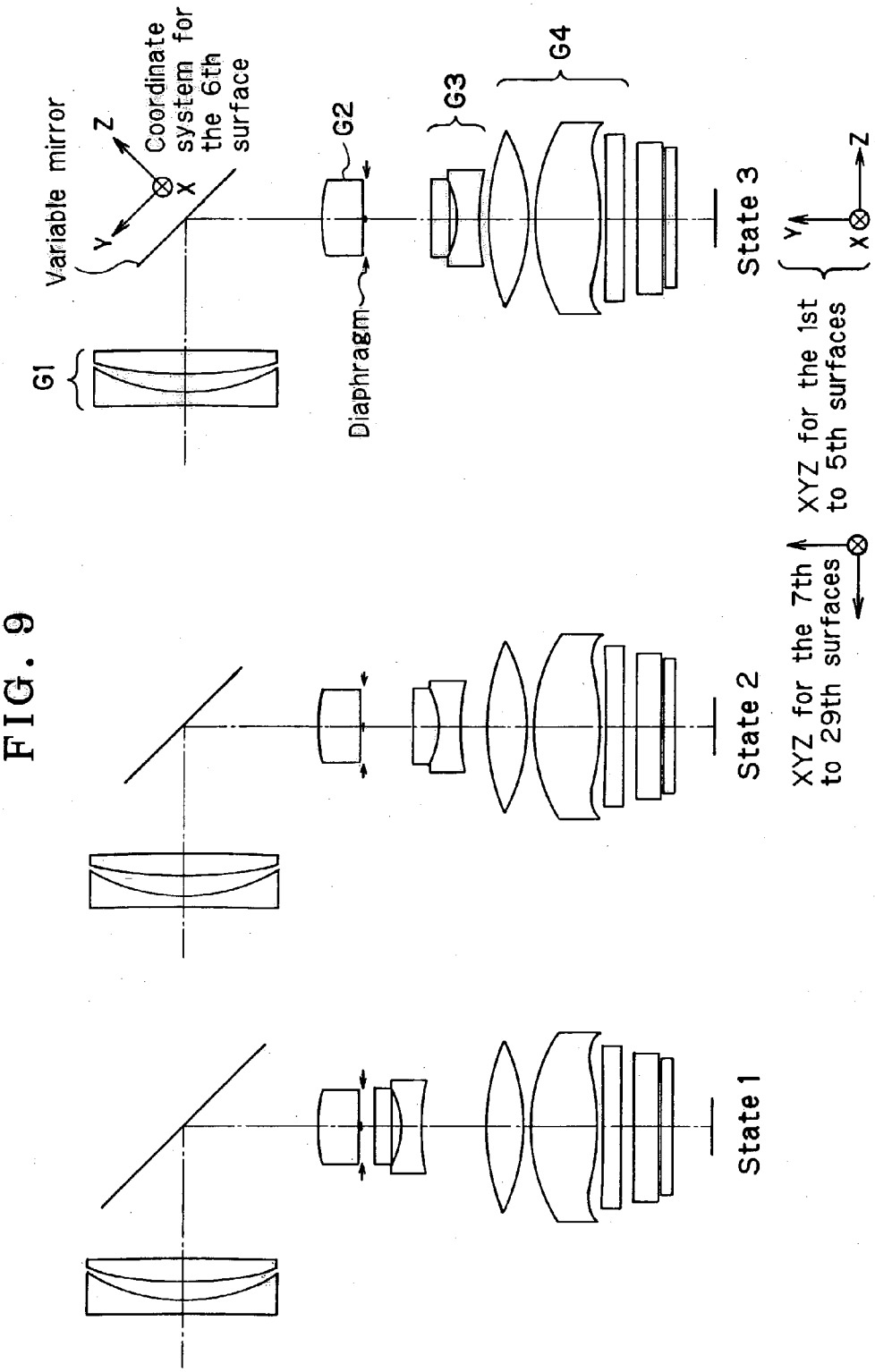
FIG. 9 is illustrative in section of Embodiment 9 of the invention.

FIG. 9 is illustrative in section of Embodiment 9. This embodiment is directed to a 1.8:1 power zoom lens wherein a third lens group G3 defined by the 13th to 16th surfaces and having negative refracting power is moved for zooming. The third lens group G3 is composed of two lenses, i.e., a lens having negative refracting power and a lens having positive refracting power, thereby improving on aberrations.

The first and second lenses in the third lens group G3 have negative refracting power and positive refracting power, respectively, so that the distance as far as the 6th surface or the variable mirror can be shortened thereby achieving an optical system that is thinner than that of Embodiment 8.

The 6th surface provides the variable mirror that is transformed to cause focus movement in association with zooming and focus movement in association with a change in the object distance. A merit of this embodiment wherein zooming is performed with the concave lens is that large zooming is achievable in a smaller amount of movement of the lens as compared with the case where zooming is performed with the positive lens.

In Embodiment 8 or 9, the lens group having negative refracting power is designed as the zooming group. In this case, however, the whole arrangement composed of the first lens group G1, the variable mirror and the second lens group G2 has generally positive power, creating a virtual object point with respect to the third lens group G3 having negative power. This ensures effective zooming with the zooming group having negative power.

Embodiment 10

|  | OD | ZO | Fno. | FD |
|---|---|---|---|---|
| State 1 | ∞ | TE | 3.9000 | 8.23940 |
| State 2 | ∞ | SD | 3.2000 | 6.41384 |
| State 3 | ∞ | WD | 2.8000 | 5.47790 |
| State 5 | 300 mm | SD | 3.2000 | 6.41384 |

Image pickup surface size X 4 mm × Y 3 mm
Px = Py = 2.5 μm k = 2.0

| Sno | ROC | SS | DC | RI | Ano |
|---|---|---|---|---|---|
| SS | ∞ | (OD) | | | |
| 1 | ∞ | 0.0000 | | | |
| 2 | −504.0444 | 0.7000 | | 1.51633 | 64.14 |
| 3 | 8.6811 | 1.0000 | | | |
| 4 | 20.3265 | 1.2000 | | 1.78472 | 25.68 |
| 5 | ASP[1] | 7.0000 | | | |
| 6 | FFS[1] (DM) | −4.0000 | DC[1] | | |
| 7 | ∞ | −2.2293 | | | |
| 8 | ∞ | D1 = 1.20003~0.21911~−0.43913 | | | |
| 9 | ∞ | −1.0000 | | | |
| 10 | −9.4331 | −2.3000 | | 1.58913 | 61.14 |
| 11 | 222.2495 | −1.0000 | | | |
|  | Stop surface | | | | |
| 12 | ∞ | D2 = −1.20003~−0.21911~0.43913 | | | |
| 13 | ∞ | −0.6475 | | | |
| 14 | ∞ | −1.0000 | | | |
| 15 | ASP[2] | −1.0000 | | 1.69680 | 55.53 |
| 16 | 2905.0515 | −0.4000 | | | |
| 17 | 4.9561 | −0.1711 | | 1.84666 | 23.78 |
| 18 | −32.876 | −0.0972 | | | |
| 19 | ∞ | −0.3953 | | | |
| 20 | ASP[3] | D3 = 1.20003~0.21911~−0.43913 | | | |
| 21 | ∞ | −1.0000 | | | |
| 22 | −11.9555 | −2.0000 | | 1.69680 | 55.53 |
| 23 | 11.2189 | −0.3000 | | | |
| 24 | −6.4379 | −4.2823 | | 1.58913 | 61.14 |
| 25 | ASP[4] | −1.5598 | | | |
| 26 | ∞ | D4 = −1.20003~−0.21911~0.43913 | | | |
| 27 | ∞ | −0.9296 | | | |
| 28 | ∞ | −1.4400 | | 1.54771 | 62.84 |
| 29 | ∞ | −0.1000 | | | |
| 30 | ∞ | −0.6000 | | 1.51633 | 64.14 |
| 31 | ∞ | −2.1000 | | | |
| IP | ∞ | | | | |

ASP[1]

ROC 419.2460  k  0
a  −9.4595 × 10$^{-5}$  b  7.2229 × 10$^{-7}$  c  −2.5763 × 10$^{-8}$  d  −1.0490 × 10$^{-10}$

ASP[2]

ROD  −1848.9723  k  0

ASP[3]

ROC  ∞  k  0

ASP[4]

ROC  23.0340  k  0
a  −2.5469 × 10$^{-3}$  b  3.9717 × 10$^{-5}$  c  −4.6619 × 10$^{-6}$  d  1.1907 × 10$^{-8}$

FFS[1]

ROC  ∞  k  0

|  | State 1 | State 2 | State 3 | State 5 |
|---|---|---|---|---|
| C4 | 2.2824 × 10$^{-3}$ | 1.5000 × 10$^{-3}$ | 1.9335 × 10$^{-4}$ | 1.1794 × 10$^{-3}$ |
| C6 | 1.0312 × 10$^{-3}$ | 1.0000 × 10$^{-3}$ | 1.0345 × 10$^{-4}$ | 6.0055 × 10$^{-4}$ |
| C8 | 9.4653 × 10$^{-6}$ | 0.0000 | 7.2377 × 10$^{-6}$ | −2.1271 × 10$^{-5}$ |

-continued

|     |                            |        |                            |                            |
| --- | -------------------------- | ------ | -------------------------- | -------------------------- |
| C10 | $-1.2969 \times 10^{-5}$   | 0.0000 | $2.2733 \times 10^{-7}$    | $-6.3319 \times 10^{-6}$   |
| C11 | $-2.6948 \times 10^{-5}$   | 0.0000 | $-4.0076 \times 10^{-6}$   | $-6.459 \times 10^{-6}$    |
| C13 | $7.0776 \times 10^{-6}$    | 0.0000 | $-5.7967 \times 10^{-7}$   | $5.0297 \times 10^{-6}$    |
| C15 | $-1.0268 \times 10^{-6}$   | 0.0000 | $-9.5026 \times 10^{-7}$   | $-2.6466 \times 10^{-6}$   |

DC[1]

| X | 0.00   | Y | 0.00 | Z | 0.00 |
| - | ------ | - | ---- | - | ---- |
| α | −45.00 | β | 0.00 | γ | 0.00 |

Figure 10:
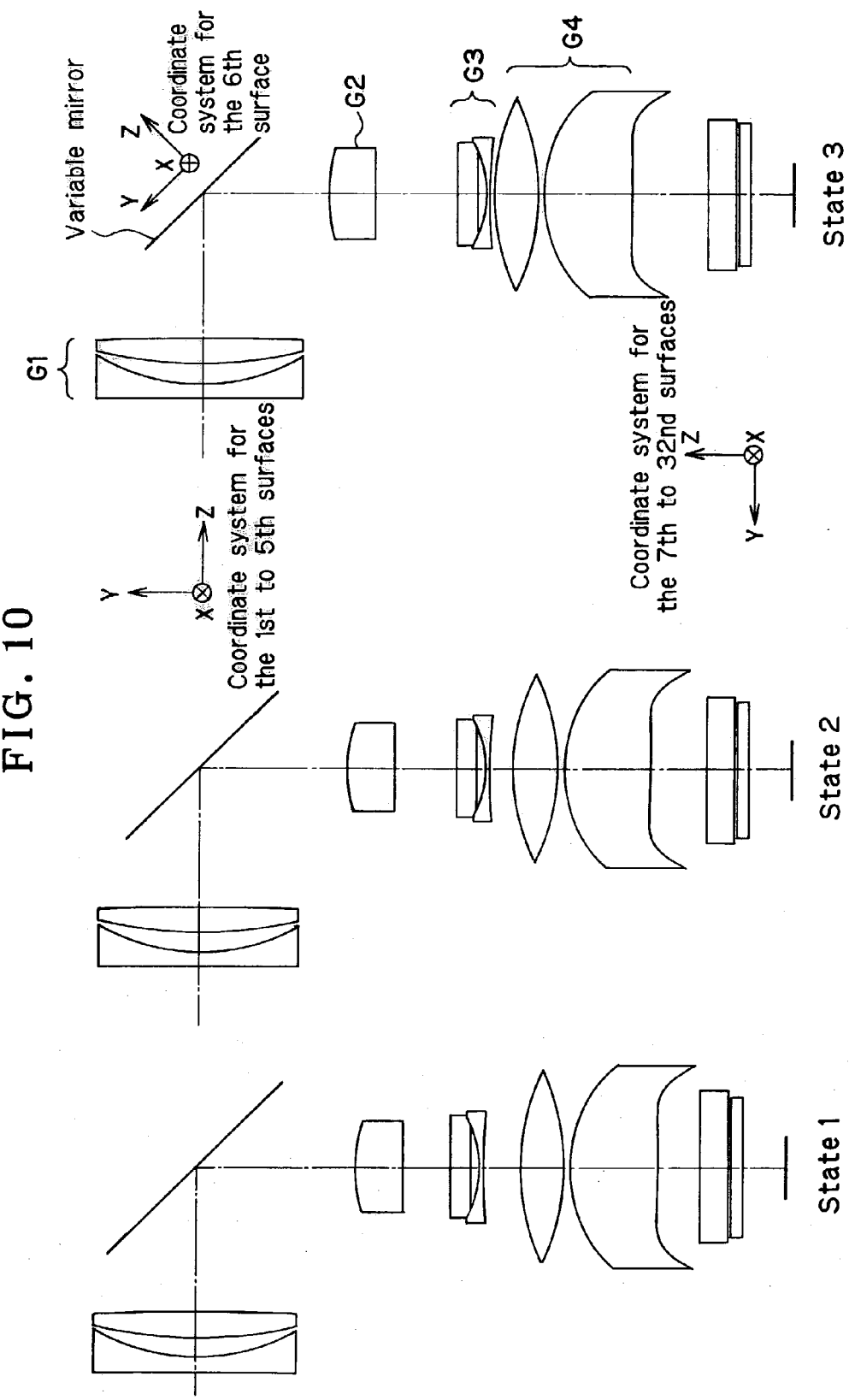
FIG. 10 is illustrative in section of Embodiment 10 of the invention.

FIG. 10 is illustrative in section of Embodiment 10. In this embodiment, the fixed 15th to 18th surfaces define together a third lens group G3. A second lens group G2 (composed of the 10th and 11th surfaces) before the third lens group G3 and a fourth lens group G4 (composed of the 22nd to 25th surfaces) after the third lens group G3 move constantly in the same amount of movement for zooming. In other words, the second G2 and the fourth lens group G4 are thought of as a mechanically integral unit. Then, the second G2 and the fourth lens group G4 have the same sign of power whereas the third lens group G3 has power of the opposite sign. To put it another way, if the third lens group G3 has negative power, then the second G2 and the fourth lens group G4 have positive power, and if the third lens group G3 has positive power, then the second G2 and the fourth lens group G4 have negative power.

In applications where a chief ray emerging from an image pickup system must be telecentric as in a solid-state image pickup device, it is preferable that the third lens group G3 has negative power whereas the second G2 and the fourth lens group G4 have positive power. This is because if the fourth lens group G4 has positive power, it is then easy to make the chief ray telecentric. Such a zoom lens type bears a resemblance to what is called an optical correcting zoom. According to the instant embodiment, however, focus movement in association with movement of the lens groups and focus movement in association with a change in the object distance are corrected with a variable mirror. It is then acceptable to make correction for either one of such focus movements.

Mertis of this embodiment wherein two lens groups work in the same manner are that any cam is unnecessary, cost reductions are achievable, and the amount of transformation of the variable mirror is reduced because the focus movement upon zooming can be reduced by a choice of power profile.

It is herein acceptable to design the third lens group G3 as a movable group. While the variable mirror is interposed between the first G1 and the second lens group G1, for instance, it is acceptable to locate the variable mirror after the fourth lens group G4.

When it comes to this type optical system, the variator is understood to refer to an optical element group having the highest rate of magnification change among optical element groups that move upon zooming. Referring to Embodiment 10, that variator is the fourth lens group G4. The fourth lens group G4 has a magnification changing from −9.976 to −0.78 upon zooming from the telephoto end to the wide-angle end whereas the second lens group G2 has a magnification changing from −0.325 to a bare −0.314 upon zooming from the telephoto end to the wide-angle end. Thus, the fourth lens group G4 is defined just only as mentioned above but also as a variator.

The conditions herein set forth so far hold true for this type optical system. As far as conditions 324 to 329 are concerned, however, the variator is understood to refer to a lens group approximate to a variable mirror among lens groups that move upon zooming.

Throughout the present disclosure the optical element group is understood to refer to a block comprising one or more optical elements. The lens group set forth in the embodiments may include an optical element or elements other than lenses.

For the optical system of the invention it is desired to meet the following condition (340):

$$0.3 < |f2/f| < 10 \tag{340}$$

where f2 is the focal length of a front optical element group among moving optical element groups. As the lower limit to $|f2/f|$ is not reached, aberrations increase, and as the upper limit is exceeded, the zooming action or the compensator function becomes insufficient. More preferably, $$0.6 < |f2/f| < 5 \tag{341}$$

Most preferably, $$1.1 < |f2/f| < 5 \tag{341-2}$$

For the optical system of the invention it is also desired to meet the following condition (342):

$$0.15 < |f3/f| < 6 \tag{342}$$

where f3 is the focal length of an optical element group sandwiched between moving optical element groups. As the lower limit to $|f3/f|$ is not reached, aberrations increase, and as the upper limit is exceeded, the zooming action combined with that of the moving optical element groups or the compensator function becomes insufficient. More preferably, $$0.25 < |f3/f| < 3 \tag{343}$$

Most preferably, $$0.35 < |f3/f| < 2.2 \tag{343-2}$$

For the optical system of the invention it is further desired to meet the following condition (344):

$$0.15 < |f4/f| < 7 \tag{344}$$

where f4 is the focal length of a rear optical element group among moving optical element groups. As the lower limit to $|f4/f|$ is not reached, aberrations increase, and as the upper limit is exceeded, the zooming action or the compensator function becomes insufficient. More preferably, $$0.25 < |f4/f| < 3 \tag{344-2}$$

Most preferably, $$0.4 < |f4/f| < 2 \tag{345}$$

Unless anything wrong occurs, conditions (340) to (345) may be applied to other embodiments of the invention.

Embodiment 11

|  | OD | ZO | Fno. | FD |
|---|---|---|---|---|
| State 1 | ∞ | TE | 4.5000 | 8.74026 |
| State 2 | ∞ | SD | 3.2000 | 6.42951 |
| State 3 | ∞ | WD | 2.8000 | 4.79958 |
| State 5 | 300 mm | SD | 3.2000 | 6.42951 |

Image pickup surface size X 4 mm × Y 3 mm
Px = Py = 2.5 μm  k = 2.1

| Sno | ROC | SS | DC | RI | Ano |
|---|---|---|---|---|---|
| OS | ∞ | (OD) | | | |
| 1 | ∞ | 0.0000 | | | |
| 2 | −964.7304 | 0.7000 | | 1.51633 | 64.14 |
| 3 | 9.5889 | 1.0000 | | | |
| 4 | 17.7453 | 1.2000 | | 1.78472 | 25.68 |
| 5 | ASP[1] | 7.0000 | | | |
| 6 | FFS[1] (DM) | −4.0000 | DC[1] | | |
| 7 | ∞ | −0.5000 | | | |
| 8 | ∞ | D1 = 1.68135~0.59966~−0.57528 | | | |
| 9 | ∞ | −1.0000 | | | |
| 10 | −10.4257 | −1.3000 | | 1.58913 | 61.14 |
| 11 | 388.0611 | −1.0000 | | | |
| 12 | ∞ | D2 = −1.68135~−0.59966~0.57528 | | | |
| 13 | ∞ | 0.0000 | | | |
| 14 | Stop surface | −1.0000 | | | |
| 15 | ASP[2] | −1.0000 | | 1.69680 | 55.53 |
| 16 | 14410 | −0.4000 | | | |
| 17 | 4.1865 | −0.1711 | | 1.84666 | 23.78 |
| 18 | −34.6352 | −0.0967 | | | |
| 19 | ∞ | −1.3953 | | | |
| 20 | ASP[3] | D3 = 1.68135~0.59966~−0.57528 | | | |
| 21 | ∞ | −1.0000 | | | |
| 22 | −15.1800 | −2.0000 | | 1.69680 | 55.53 |
| 23 | 9.5514 | −0.3000 | | | |
| 24 | −6.4630 | −4.8432 | | 1.58913 | 61.14 |
| 25 | ASP[4] | −1.2137 | | | |
| 26 | ∞ | D4 = −1.68135~−0.59966~0.57528 | | | |
| 27 | ∞ | −0.7234 | | | |
| 28 | ∞ | −1.4400 | | 1.54771 | 62.84 |
| 29 | ∞ | −0.1000 | | | |
| 30 | ∞ | −0.6000 | | 1.51633 | 64.14 |
| 31 | ∞ | −2.1000 | | | |
| IP | ∞ | | | | |

ASP[1]

ROC  559.6254  k  0
a  $-1.1630 \times 10^{-4}$  b  $8.6486 \times 10^{-7}$  c  $-1.4621 \times 10^{-8}$  d  $-1.0484 \times 10^{-10}$

ASP[2]

ROC  −9397.6126  k  0

ASP[3]

ROC  ∞  k  0

ASP[4]

ROC  16.8496  k  0
a  $-3.0683 \times 10^{-3}$  b  $7.9412 \times 10^{-5}$  c  $-6.1481 \times 10^{-6}$  d  $7.1383 \times 10^{-10}$

FFS[1]

ROC  ∞  k  0

|  | State 1 | State 2 | State 3 | State 5 |
|---|---|---|---|---|
| C4 | $-5.0000 \times 10^{-4}$ | $-6.2241 \times 10^{-4}$ | $-5.0000 \times 10^{-3}$ | $-1.7652 \times 10^{-3}$ |
| C6 | $-1.5288 \times 10^{-4}$ | $-3.4826 \times 10^{-4}$ | $-2.2850 \times 10^{-3}$ | $-8.0538 \times 10^{-4}$ |
| C8 | $2.1605 \times 10^{-5}$ | $4.2421 \times 10^{-11}$ | $5.9732 \times 10^{-5}$ | $4.6464 \times 10^{-5}$ |
| C10 | $-1.4053 \times 10^{-6}$ | $3.0300 \times 10^{-12}$ | $4.4807 \times 10^{-5}$ | $1.5296 \times 10^{-5}$ |
| C11 | $2.7287 \times 10^{-6}$ | $2.1366 \times 10^{-10}$ | $3.8387 \times 10^{-5}$ | $8.945 \times 10^{-6}$ |
| C13 | $9.4480 \times 10^{-7}$ | $7.2849 \times 10^{-11}$ | $2.0863 \times 10^{-5}$ | $9.2071 \times 10^{-6}$ |
| C15 | $-1.5247 \times 10^{-6}$ | $9.1322 \times 10^{-12}$ | $1.6418 \times 10^{-6}$ | $-1.7323 \times 10^{-6}$ |

-continued

| | | DC[1] | | | |
|---|---|---|---|---|---|
| X | 0.00 | Y | 0.00 | Z | 0.00 |
| α | −45.00 | β | 0.00 | γ | 0.00 |

Figure 11:
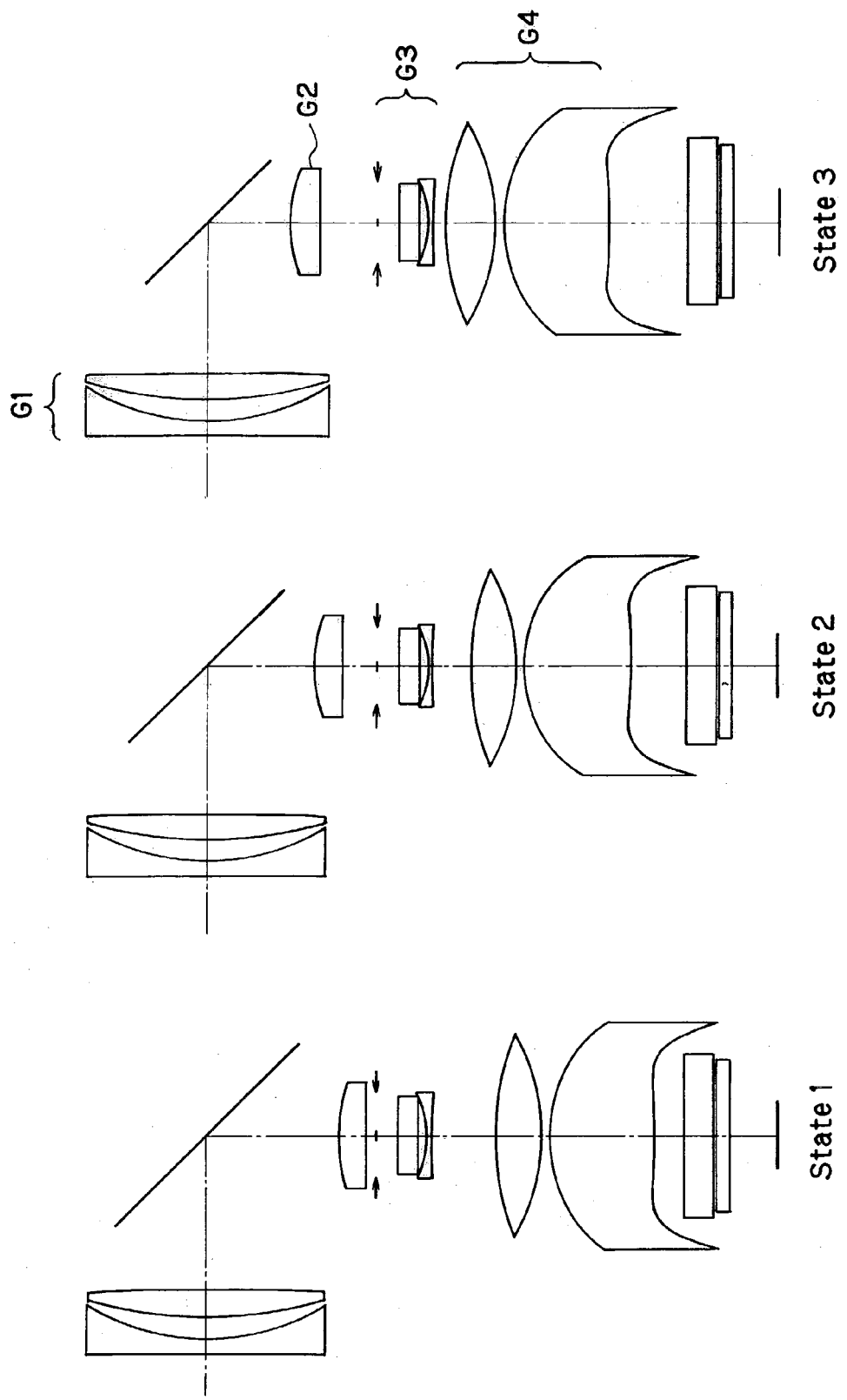
FIG. 11 is illustrative in section of Embodiment 11 of the invention.

FIG. 11 is illustrative in section of Embodiment 11. This embodiment is of the same type as that of Embodiment 10. A stop is fixed in the neighborhood of a third lens group G3 having negative power, which is a fixed group. Thus, a merit of the instant embodiment is that there is a limited fluctuation of the height of rays with zooming.

As in Embodiment 10, the respective conditions are satisfied.

The variable mirror assumes a concave surface in all phototaking states, and is designed in such a way as to be well fit for a static electricity driven mirror. The shape range of the variable mirror from a planar surface to a concave surface provides a margin for the contrast type autofocusing. In other words, this margin corresponds to the range from P2 to Q in FIG. 17.

For autofocusing at a near point, the variable mirror is transformed into a concave surface deeper than the surface of the variable mirror at a near point of 300 mm; that is, it provides a margin for autofocusing at a near point. This margin corresponds to the range from R to R2 in FIG. 17.

Commonly to the present disclosure, for a zoom lens having a relatively narrow angle of view it is acceptable to satisfy condition (347) in lieu of condition (316).

$$f1/f<0 \text{ or } f1/f>5 \tag{347}$$

This is because at a narrow angle of view, the height of light rays in an optical system can be kept low even when that optical system is not of the retrofocus type.

Embodiment 12

| | OD | ZO | Fno. | FD |
|---|---|---|---|---|
| State 1 | ∞ | TE | 4.5000 | 8.73317 |
| State 2 | ∞ | SD | 3.2000 | 6.27299 |
| State 3 | ∞ | WD | 2.8000 | 4.29905 |
| State 5 | 300 mm | SD | 3.2000 | 6.27299 |

Image pickup surface size X 4 mm × Y 3 mm
Px = Py = 2.5 μm  k = 2.5

| Sno | ROC | SS | DC | RI | Ano |
|---|---|---|---|---|---|
| OS | ∞ | (OD) | | | |
| 1 | ∞ | 0.0000 | | | |
| 2 | −482.8203 | 0.7000 | | 1.51633 | 64.14 |
| 3 | 6.3094 | 1.0000 | | | |
| 4 | 27.9840 | 1.2000 | | 1.78472 | 25.68 |
| 5 | ASP[1] | 5.0000 | | | |
| 6 | FFS[1] (DM) | −4.0000 | DC[1] | | |
| 7 | ∞ | −0.5000 | | | |
| 8 | ∞ | D1 = 2.93012~1.71055~0.01162 | | | |
| 9 | ∞ | −1.0000 | | | |
| 10 | −9.1491 | −1.3000 | | 1.58913 | 61.14 |
| 11 | 1065.1375 | −1.0000 | | | |
| 12 | ∞ | D2 = −2.93012~−1.71055~−0.01162 | | | |
| 13 | ∞ | 0.5000 | | | |
| 14 | Stop surface | −1.0000 | | | |
| 15 | ASP[2] | −1.0000 | | 1.69680 | 55.53 |
| 16 | 290700 | −0.4000 | | | |
| 17 | 5.8684 | −0.1711 | | 1.84666 | 23.78 |
| 18 | −80.3252 | −0.2000 | | | |
| 19 | ∞ | −1.8953 | | | |
| 20 | ASP[3] | D3 = 2.93012~1.71055~0.01162 | | | |
| 21 | ∞ | −1.0000 | | | |
| 22 | −15.1465 | −2.0000 | | 1.69680 | 55.53 |
| 23 | 10.5668 | −0.3000 | | | |
| 24 | −8.2373 | −4.3398 | | 1.58913 | 61.14 |
| 25 | ASP[4] | −2.0230 | | | |
| 26 | ∞ | D4 = −2.93012~−1.71055~−0.01162 | | | |
| 27 | ∞ | −1.2057 | | | |
| 28 | ∞ | −1.4400 | | 1.54771 | 62.84 |
| 29 | ∞ | −0.1000 | | | |
| 30 | ∞ | −0.6000 | | 1.51633 | 64.14 |
| 31 | ∞ | −2.1000 | | | |
| IP | ∞ | | | | |

ASP[1]

| | ROC | | 322.8961 | k | | 0 | |
|---|---|---|---|---|---|---|---|
| a | $-1.8286 \times 10^{-4}$ | b | $-4.7666 \times 10^{-6}$ | c | $-3.6610 \times 10^{-8}$ | d | $-1.0357 \times 10^{-9}$ |

-continued

ASP[2]

| | ROC | −125200 | k | 0 |

ASP[3]

| | ROC | ∞ | k | 0 |

ASP[4]

| | ROC | | 53.5355 | k | | 0 | |
|---|---|---|---|---|---|---|---|
| a | −2.0411 × 10⁻³ | b | 1.8960 × 10⁻⁴ | c | −2.1343 × 10⁻⁵ | d | 7.5729 × 10⁻⁷ |

FFS[1]

| | ROC | ∞ | k | 0 |

| | State 1 | State 2 | State 3 | State 5 |
|---|---|---|---|---|
| C4 | −1.0000 × 10⁻³ | 8.0649 × 10⁻⁴ | −1.0000 × 10⁻³ | 2.6458 × 10⁻⁴ |
| C6 | −3.8000 × 10⁻⁴ | 4.0553 × 10⁻⁴ | −3.5320 × 10⁻⁴ | 1.0179 × 10⁻⁴ |
| C8 | −6.5634 × 10⁻⁷ | 9.6342 × 10⁻⁶ | 8.1981 × 10⁻⁶ | 8.9472 × 10⁻⁶ |
| C10 | −3.2350 × 10⁻⁶ | 6.8916 × 10⁻⁶ | 1.4590 × 10⁻⁵ | 3.6633 × 10⁻⁶ |
| C11 | −8.6083 × 10⁻⁶ | −2.7438 × 10⁻⁵ | 3.6593 × 10⁻⁶ | −2.4821 × 10⁻⁵ |
| C13 | −9.4944 × 10⁻⁶ | −9.8705 × 10⁻⁶ | −1.0661 × 10⁻⁶ | −9.8971 × 10⁻⁷ |
| C15 | −8.2680 × 10⁻⁶ | −8.2617 × 10⁻⁶ | −1.2234 × 10⁻⁵ | −6.6129 × 10⁻⁶ |

DC[1]

| X | 0.00 | Y | 0.00 | Z | 0.00 |
|---|---|---|---|---|---|
| α | −45.00 | β | 0.00 | γ | 0.00 |

Figure 12:
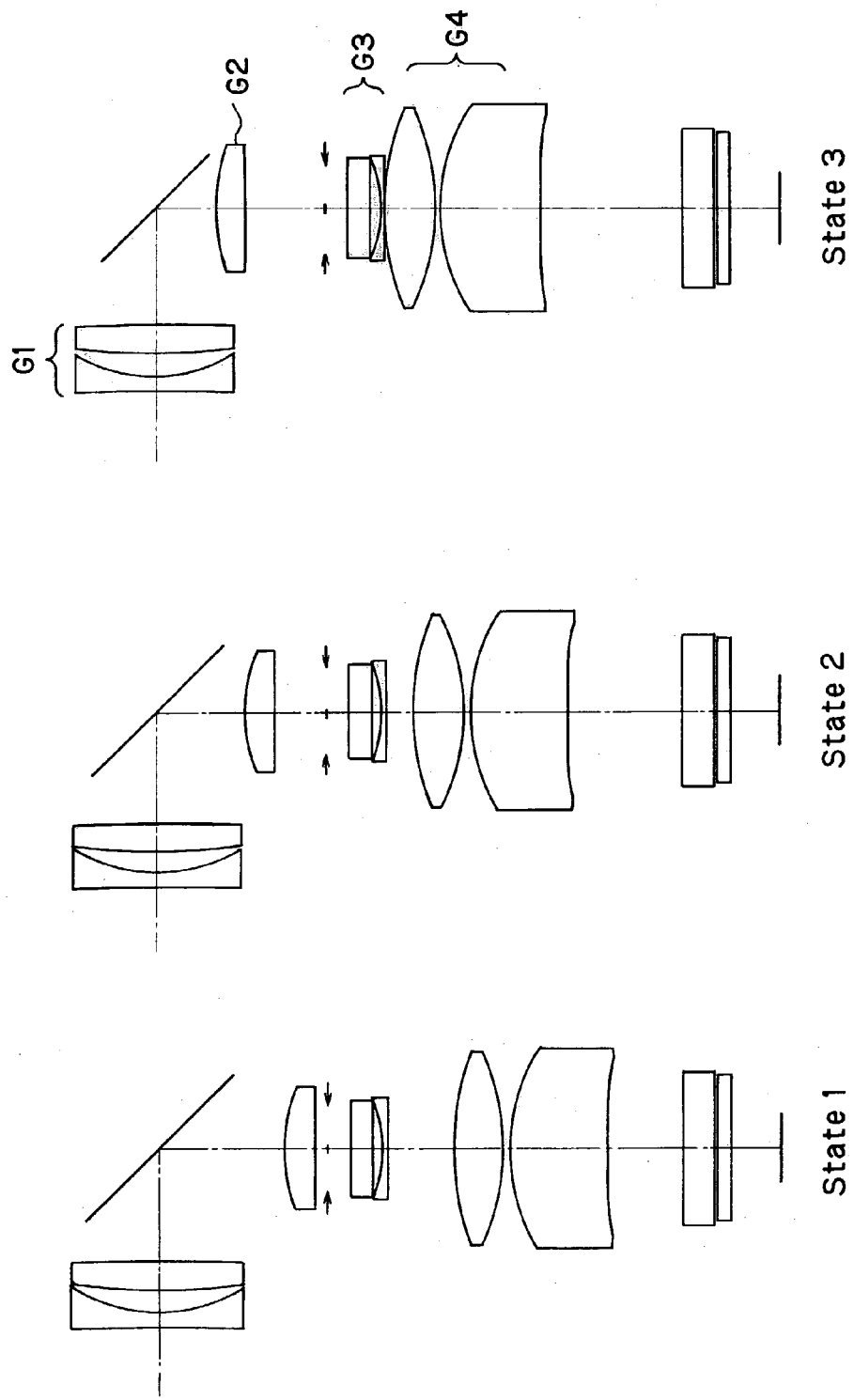
FIG. 12 is illustrative in section of Embodiment 12 of the invention.

FIG. 12 is illustrative in section of Embodiment 12. Although this embodiment, too, is of the same type as in Embodiments 10 and 11, the variable mirror is designed in such a way as to be transformed into both a concave surface and a convex surface for the purpose of reducing the amount of transformation.

The negative power of the first lens group G1 is strong enough for a wide-angle arrangement. This embodiment is well fit for compact digital cameras and card digital cameras because the distance from the variable mirror to the first lens is short.

Embodiment 13

| | OD | ZO | FD | DAV |
|---|---|---|---|---|
| State 1 | ∞ | WD | 4.2 | 61.53° |
| State 2 | ∞ | SD | 6.3 | 43.29° |
| State 3 | ∞ | TE | 8.4 | 33.15° |
| State 4 | 300 mm | WD | | |
| State 5 | 300 mm | SD | | |
| State 6 | 300 mm | TE | | |

Fno.: 2.82~3.52
Image pickup surface size: 4.4 mm × 3.3 mm

| Sno | ROC | SS | DC | RI | Ano |
|---|---|---|---|---|---|
| OS | ∞ | (OD) | | | |
| 1 | −14.36 | 1.00 | DC[1] | 1.7291 | 45.7 |
| 2 | ASP[1] | 6.45 | DC[1] | | |
| 3 | ∞ | 0.00 | | | |
| 4 | FFS[1] (DM) | 0.00 | DC[3] | | |
| 5 | ∞ | −3.80 | | | |
| 6 | −7.65 | −2.19 | | 1.6831 | 31.6 |
| 7 | −6.02 | −0.14 | | | |
| 8 | −8.31 | −2.00 | | 1.7453 | 41.7 |
| 9 | −16.30 | D1 = −7.11~−3.37~−0.12 | | | |
| 10 | Stop surface | −0.10 | | | |
| 11 | ASP[2] | −2.69 | DC[4] | 1.5821 | 62.5 |
| 12 | −31.78 | −1.38 | DC[4] | | |
| 13 | −5.27 | −2.44 | DC[5] | 1.4875 | 70.4 |
| 14 | 6.74 | −0.96 | DC[5] | | |
| 15 | 4.81 | −0.80 | | 1.7551 | 27.6 |
| 16 | ASP[3] | D2 = −0.58~−4.32~−7.57 | DC[6] | | |
| 17 | −9.41 | −2.61 | | 1.6001 | 61.4 |
| 18 | 6.52 | −0.20 | | | |
| 19 | 5.89 | −1.54 | | 1.7444 | 43.9 |
| 20 | ASP[4] | −0.10 | | | |

-continued

| | | | | | |
|---|---|---|---|---|---|
| 21 | ∞ | −1.44 | | 1.5477 | 62.8 |
| 22 | ∞ | −0.80 | | | |
| 23 | ∞ | −0.60 | | 1.5163 | 64.1 |
| 24 | ∞ | −0.50 | | | |
| IP | ∞ | 0.00 | DC[7] | | |

ASP[1]

| | ROC | | 9.74 | k | 0.0000 | | |
|---|---|---|---|---|---|---|---|
| a | $-6.2519 \times 10^{-4}$ | b | $1.2541 \times 10^{-5}$ | c | $-7.6432 \times 10^{-7}$ | d | $1.7319 \times 10^{-8}$ |

ASP[2]

| | ROC | | −6.60 | k | 0.0000 | | |
|---|---|---|---|---|---|---|---|
| a | $4.2068 \times 10^{-4}$ | b | $2.6754 \times 10^{-5}$ | c | $-3.3993 \times 10^{-6}$ | d | $5.4375 \times 10^{-7}$ |

ASP[3]

| | ROC | | −5.34 | k | 0.0000 | | |
|---|---|---|---|---|---|---|---|
| a | $-1.4669 \times 10^{-3}$ | b | $-2.5868 \times 10^{-5}$ | c | $2.4908 \times 10^{-5}$ | d | $-3.9721 \times 10^{-6}$ |

ASP[4]

| | ROC | | 5.62 | k | 0.0000 | | |
|---|---|---|---|---|---|---|---|
| a | $-2.9782 \times 10^{-3}$ | b | $1.2391 \times 10^{-4}$ | c | $-4.8542 \times 10^{-6}$ | d | $7.6341 \times 10^{-8}$ |

FFS[1]

| | State 1 | State 2 | State 3 | State 4 | State 5 | State 6 |
|---|---|---|---|---|---|---|
| C4 | $-7.5312 \times 10^{-4}$ | 0.0000 | $-3.4212 \times 10^{-4}$ | $-1.0695 \times 10^{-3}$ | $-3.0806 \times 10^{-4}$ | $-6.5191 \times 10^{-4}$ |
| C6 | $-3.7728 \times 10^{-4}$ | 0.0000 | $-1.7218 \times 10^{-4}$ | $-5.4546 \times 10^{-4}$ | $-1.5079 \times 10^{-4}$ | $-3.2651 \times 10^{-4}$ |
| C8 | $-1.3987 \times 10^{-5}$ | 0.0000 | $-7.6019 \times 10^{-6}$ | $-1.5925 \times 10^{-5}$ | $-6.6752 \times 10^{-6}$ | $-1.7035 \times 10^{-5}$ |
| C10 | $-5.6901 \times 10^{-6}$ | 0.0000 | $-3.6267 \times 10^{-6}$ | $-8.3321 \times 10^{-6}$ | $-2.9455 \times 10^{-6}$ | $-7.9035 \times 10^{-6}$ |
| C11 | $1.0628 \times 10^{-5}$ | 0.0000 | $9.5627 \times 10^{-7}$ | $1.4199 \times 10^{-5}$ | $1.1005 \times 10^{-6}$ | $4.3390 \times 10^{-7}$ |
| C13 | $1.0528 \times 10^{-5}$ | 0.0000 | $8.5460 \times 10^{-7}$ | $1.3836 \times 10^{-5}$ | $2.1106 \times 10^{-6}$ | $1.0298 \times 10^{-6}$ |
| C15 | $2.4609 \times 10^{-6}$ | 0.0000 | $2.2087 \times 10^{-7}$ | $2.9930 \times 10^{-6}$ | $-5.0391 \times 10^{-8}$ | $-1.4066 \times 10^{-7}$ |

DC[1]

| X | 0.00 | Y | 0.10 | Z | 0.00 |
|---|---|---|---|---|---|
| α | 0.00 | β | 0.00 | γ | 0.00 |

DC[3]

| X | 0.00 | Y | decy | Z | decz |
|---|---|---|---|---|---|
| α | 45 | β | 0.00 | γ | 0.00 |

| | State 1 | State 2 | State 3 | State 4 | State 5 | State 6 |
|---|---|---|---|---|---|---|
| decy | 0.009 | 0 | 0 | 0.008 | 0.002 | 0.001 |
| decz | 0.009 | 0 | 0 | 0.008 | 0.002 | 0.001 |

DC[4]

| X | 0.00 | Y | −0.02 | Z | 0.00 |
|---|---|---|---|---|---|
| α | 0.00 | β | 0.00 | γ | 0.00 |

DC[5]

| X | 0.00 | Y | −0.01 | Z | 0.00 |
|---|---|---|---|---|---|
| α | 0.00 | β | 0.00 | γ | 0.00 |

DC[6]

| X | 0.00 | Y | 0.00 | Z | 0.00 |
|---|---|---|---|---|---|
| α | 0.00 | β | 0.00 | γ | 0.00 |

DC[7]

| X | 0.00 | Y | 0.00 | Z | 0.00 |
|---|---|---|---|---|---|
| α | −1.86 | β | 0.00 | γ | 0.00 |

Figure 13:
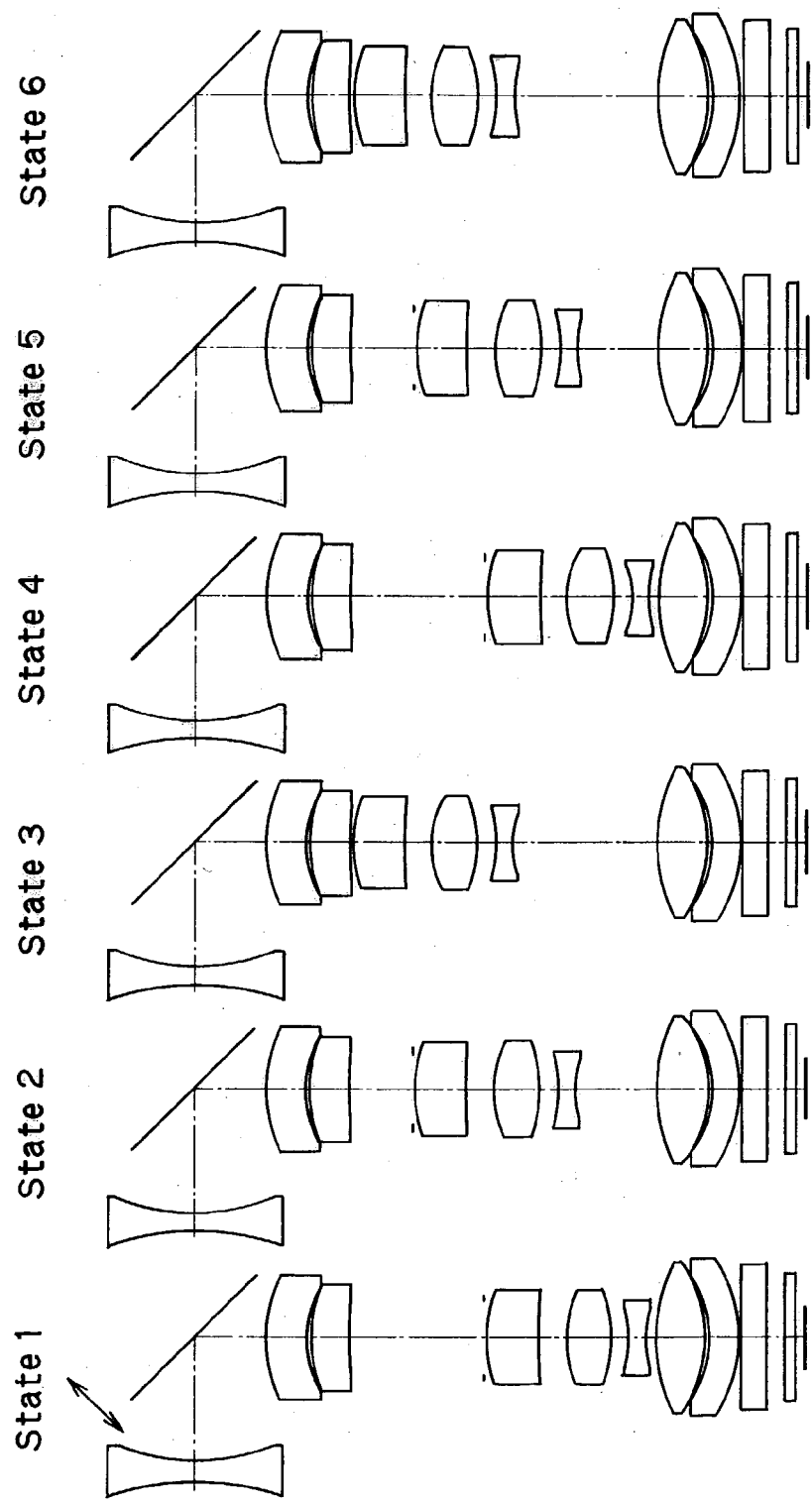
FIG. 13 is illustrative in section of Embodiment 13 of the invention.

As shown in FIG. 13, Embodiment 13 is directed to an optical system comprising a variable mirror, which is used with digital cameras.

This embodiment is much the same in construction as Embodiments 2 and 3 in that decentrations are added to lenses and an image pickup device. In the instance embodiment, however, simultaneously with transformation of the variable mirror, the variable mirror is translated in its entirety in the vertical direction to the reflecting surface of the variable mirror, thereby reducing aberrations produced by the variable mirror.

Upon zooming or focusing, the variable mirror is translated in its entirety simultaneously with transformation of the surface of the variable mirror, whereby aberrations that cannot be corrected by the transformation alone of the mirror surface can be reduced within a proper range.

It is then desired to meet the following condition:

$$0 < |x|/f < 1$$

where x is the maximum amount of translation of the whole variable mirror and f is the focal length of the optical system. As the upper limit is exceeded, it is difficult to ensure a space for the translation of the mirror. In addition, it is difficult to make the optical system compact.

Commonly to the present invention, only one requirement for the zoom optical system is to meet the conditions herein set forth in at least one zooming state. For the zoom optical system it is preferable that the zooming group has positive power because the lens arrangement can easily take on the retrofocus type that makes it easy to design a wide-angle arrangement. If the zooming group has negative power, some considerable zooming is achievable in a reduced amount of movement of the zooming group.

In what follows, the coordinate systems for the respective embodiments are defined.

Coordinate Systems for Embodiments 1–3 & 13

The Z-axis is defined by a direction coming out of the center of an object and vertical to an object plane. The Z-axis positive direction is defined by the direction of propagation of light rays incident on an optical system, a plane including the Z-axis and the center of the image plane is defined as the Y-Z plane, and the direction passing through the origin, intersecting at right angles with the Y-Z plane and going down through the paper is defined as the X-axis positive direction. An axis that forms a right-handed orthogonal coordinate system with the X-axis and Z-axis is defined as the Y-axis.

In these embodiments, each optical surface is decentered in the Y-Z plane, and only one symmetric plane for each rotationally asymmetric free-form surface is defined as the Y-Z plane.

Upon decentration, the origin of the coordinate system is defined as a point that is moved from the apex position of a k−1 surface by a surface spacing in the Z-axis direction, where k is the optical surface to be decentered.

The decentration surface is given by a shift of the apex position thereof from the origin of the coordinate system (X, Y and Z represent the X-axis, Y-axis and Z-axis directions, respectively) and tilts of the center axis thereof (the Z-axis of the aforesaid formula (a) for a free-form surface) with respect to the X-axis, Y-axis and Z-axis, respectively, ($\alpha$, $\beta$, $\gamma$ (°)). In that case, the positive sign for $\alpha$ and $\beta$ means counterclockwise rotation with respect to the positive direction of the X-axis and Y-axis and the positive sing for $\gamma$ means clockwise rotation with respect to the positive direction of the Z-axis.

Decentration takes place by way of detentering-and-returning. That is, when the k surface is already in a decentered state, the apex position of the k+1 surface is defined as a point that is moved from the apex position of the k surface before decentration by the surface spacing in the Z-axis direction.

Decentration is represented in the order of X shift, Y shift, Z shift, $\alpha$ tilt, $\beta$ tilt and $\gamma$ tilt. That is, the apex position of the surface to be decentered is first shifted by X, Y and Z in the X-, Y- and Z-axis directions. Then, that surface is tilted at an angle of rotation $\alpha$ around the X-axis, then at an angle of rotation $\beta$ around the Y-axis, and finally at an angle of rotation $\gamma$ around the Z-axis.

The decentration of the reflecting surface is represented as follows. Since all decentrations, take place within the Y-Z plane, the angle of rotation of the reflecting surface can simply be represented by way of the angle of rotation $\alpha$ around the X-axis. The angles $\beta$ and $\gamma$ are constantly zero. Consider here the case where the reflecting surface is rotated by $\alpha$. Then, the coordinate system for the optical system after light rays are reflected at the reflecting surface is defined by the coordinate system before reflection, which is rotated by $2\alpha$. At this time, care must be taken of the fact that between before and after reflection, the direction of propagation of an axial chief ray and the Z-axis positive direction of the optical system are reversed.

With regard to the sign of transformation of the mirror surface, assume now that the mirror surface is transformed into a free-form surface shape. When the power components C4 and C6 are positive, the mirror turns to a convex mirror, i.e., a mirror having negative power. Conversely, when the power components C4 and C6 are negative, the mirror turns to a concave mirror, i.e., a mirror having positive power.

Coordinate Systems for Embodiments 4–12

The same as mentioned above holds true for these embodiments with the exception that the positive sign of $\alpha$, $\beta$, and $\gamma$ means clockwise rotation with respect to the X-, Y- and Z-axis positive directions.

So far, the optical systems-each comprising the variable mirror have been explained. However, it is understood that the aforesaid conditions, limitations, etc. may be applied even to the cases where ordinary (invariable-shape) mirrors are used in place of the variable mirror unless anything wrong occurs. This is because the merit of reductions in the size of a bending optical system using the mirror is kept intact. It is technically easy to replace the variable mirror by an ordinary mirror because the variable mirror has weak power.

Such zoom optical systems of the invention as mentioned above, for instance, may be applied to film cameras, digital cameras, TV cameras, cameras for personal digital assistances, monitor cameras, robots' eyes, and electronic endoscopes.

While the present invention has been described in conjunction with the zoom optical systems of the type that includes a reflecting surface in the lens groups, it is understood that if a zoom optical system having no reflecting surface is set up using an optical element having a variable-shape surface, e.g., a variable-focus lens, advantages such as size reductions, cost reductions, low power consumptions and noiseless operations are then achievable. It is further acceptable to use a variable-focus mirror having no variable-shape surface in the aforesaid examples. One example of the variable-focus mirror will be described later with reference to FIG. 34.

Variable Optical Elements

Figure 19:
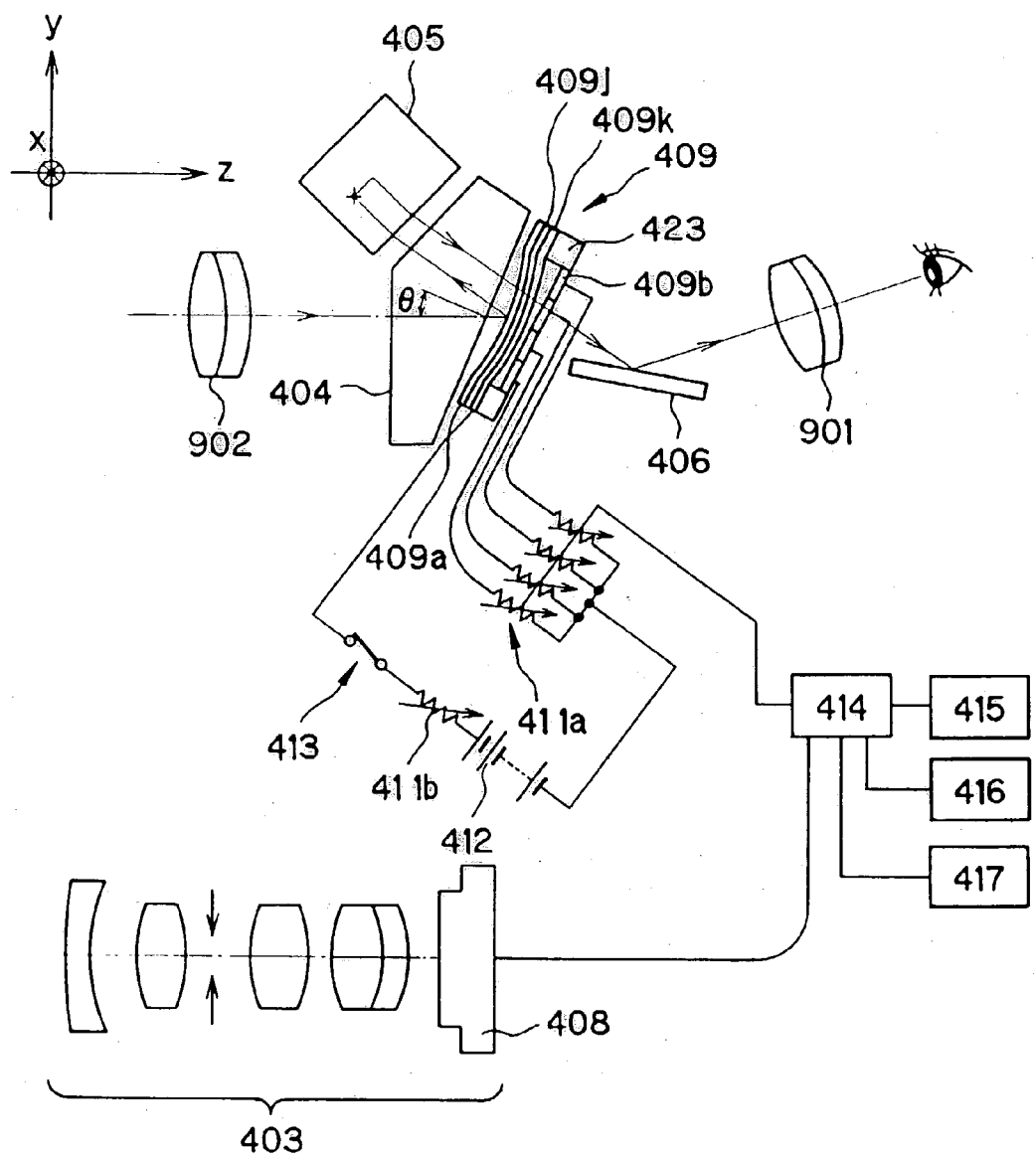
FIG. 19 is illustrative in schematic of one example wherein the variable-shape mirror is used in a viewing optical system used with the Keplerian finder of a digital camera, which is used as the optical apparatus of the invention.

FIG. 19 is illustrative in schematic of the Keplerian finder of a digital camera, in which the optical element having variable optical properties is used as a variable mirror applicable to the zoom optical system of the invention. It is understood that this example may be applied to a silver-halide film camera. First, the variable-shape mirror having variable optical properties, shown at 409, is explained.

The variable-shape mirror 409 having variable optical properties (hereinafter often called simply the variable-shape mirror) comprises a transforming layer of the triple-layer structure consisting of an electrode 409k, a transformable substrate 409j and a thin film (reflecting surface) 409a formed by coating aluminum on the substrate 409j and functioning as a reflecting surface. The transforming layer is supported on a supporting member 423, and on the lower side of the supporting member 423 there are provided a plurality of electrodes 409b spaced away from the electrode 409k. Reference numeral 411a represents a plurality of variable resistors connected to the respective electrodes 409*b*; 412 is a power source connected between the electrode 409*k* and the electrodes 409*b* via the variable resistors 411*a* and a power source switch 413; 414 is a computing unit for controlling the resistance values of a plurality of variable resistors 411*a*; and 415, 416 and 417 are a temperature sensor, a humidity sensor and a distance sensor connected to the computing unit 414, respectively. These components are located as shown to construct a single optical apparatus.

It is here noted that the respective surfaces of the objective lens 902, eyepiece lens 901, prism 404, isosceles right-angle prism 405, mirror 406 and variable-shape mirror 409 may be configured not only as planar surfaces but also as surfaces of many other shapes, e.g., spherical shape; rotationally symmetric aspheric shape; spherical shape, planar shape, and rotationally symmetric aspheric shape decentered with respect to the optical axis of the optical apparatus; aspheric shape having a symmetric surface; aspheric shape having only one symmetric surface; aspheric shape having no symmetric surface; free-form surface shape; and surface shape having an undifferentiable point or line. Moreover, these surfaces may be configured as reflecting or refracting surfaces. Moreover, any desired reflecting or refracting surface capable of producing some influences on light may be used in the invention. In what follows, these surfaces are generally called a "extended surface".

As is the case with such a membrane mirror as set forth typically in P. Rai-choudhury, Handbook of Micro-lithography, Micromachining and Microfabrication, Volume 2: Micromachining and Microfabrication, page 495, Fig. 8.58, SPIE PRESS, and Optics Communication, Volume 140 (1997) pp. 187–190, when voltages are applied between the electrodes 409*b* and the electrode 409*k*, the thin film 409*a* is transformed by electrostatic force so that its surface shape changes. This does not only enable focusing to be performed depending on the diopter of a viewer, but also can prevent transformation or refractive index changes due to temperature and humidity changes of lenses 901, 902 and/or prism 404, isosceles right-angle prism 405 and mirror 406 or deterioration in image-formation capabilities due to contraction and expansion and transformation of lens barrels and errors on assembling of parts such as optical elements and frames. It is thus possible to perform constantly proper focusing and make correction for aberrations resulting from focusing.

Figure 21:
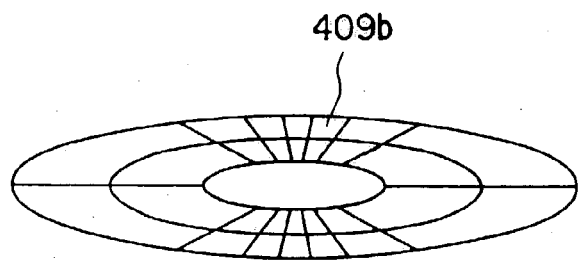
FIG. 21 is illustrative of one form of the electrode used with the variable-shape mirror 409 of FIG. 20.
Figure 22:
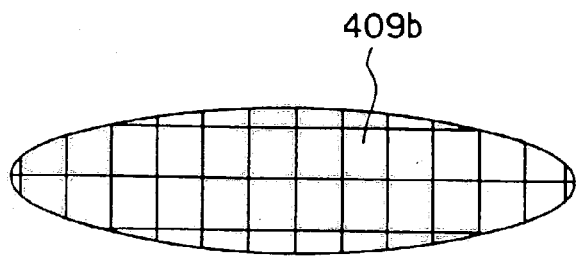
FIG. 22 is illustrative of another form of the electrode used with the variable-shape mirror of FIG. 20.

It is noted that the electrode array 409*b* may be concentrically or rectangularly divided as shown typically in FIGS. 21 and 22 depending on how to transform the thin film 409*a*.

When the aforesaid variable-shape mirror 409 is used, light from an object is refracted at the respective entrance and exit surfaces of objective lens 902 and prism 404, reflected at the variable-shape mirror 409 and further reflected at the isosceles right-angle prism 405 upon transmission through the prism 404 (In FIG. 19, the + mark in the optical path indicates that light rays propagate beyond the back side of the paper). Then, the light is reflected at the mirror 406, arriving at the eyes via the eyepiece lens 901. Thus, the viewing optical system of the optical apparatus is constructed of the lenses 901, 902, prisms 404, 405 and variable-shape mirror 409, so that aberrations at the object surface are minimized by optimization of the surface configuration and thickness of each optical element.

To be specific, the shape of the thin film 409*a* functioning as the reflecting surface is controlled by varying the resistance value of each variable resistor 411*a* in response to the signal from the computing unit 414 in such a way as to optimize the image-formation capabilities. Namely, signals of the magnitude commensurate with ambient temperature and humidity and a distance to the object are entered om the computing unit 414 from the temperature sensor 415, humidity sensor 416 and distance sensor 417 and in response to these input signals, the computing unit 414 produces signals for determining the resistance values of the variable resistors 411*a* in such a way as to apply on the electrode array 409*b* the voltage that determines the shape of the thin-film 409*a*, so that deterioration in the image-formation performance due to ambient temperature and humidity and the distance to the object can be compensated for. Thus, since the thin-film 409*a* is transformed by the voltage applied on the electrode array 409*b*, i.e., by electrostatic force, the thin-film 409*a* can take aspheric shape or many other shapes depending on the situations encountered. It is understood that the distance sensor 417 may be dispensed with; in this case, the image pickup lens 403 as a part of the viewing optical system of the digital camera should be moved to a position at which the high-frequency component of image signals from a solid-state image pickup device 408 is substantially maximized, so that the object distance is calculated from that position to transform the variable-shape mirror in such a way as to come into focus on the eyes of the viewer.

It is preferable to fabricate the transformable substrate 409*j* using a synthetic resin such as polyimide because it is well transformable even at low voltage. It is noted that the prism 404 and variable-shape mirror 409 may be integrated into a unit.

Although not shown, it is understood that the solid-state image pickup device 408 may be integrally formed on the substrate of the variable-shape mirror 409 by means of a lithographic process.

If the lenses 901, 902, prisms 404, 405 and mirror 406 are fabricated by means of plastic molding, then any desired shape can then be imparted thereto so that they can be easily fabricated. While the lenses 901 and 902 have been described as being spaced away from the prism 404, it is understood that if the prisms 404, 405, mirror 406 and variable-shape mirror 409 are designed in such a way as to remove aberrations with no provision of the lenses 901 and 902, then the prisms 404, 405 and variable-shape mirror 409 can take the form of one optical block that is easy to assemble. It is also acceptable to fabricate a part or the whole of the lenses 901, 902, prisms 404, 405 and mirror 406 using a glass material. By doing so, it is possible to obtain a viewing optical system further improved in terms of precision. It is further preferable to control the shape of the reflecting surface of the variable-shape mirror in such a way as to have the form of a free-form surface because aberrations can be favorably corrected with ease.

Referring to the embodiment of FIG. 19, it is not always necessary to provide the computing unit 414, temperature sensor 415, humidity sensor 416 and distance sensor 417 so that temperature changes, humidity changes, object distance changes, etc. can be compensated for by the variable-shape mirror 409. That is, while the computing unit 414, temperature sensor 415, humidity sensor 416 and distance sensor 471 are removed, it is possible to make correction for only a change in the diopter of the viewer by means of the variable-shape mirror 409.

Figure 20:
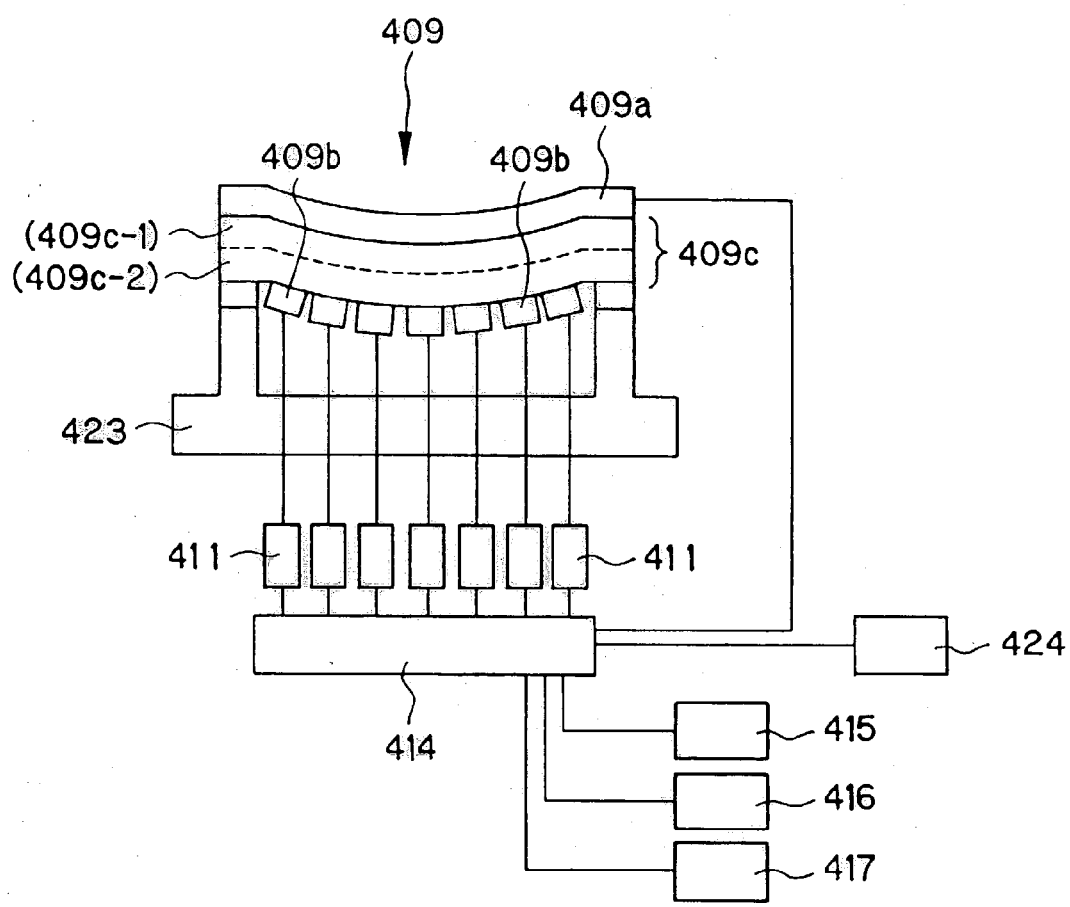
FIG. 20 is illustrative in schematic of another example of the variable-shape mirror 409.

FIG. 20 is illustrative in schematic of another example of the variable-shape mirror 409.

In this variable-shape mirror, a piezoelectric element 409*c* is interposed between a thin film 409*a* and a plurality of electrodes 409*b* and the assembly is provided on a supporting member 423. By varying the voltage applied on the piezoelectric element 409c for each electrode 409b, the piezoelectric element 409c is elongated and contracted in partially different manners, thereby transforming the thin film 409a. The electrode array 409b may be concentrically divided as shown in FIG. 21 or rectangularly divided as shown in FIG. 22, or alternatively it may have other shape depending on the intended purpose. In FIG. 20, reference numeral 424 is a shake sensor connected to a computing unit 424. For instance, when a digital camera shakes on phototaking, the sensor 424 actuates to sense that shake, thereby varying the voltage applied on the electrode array 409b via the computing unit 414 and variable resistors 411, so that the thin film (reflecting surface) 409 can be transformed for compensation for image blurring due to camera shake. At the same time, consideration is given to signals from the temperature sensor 415, humidity sensor 416 and distance sensor 417 for focusing, and compensation for temperature and humidity changes. Preferably in this case, some thickness and so some strength should be added to the thin film 409a because stresses in association with the transformation of the piezoelectric element 409c are applied on the thin film 409a. It is noted that although depending on the material used, the piezoelectric element 409c may have such double-layer structure 409c-1, 409c-2 as explained later.

Figure 23:
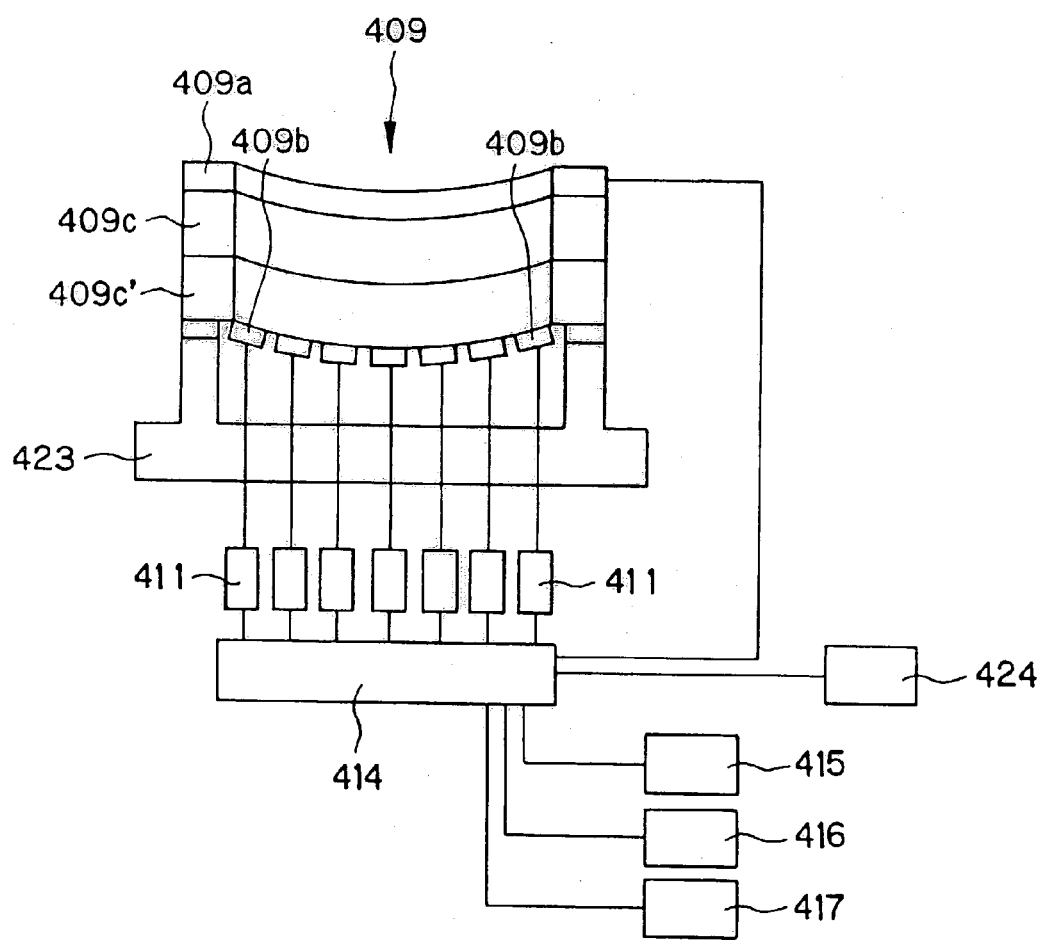
FIG. 23 is illustrative in schematic of yet another example of the variable-shape mirror 409.

FIG. 23 is illustrative in schematic of yet another example of the variable-shape mirror 409 applicable as the variable-shape mirror used with the zoom optical system of the invention.

This variable-shape mirror is different from the variable-shape mirror shown in FIG. 20 in that the piezoelectric element interposed between the thin film 409a and a plurality of electrodes 409b is made up of two piezoelectric elements 409c and 409c' formed of materials having piezoelectric properties in opposite directions. That is, when the piezoelectric elements 409c and 409c' are formed of ferroelectric crystals, they are located with the orientations of crystallographic axes being in opposite directions. In this case, since the piezoelectric elements 409c and 409c' are elongated and contracted in opposite directions upon receipt of voltages, the force that transforms the thin film 409a (reflecting surface) becomes stronger than that of the example of FIG. 20, resulting in large transformation of the mirror surface. Other reference numerals in FIG. 23 are the same as in FIG. 20.

The piezoelectric element 409c, 409c', for instance, may be formed of piezoelectric materials such as barium titanate, Rochelle salt, quartz, tourmaline, potassium dihydrogenphosphate (KDP), ammonium dihydrogenphosphate (ADP) and lithium niobate, polycrystals and crystals thereof, solid-solution piezoelectric ceramics of $PbZrO_3$ and $PbTiO_3$, organic dielectric materials such as poly(vinyl difluoride) (PVDF), and ferroelectric materials other than the aforesaid materials, among which the organic piezoelectric materials are particularly preferred because of their low Young's modulus and because they can undergo large transformation even at low voltage. It is noted that if these piezoelectric elements are used at an uneven thickness, it is also possible to properly transform the thin film 409a in each of the aforesaid examples.

The piezoelectric element 409c, 409' may also be formed of polymer piezoelectric materials such as polyurethane, silicone rubber, acryl elastomer, PZT, PLZT, poly(vinylidene fluoride) (PVDF), copolymers such as vinylidene cyanide copolymers and copolymers of vinylidene fluoride and trifluoroethylene.

It is preferable to use organic materials having piezoelectricity, synthetic resins having piezoelectricity, elastomers having piezoelectricity, etc., because it is possible to largely transform the surface of a variable-shape mirror.

Figure 24:
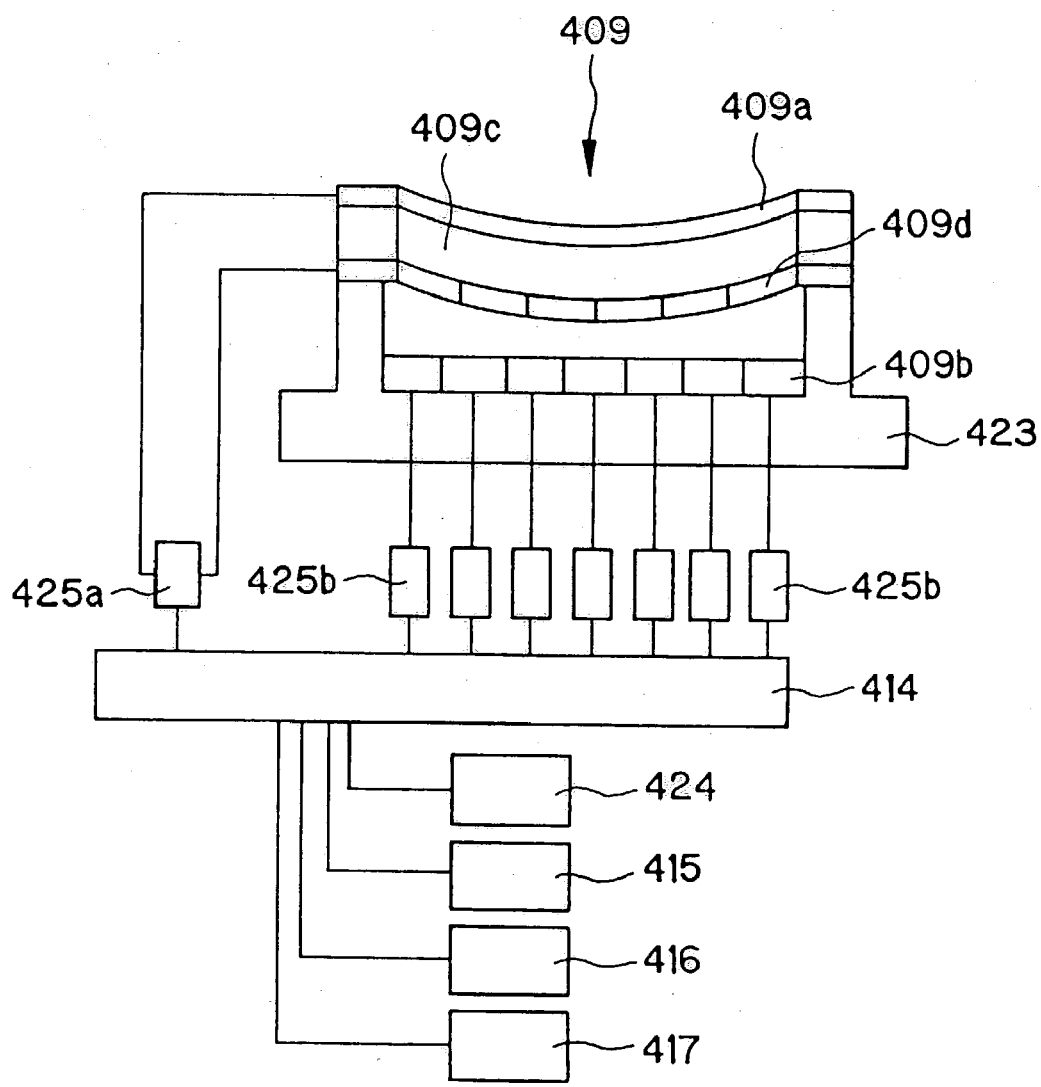
FIG. 24 is illustrative in schematic of a further example of the variable-shape mirror 409.

It is noted that when the piezoelectric element 409c of FIG. 20 or FIG. 24 is formed of an electrostrictive material such as an acryl elastomer or silicone rubber, it may be provided in the form of a double-layer structure wherein a layer of the piezoelectric element 409c is laminated on a combined substrate 409c and electro-strictive material 409c-2.

FIG. 24 is illustrative in schematic of a further example of the variable-shape mirror 409 applicable as the variable-shape mirror used with the zoom optical system of the invention.

In this variable-shape mirror, the piezoelectric element 409c is sandwiched between the thin film 409a and a plurality of electrodes 409d, and the assembly is provided on the supporting member 423. Then, voltage is applied on the piezoelectric element 409c between the thin film 409a and the electrodes 409d via the driving circuit 425 controlled by the computing unit 414. Besides, voltage is applied on a plurality of electrodes 409b provided on the internal bottom of the supporting member 423 via the driving circuit 425b controlled by the computing unit 414. Accordingly, the thin film 409a can be subjected to double transformation by the voltage applied between the thin film 409a and the electrodes 409d and electrostatic force resulting from the voltage applied on the electrodes 409b, so that much more transformation patterns than could be achieved in any of the aforesaid embodiments can be obtained with faster responsibility. Other reference numerals in FIG. 24 are the same as in FIG. 20.

By varying the sign of the voltage between the thin film 409a and the electrodes 409d, it is possible to transform the thin film 409a of the variable-shape mirror into either convex shape or concave shape. In this case, it is acceptable to achieve large transformation using the piezoelectric effect and minute transformation using electrostatic force. It is also acceptable to use mainly the piezoelectric effect for convex transformation and mainly electrostatic force for concave transformation. It is noted that the electrode 409d may be constructed as a single electrode or using a plurality of electrodes as is the case with the electrodes 409b. How the electrode 409d is constructed using a plurality of electrodes is illustrated in FIG. 24. It is understood that the term "piezoelectric effect" used herein includes not only the piezoelectric effect but the electrostrictive effect as well, and the piezoelectric material is understood to include the electrostrictive material, too.

Figure 25:
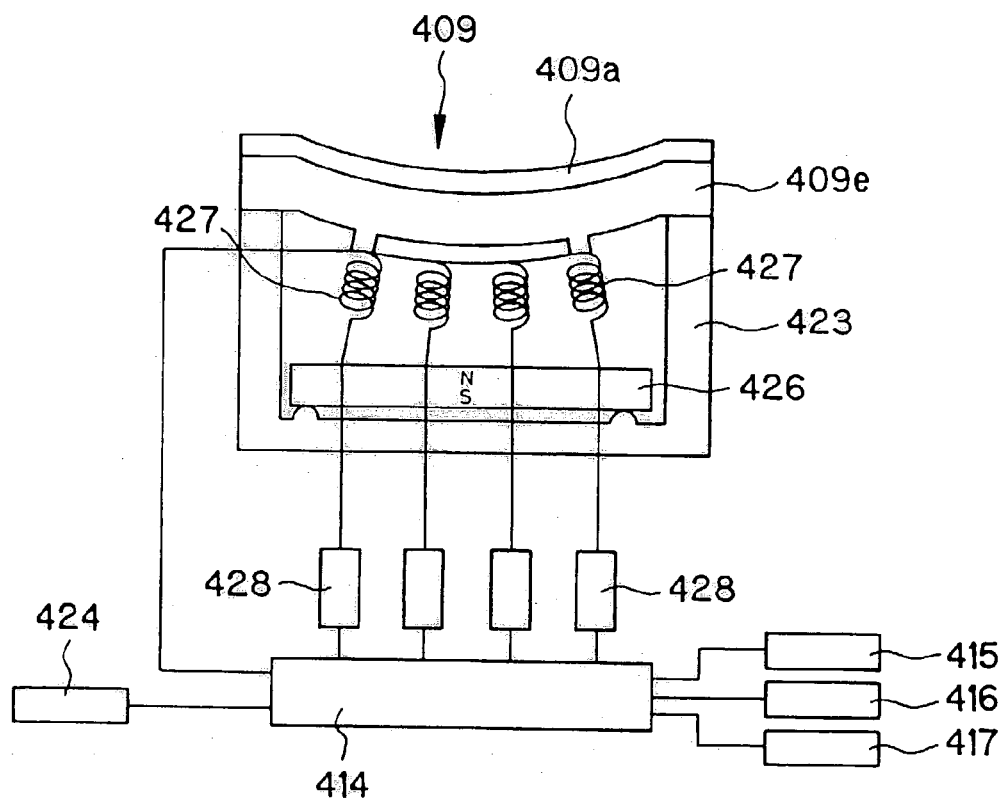
FIG. 25 is illustrative in schematic of a further example of the variable-shape mirror 409.

FIG. 25 is illustrative in schematic of yet another example of the variable-shape mirror 409 applicable as the variable-shape mirror used with the zoom optical system of the invention.

This variable-shape mirror is designed such that the reflecting surface can be transformed by making use of electromagnetic force. The permanent magnet 426 is fixed on the inside bottom of the support frame 423, and the peripheral portion of the substrate 409e formed of silicon nitride, polyimide or the like is fixedly placed on top of that frame. In addition, the thin film 409a formed of an aluminum or other metal coat is provided on the surface of the substrate 409e, so that the variable-shape mirror 409 is set up. The substrate 409e is fixedly provided on its lower surface with a plurality of coils 427 that are then connected to the computing unit 414 via the respective driving circuits 428. Other reference numerals in FIG. 25 are the same as in FIG. 20. In response to output signals from the computing unit 414, which correspond to changes in the optical system which changes are determined in the computing unit 414 by signals from the respective sensors 415, 416, 417 and 424, suitable currents are fed to the respective coils 427 through the respective driving circuits 428, whereupon the respective coils 427 are repulsed or adsorbed by electromagnetic force exerted between them and the permanent magnet 426, so that the substrate 409e and thin film 409a can be transformed.

In this case, it is acceptable to pass varying amounts of currents through the respective coils 427, or use a single coil 427. Alternatively, the permanent magnet 426 may be provided on the lower surface of the substrate 409e while the coils 427 may be provided on the inside bottom of the support frame 423. Preferably, the coils 427 should be designed as thin-film coils as by lithography. The coils 427 may also have therein cores formed of ferromagnetic materials.

Figure 26:
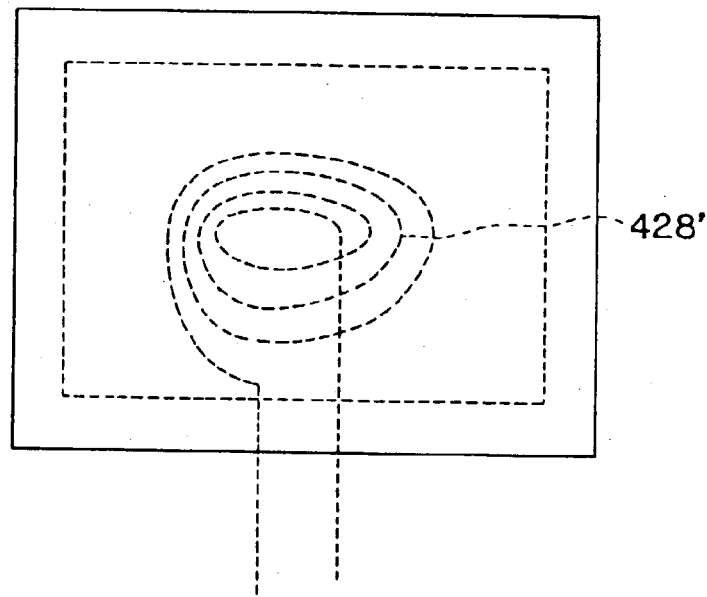
FIG. 26 is illustrative of the turn density of the thin-film coil 427 in the example of FIG. 25.

The thin-film coil 427 may also be designed in such a way as to have a turn density that varies depending on the site of the lower surface of the substrate 409e, as is the case of such a coil 428' as shown in FIG. 26, thereby imparting the desired transformation to the substrate 409e and thin-film 409a. The coil 472 may be used in the form of a single coil or may have therein a core of ferromagnetic material.

Figure 27:
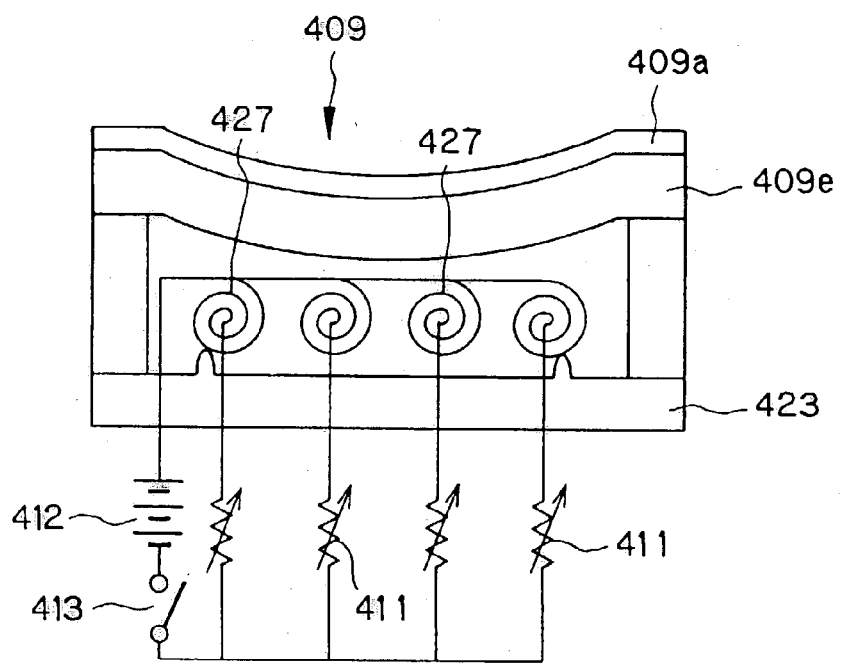
FIG. 27 is illustrative in schematic of a further example of the variable-shape mirror 409.

FIG. 27 is illustrative in schematic of a further example of the variable-shape mirror 409 applicable as the variable-shape mirror used with the zoom optical system of the invention.

Figure 28:
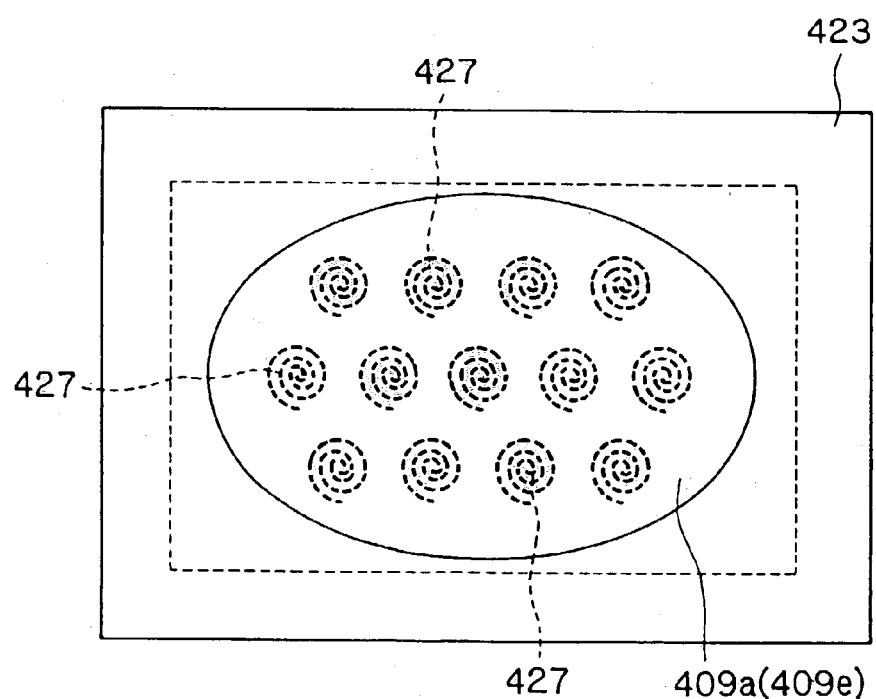
FIG. 28 is illustrative of one example of how the coils 427 are located in the example of FIG. 27.
Figure 29:
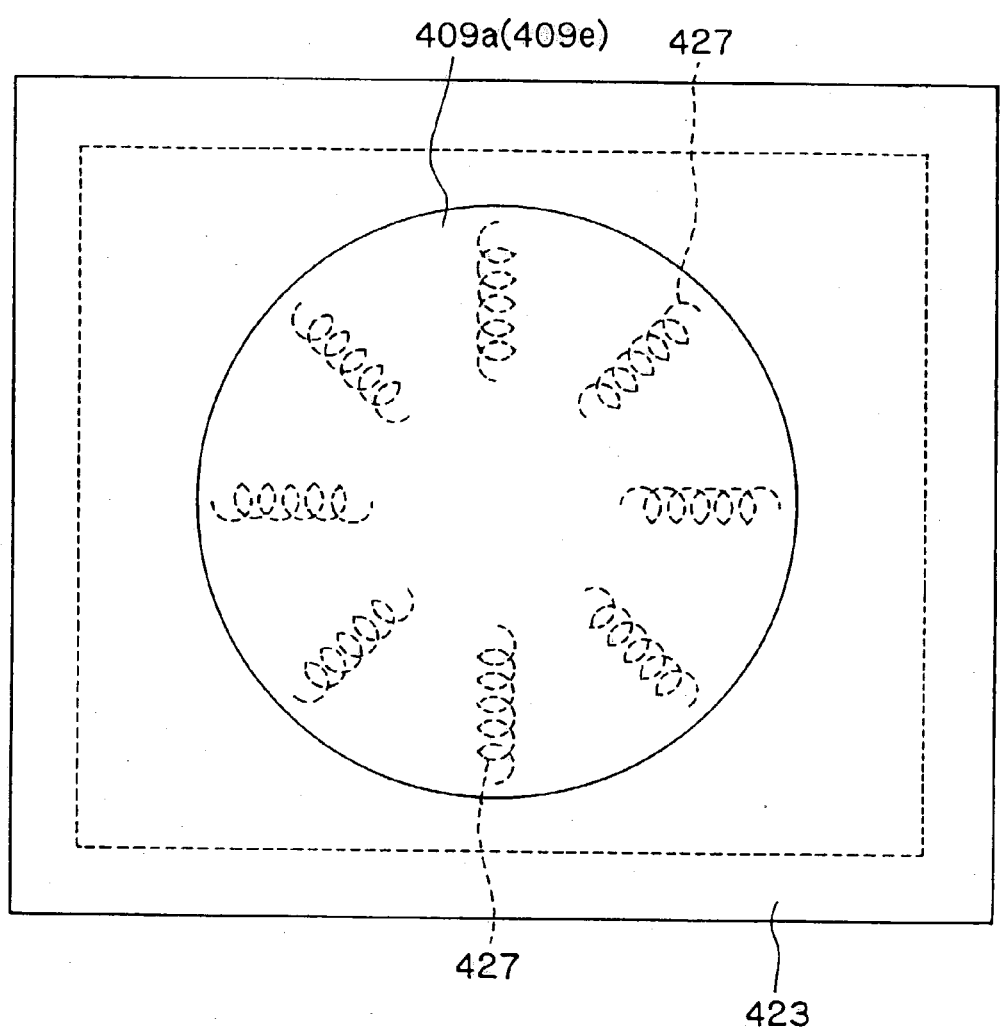
FIG. 29 is illustrative of another example of how the coils 427 are located in the example of FIG. 27.
Figure 30:
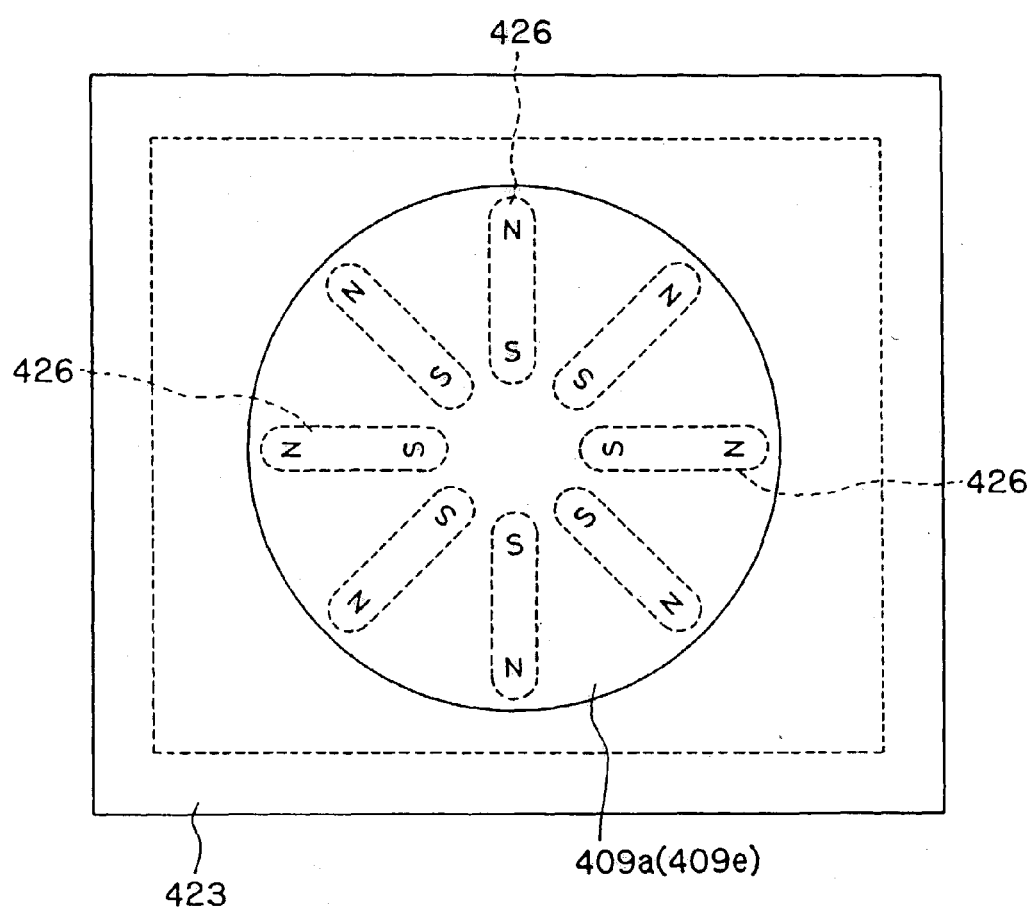
FIG. 30 is illustrative of the locations of the permanent magnets 426 suitable for the case where the coils 427 are located as in FIG. 29 in the example shown in FIG. 25.

In this variable-shape mirror, the substrate 409e is formed of iron or other ferromagnetic material, and the thin film 409a functioning as a reflecting film is formed of aluminum or the like. The peripheral portion of the substrate 409e is fixedly placed on top of the support frame 423, and the coils 427 are fixed on the inside bottom of the support frame 423. In this case, since it is unnecessary to provide the thin-film coils on the lower surface of the substrate 409e, the variable-shape mirror can be simplified in construction and so can be fabricated at low costs. If the power source switch 413 is replaced by a combined changeover and open/close switch, the directions of currents passing through the coils 427 can be so changed that the shape of the substrate 409e and thin film 409a can be changed without restraint. FIG. 28 shows one example of locating the coils 427 with respect to the substrate 409e and thin film 409a, and FIG. 29 shows another example of locating the coils 427. These locations may also be applied to the example of FIG. 21. FIG. 30 illustrates the locations of the permanent magnets 426 well fit for the case where the coils 427 are radially located as shown in FIG. 29. That is, if the permanent magnets 426 each in a rod form are radially located, more delicate transformation than could be achieved in the example of FIG. 25 can then be imparted to the substrate 409e and thin film 409a. Such transformation of the substrate 409e and thin film 409a by electromagnetic force (the examples of FIGS. 25 and 27) has a merit over transformation by electrostatic force in that the driving voltage can be much more reduced.

The present invention has been described with reference to some examples of the variable-shape mirror. For transformation of the mirror formed of a thin film, however, it is acceptable to make use of two or more forces, as exemplified in FIG. 24. In short, it is acceptable to transform the variable-shape mirror by simultaneous use of at least two of electrostatic force, piezoelectric force, electromagnetic force, electro-striction, fluid pressure, magnetic field, temperature change, electromagnetic waves, etc. That is, if an optical element having variable optical properties is fabricated with two or more different driving methods, large transformation and fine transformation are then achievable at the same time and, hence, a mirror surface with satisfactory precision is achievable.

The outside shape of the transforming portion of the variable-shape mirror should preferably be designed such that it is extended with respect to the direction parallel with the entrance surface for axial light rays. A merit of this arrangement is that such a portion is easily transformable into an elliptic surface favorable for correction of aberrations. For the shape extended with respect to the direction parallel with the aforesaid entrance surface, for instance, track, polygonal and elliptic shapes may be used.

Figure 31:
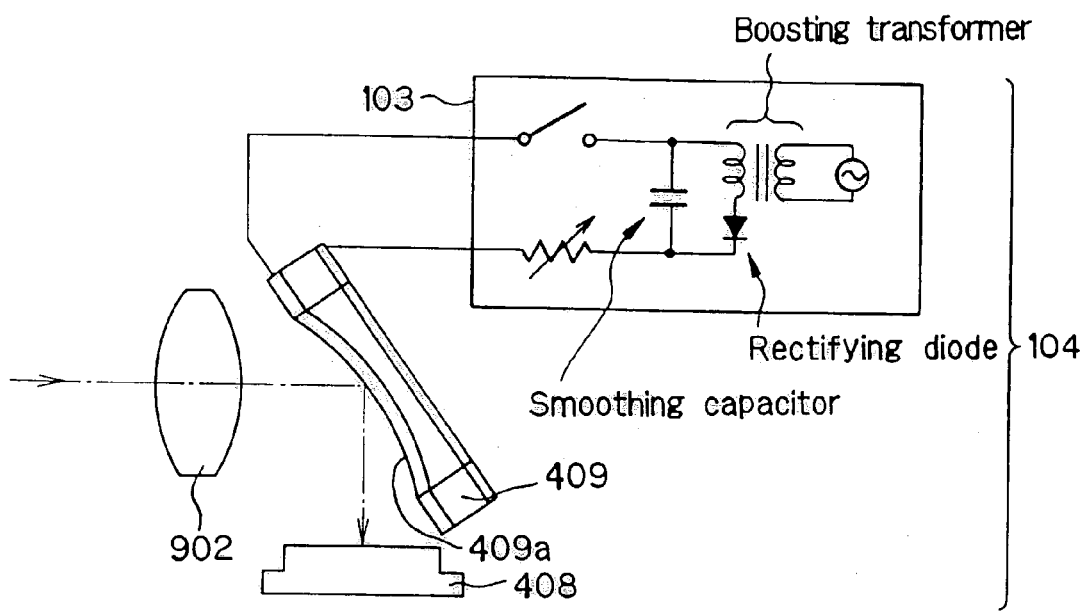
FIG. 31 is illustrative in schematic of the image pickup optical system using the variable-shape mirror 409.

FIG. 31 is illustrative in schematic of an arrangement wherein the variable-shape mirror 409 is used for an image pickup optical system of optical apparatus, for instance, an arrangement wherein the variable-shape mirror is used for an image pickup optical system of a digital camera for cellular phones, capsule endoscopes, electronic endoscopes, digital cameras for personal computers and digital cameras for PDAs.

This image pickup optical system comprises a single image pickup unit 104 or a single optical apparatus composed of the variable-shape mirror 409, lens 902, solid-state image pickup device 408 and control system 103. In this image pickup unit 104, object light passes through the lens 902, and arrives at the variable-shape mirror 409 where the light is condensed upon reflection at the thin film (reflecting surface) 409a, so that an image is formed on the solid-state image pickup device 408. The variable-shape mirror 409 is a sort of optical element having variable optical properties, and is sometimes called a variable-focus mirror.

According to this example, even at a varying distance, focusing is achievable by transformation of the reflecting surface 409a of the variable-shape mirror 409. Since it is not necessary to drive the lens 902 by means of a motor or the like, this example is favorable in view of size reductions, weight reductions, and power savings. The image pickup unit 104 can be used as the image pickup optical system of the invention throughout the examples. If a plurality of variable-shape mirrors 409 are used, it is then possible to set up various optical systems for zooming or other purposes.

It is noted that FIG. 31 shows one exemplary construction of the control system 103 including a booster circuit for the transformer using coils. In consideration of size reductions, it is particularly preferable to use a multilayer piezoelectric transformer. The booster circuit may be used for all the inventive variable-shape mirrors and variable-focus lenses that harness electricity; however, this booster circuit is particularly useful for variable-shape mirrors and variable-focus lenses that make use of electrostatic force and piezoelectric effect. It is here noted that what is necessary for focusing with the variable-shape mirror 409 is to form an object image on, for instance, the solid-state image pickup system 408 and detect the state where the high-frequency component of the object image reaches a maximum while varying the focal length of the variable-shape mirror 409.

Figure 32:
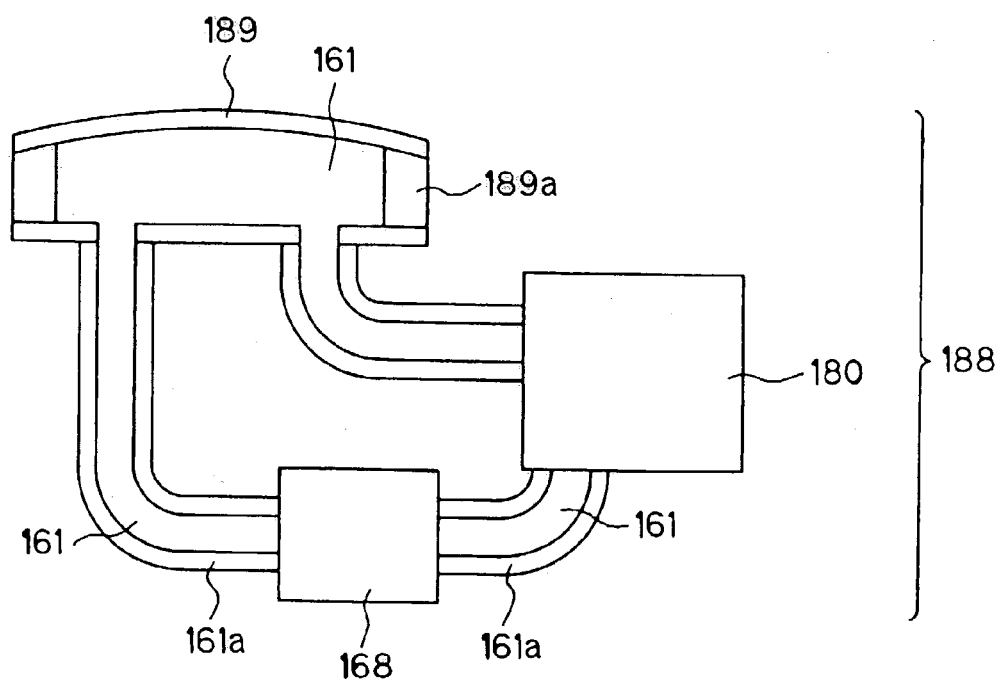
FIG. 32 is illustrative in schematic of one example of the variable-shape mirror 188.

FIG. 32 is illustrative in schematic of a further example of the variable-shape mirror. This example is directed to a variable-shape mirror shown generally at 188, wherein the fluid 161 is fed by the micropump 180 from the line 161a to the mirror surface or fed back to the line 161a to transform the mirror surface, wherein the mirror surface is defined by the surface of the reflecting surface 189 provided across the upper surface of the support frame 189a. This example has a merit of achieving large transformation of the mirror surface. It is here noted that in the line that makes a connection between the support frame 189a and the micropump 180 there is provided a reservoir 168 that can feed a given amount of fluid 161 into the support frame 189a.

The micropump 180, for instance, is a power-driven, miniature pump fabricated by micromachining.

Exemplary pumps fabricated by micromachining include those making use of thermal transformation, piezoelectric materials, and electrostatic force.

Figure 33:
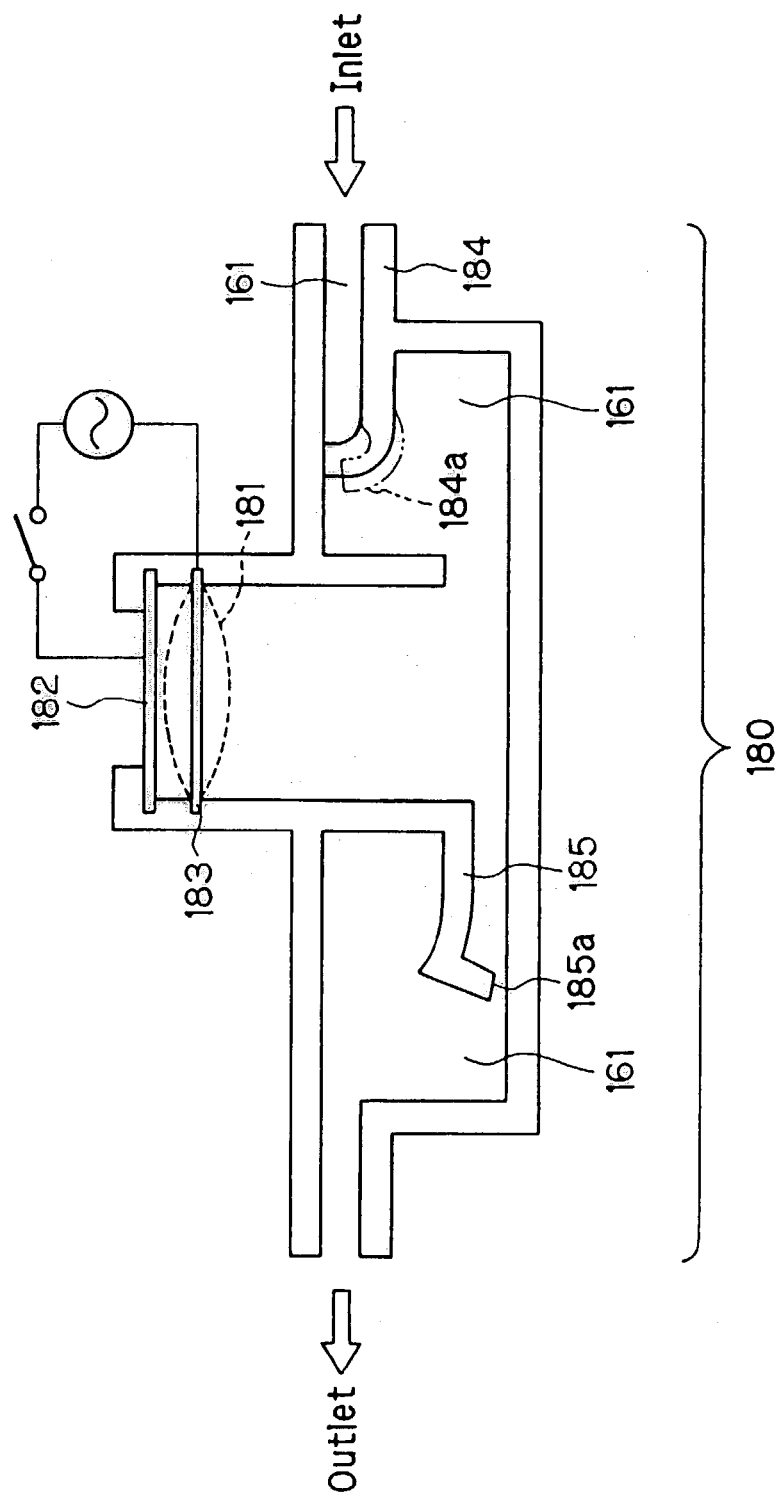
FIG. 33 is illustrative in schematic of one example of the micropump applicable to the variable-shape mirror.

FIG. 33 is illustrative in schematic of the aforesaid micropump 180. In the micropump 180, the diaphragm 181, to and from which the fluid 161 is fed and removed, vibrates by electric force such as electrostatic force and piezoelectric effect. FIG. 33 shows an example of vibrating the diaphragm 181 by electrostatic force. In FIG. 33, reference numerals 182 and 183 are electrodes. The diaphragm 181 is transformed as indicated by dotted lines. As the diaphragm 181 vibrates, the leading ends 184a and 185a of two valves 184 and 185 open and close to feed the fluid 161 from right to left.

In the variable-shape mirror 188 shown in FIG. 32, the reflecting film 189 is transformed into concave and convex shapes depending on the amount of the fluid 161, so that the surface of the reflecting film 189 can function as a variable-shape mirror. The variable-shape mirror 188 is driven by the fluid 161, for which organic and inorganic materials such as silicone oil, air, water and jelly may be used.

It is noted that for variable-shape mirrors, variable-focus lenses or the like that harness electrostatic force, and piezoelectric effect, high driving voltages are often needed. In this case, it is preferable to set up a control system using a boosting transformer, a piezoelectric transformer or the like, as shown in FIG. 31.

It is convenient to design portions of the reflecting thin film 409a and reflecting film 189 fixed on the support frame 423 or 189a as untransformable portions, because they can be used as reference surfaces when the shape of the variable-shape mirror is measured by means of interferometers or the like.

Figure 34:
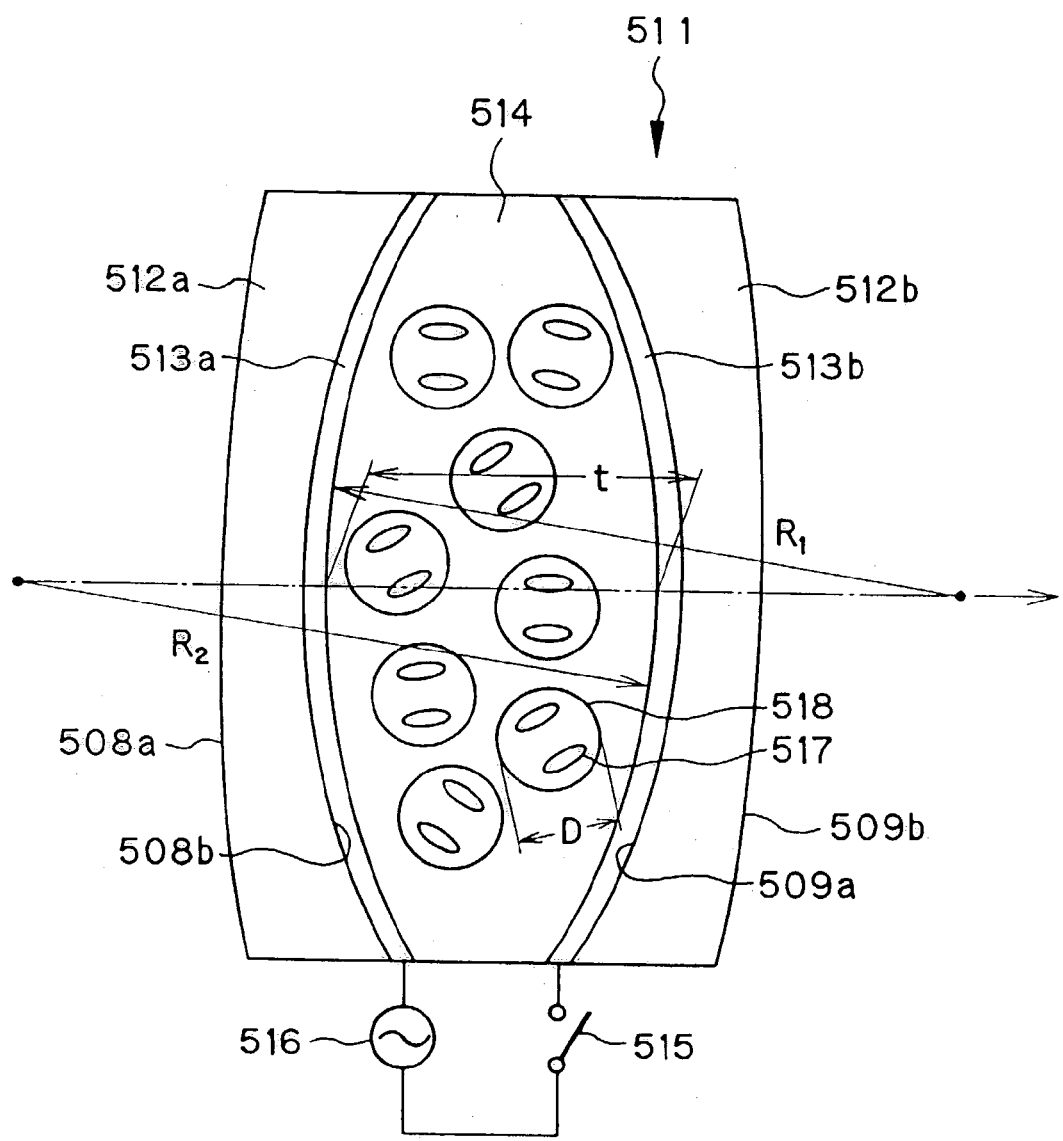
FIG. 34 is illustrative of the fundamental construction of the variable-focus lens.
Figure 36:
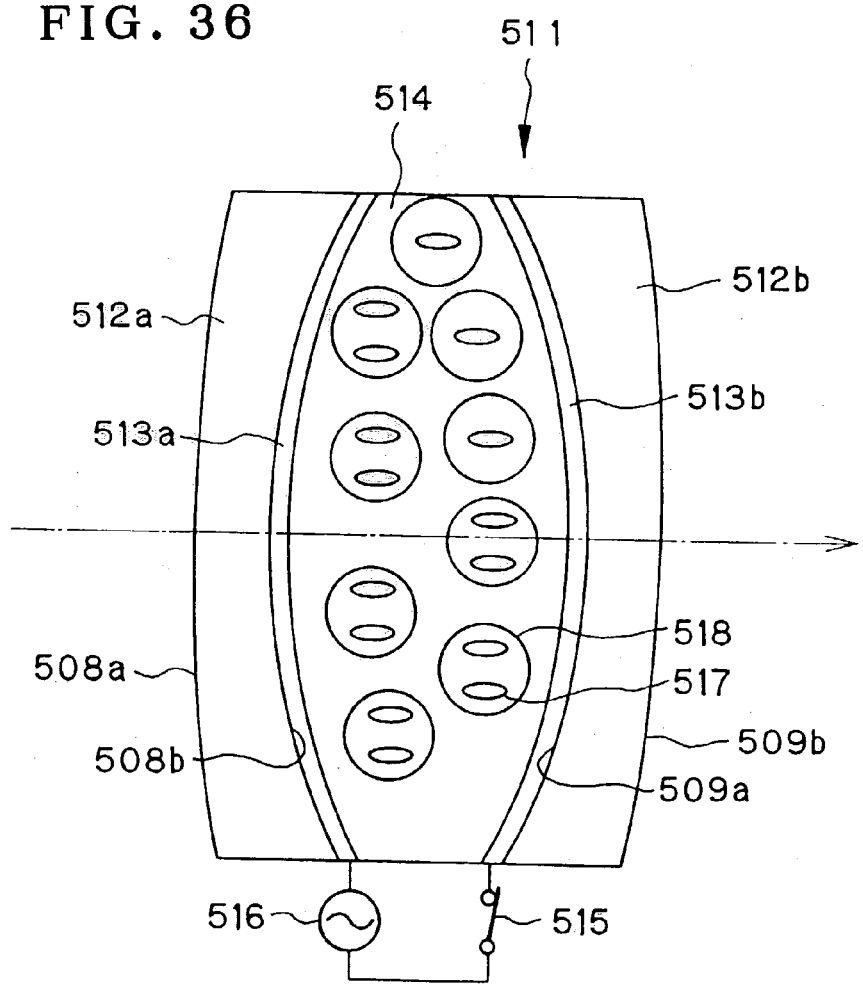
FIG. 36 is illustrative of the state of an electric filed applied on the polymer dispersed liquid crystal layer shown in FIG. 34.

FIG. 34 and FIG. 36 are illustrative of the fundamental construction of the variable-focus lens that is applicable to the optical system and optical apparatus of the invention. This variable-focus lens 511 comprises a first lens 512a having lens surfaces 508a and 508b as the first and second surfaces, a second lens 512b having lens surfaces 509a and 509b as the third and fourth surfaces, and a polymer dispersed liquid crystal layer 514 interposed between these lenses while transparent electrodes 513a and 513b are located, so that incident light is converged through the first and second lenses 512a and 512b. The transparent electrodes 513a and 513b are connected to an AC source 516 via a switch 515 for selective application of an AC electric field on the polymer dispersed liquid crystal layer 514. It is noted that the polymer dispersed liquid crystal layer 514 is constructed of a multiplicity of minute polymer cells 518 each containing a liquid crystal molecule 517, wherein the polymer cells may each be in any desired form including a spherical or polygonal shape, and that the volume of the liquid crystal layer 514 should account for the sum of the volume occupied by the polymer forming the polymer cells 518 and the volume occupied by the liquid crystal molecules 517.

Referring here to the size of a typical polymer cell 518 in a spherical form, for instance, that size is given by $$2\text{ nm} \leq D \leq \lambda/5 \tag{1}$$

Here D is the average diameter of the cell, and λ is the wavelength of light used. That is, since the size of the liquid crystal molecule 517 is about 2 nm or greater, the lower limit value of the average diameter D should be 2 nm or greater. The upper limit value of D should preferably be λ/5 or less although depending on the thickness, t, of the polymer dispersed liquid crystal layer 514 in the axial direction of the variable-focus lens 511. This is because when D is greater than λ, light is scattered at the boundary surface of the polymer cell 518 due to a difference in the index of refraction between the polymer and the liquid crystal molecule 517 and, hence, the polymer dispersed liquid crystal layer 514 becomes opaque. In some applications, high precision is not required although depending on optical products for which variable-focus lenses are used. In this case, D may be λ or less. It is noted that the transparency of the polymer dispersed liquid crystal layer 514 becomes worse with increasing thickness t.

Figure 35:
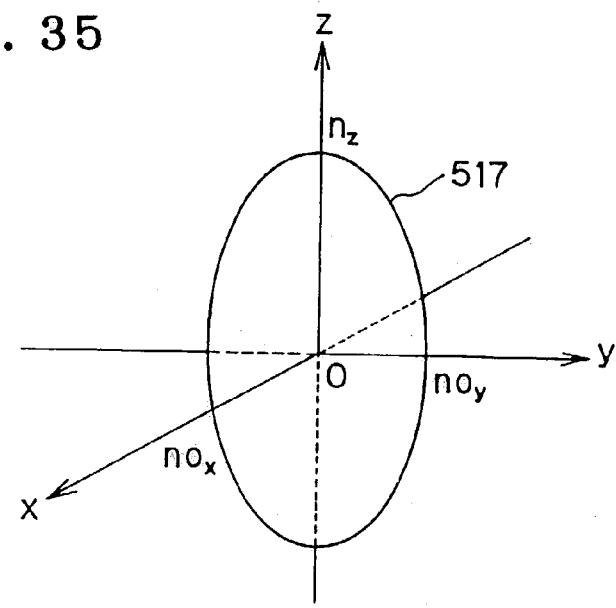
FIG. 35 is illustrative of an indicatrix for a uniaxial nematic liquid crystal molecule.

For the liquid crystal molecule 517, for instance, a uniaxial nematic liquid crystal molecule is used. The index ellipsoid of this liquid crystal molecule 517 takes such a form as shown in FIG. 35, i.e., $$n_{ox}=n_{oy}=n_o \tag{2}$$

Here $n_o$ is the refractive index of an ordinary ray, and $n_{ox}$ and $n_{oy}$ are the indices of refraction in mutually orthogonal directions within a plane including an ordinary ray.

In the state where, as shown in FIG. 34, the switch 515 is held off, that is, no electric field is applied on the polymer dispersed liquid crystal layer 514, the liquid crystal molecules 517 line up in various directions, so that the polymer dispersed liquid crystal layer 514 has a high refractive index with respect to incident light, providing a lens having strong refracting power. As shown in FIG. 36, on the other hand, as the switch 515 is put on to apply an AC electric field on the polymer dispersed liquid crystal layer 514, the liquid crystal molecules line up in such a way that the major axis direction of the index ellipsoid becomes parallel with the optical axis of the variable-focus lens 511, so that the polymer dispersed liquid crystal layer decreases in the index of refraction, providing a lens having weak refracting power.

Figure 37:
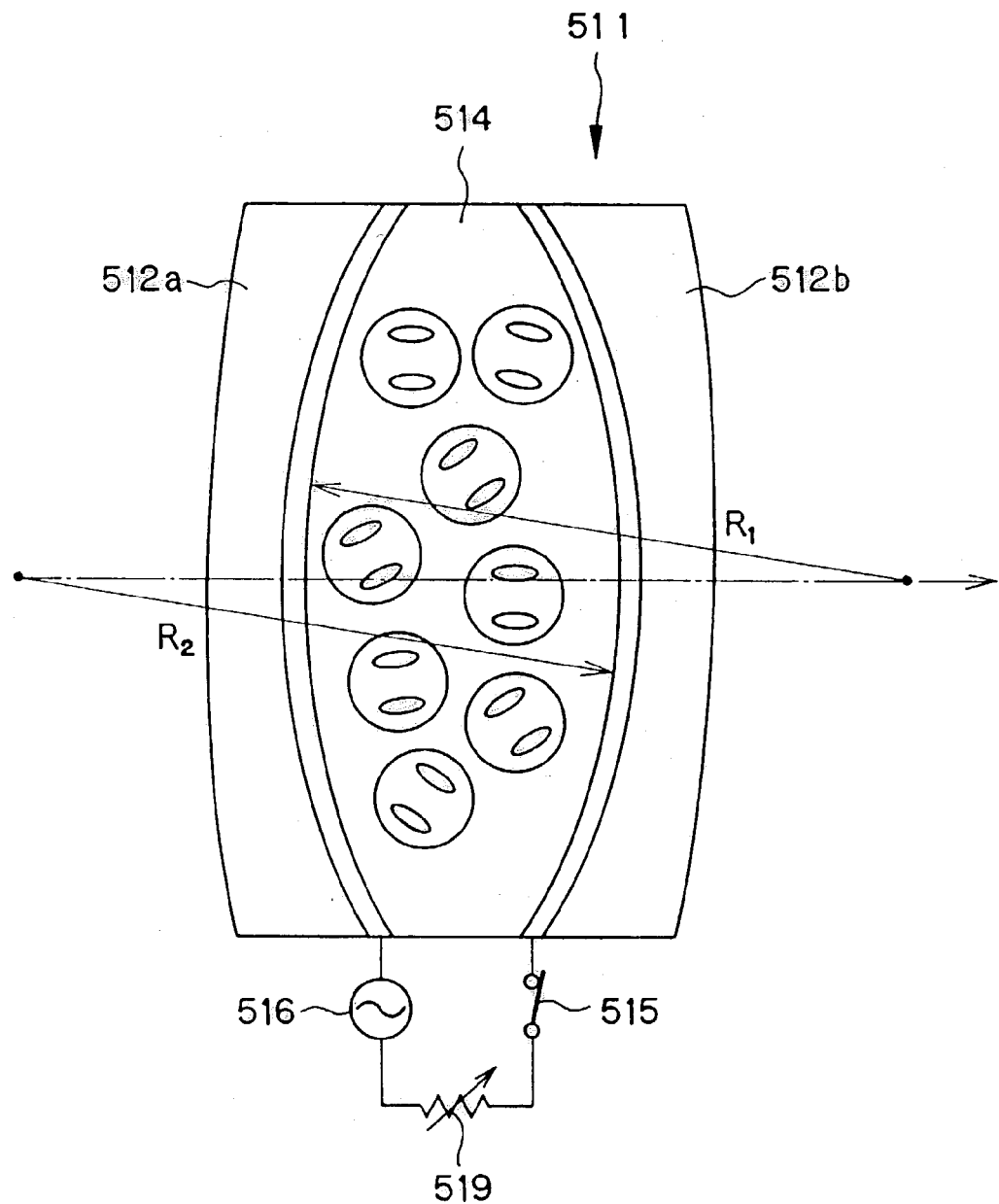
FIG. 37 is illustrative of one example of how the voltage applied on the polymer dispersed liquid crystal layer of FIG. 34 is made variable.

It is understood that it is acceptable to change the voltage applied on the polymer dispersed liquid crystal layer 514 by a variable resistor 519 as shown typically in FIG. 37 in a stepwise or continuous fashion. In this case, as the applied voltage increases, the liquid crystal molecules 517 line up in such a way that the major axis of the index ellipsoid becomes gradually parallel with the optical axis of the variable-focus lens 511, so that the refracting power can be changed in a stepwise or continuous fashion.

Referring back to the state of FIG. 34 where no electric field is applied on the polymer dispersed liquid crystal layer 514, the average refractive index of the liquid crystal molecule 517 is roughly given by $$(n_{ox}+n_{oy}+n_z)/3 \equiv n_{LC}' \tag{3}$$

Here $n_z$ is the refractive index of the index ellipsoid in the major axis direction as shown in FIG. 35. When the aforesaid formula (2) holds, the average refractive index, $n_{LC}$, of the liquid crystal molecule 517 is given by $$(2n_o+n_e)/3 \equiv n_{LC} \tag{4}$$

Here $n_z$ is expressed as the refractive index, $n_e$, of an extraordinary ray. Let $n_A$ be the refractive index of the polymer dispersed liquid crystal layer 514, $n_P$ be the refractive index of the polymer that forms the polymer cell 518, and ff be the ratio of the volume of the liquid crystal molecules 517 with respect to the volume of the polymer dispersed liquid crystal layer 514. Then, Maxwell-Garnet law gives $$n_A = ff \cdot n_{LC}' + (1-ff) n_P \qquad (5)$$

Hence, as shown in FIGS. 34 and 37, the focal length $f_1$ of the lens formed of the polymer dispersed liquid crystal layer 514 is given by $$1/f_1 = (n_A - 1)(1/R_1 - 1/R_2) \qquad (6)$$

Here $R_1$ and $R_2$ are the radii of curvature of the inside surfaces of the lens elements 512a and 512b, respectively, which face the polymer dispersed liquid crystal layer 514, provided that when the center of curvature is on the image point side, $R_1$ and $R_2$ have each a positive value. It is noted that refraction by the outside surfaces of the lens elements 512a and 512b is not taken into consideration. Thus, the focal length of the lens formed only of the polymer dispersed liquid crystal layer 514 is given by equation (6).

Suppose here that the average refractive index of an ordinary ray is given by $$(n_{ox} + n_{oy})/2 = n_o' \qquad (7)$$

Then, the refractive index $n_B$ of the polymer dispersed liquid crystal layer 514 in the state shown in FIG. 36, where an electric field is applied on the polymer dispersed liquid crystal layer 514, is given by $$n_B = ff \cdot n_o' + (1-ff) n_P \qquad (8)$$

Thus, the focal length $f_2$ of the lens composed only of the polymer dispersed liquid crystal layer 514 in this case is given by $$1/f_2 = (n_B - 1)(1/R_1 - 1/R_2) \qquad (9)$$

It is noted that when a voltage lower than that in FIG. 36 is applied on the polymer dispersed liquid crystal layer 514, the focal length is given by a value between the focal length $f_1$ given by equation (6) and the focal length $f_2$ given by equation (9).

From equations (6) and (9), the rate of change in the focal length of the lens formed of the polymer dispersed liquid crystal layer 514 is given by $$|(f_2 - f_1)/f_2| = |(n_B - n_A)/(n_B - 1)| \qquad (10)$$

Thus, that rate of change may be increased by increasing $|n_B - n_A|$. Here, $$n_B - n_A = ff(n_o' - n_{LC}') \qquad (11)$$

Hence, if $|n_o' - n_{LC}'|$ is increased, it is then possible to increase the rate of change. In practical applications, the refractive index, $n_B$, of the polymer dispersed liquid crystal layer 514 is of the order of 1.3 to 2. Suppose here $$0.01 \leq |n_o' - n_{LC}'| \leq 10 \qquad (12)$$

Then, when ff=0.5, an effective variable-focus lens can be obtained because the focal length of the lens formed of the polymer dispersed liquid crystal layer 514 can be varied at least 0.5%. It is noted that $|n_o' - n_{LC}'|$ cannot possibly exceed 10 due to current restraints on available liquid crystal materials.

An account is now given of the grounds for the upper limit value to the aforesaid equation (1). "Solar energy Materials and Solar Cells", Vol. 31, Wilson and Eck, 1993, Eleevier Science Publishers B. v., pp. 197–214, "Transmission variation using scattering/transparent switching film" shows changes the transmission τ upon variations in the size of polymer dispersed liquid crystals. The publication shows at page 406 and in FIG. 6 that when t=300 μm, ff=0.5, $n_P$=1.45, $n_{LC}$=1.585 and λ=500 nm, the theoretical value for transmittance τ is τ≈90% on condition that r=5 nm where r is the radius of a polymer dispersed liquid crystal, D=λ/50 and D·t=λ·6 μm (the units of D and λ are nm)), and τ≈50% on condition that r=25 nm (D=λ/10).

For instance, suppose here the case where t=150 μm. If the transmittance τ changes with the exponential function for t, then the transmittance τ at t=150 μm is assumed to be τ≈70% at r=25 nm (D=λ/10 and D·t=λ·15 μm). Where t=75 μm, likewise, τ≈80% at r=25 nm (D=λ/10 and D·t=λ·7.5 μm).

From these results, if $$D \cdot t \leq \lambda \cdot 15 \text{ μm} \qquad (13)$$

the transmittance τ is then between 70% and 80% or greater, ensuring a practically satisfactory lens. For instance, this means that where t=75 μm, a sufficient transmittance is obtainable at D≤1/5.

The closer the value of $n_P$ to the value of $n_{LC}'$, the better the transmittance of the polymer dispersed liquid crystal layer 514 becomes. When the value of $n_o'$ differs from the value of $n_P$, on the other hand, the transmittance of the polymer dispersed liquid crystal layer 514 becomes worse. When the following equation (14) is satisfied, the transmittance of the polymer dispersed liquid crystal layer 514 is improved on average in both the state of FIG. 34 and the state of FIG. 36.

$$n_P = (n_o' + n_{LC}')/2 \qquad (14)$$

For the variable-focus lens 511 wherein the lens formed of the polymer dispersed liquid crystal layer 514 is interposed between the first lens 512a and the second lens 512b, the transmittance is substantially on the same level and, preferably, on a higher level whether in the state of FIG. 34 or in the state of FIG. 36. There are thus some restrictions on the polymer material available for the formation of the polymer cell 518 and the material available for the liquid crystal molecule 517. In practical applications, however, it is preferred that $$n_o' \leq n_P \leq n_{LC}' \qquad (15)$$

If the aforesaid equation (14) is satisfied, the aforesaid equation (13) can then slack further to $$D \cdot t \leq \lambda \cdot 60 \text{ μm} \qquad (16)$$

This is because the reflectivity is in proportion to the square of a refractive index difference according to Fresnel reflection law; reflection of light at the boundary between the polymer forming the polymer cell 518 and the liquid crystal molecule 517, that is, the decrease in the transmittance of the polymer dispersed liquid crystal layer 514 is roughly proportional to the square of the difference in the index of refraction between the aforesaid polymer and the liquid crystal molecule 517.

The foregoing hold true for the case where $n_o' \approx 1.45$, and $n_{LC}' \approx 1.585$. More generally, however, this may be formulated as follows.

$$D \cdot t \leq 1 \cdot 15 \text{ μm} \cdot (1.585 - 1.45)^2/(n_u - n_P)^2 \qquad (17)$$

Here $(n_u - n_P)^2$ should be the larger of $(n_{LC}' - n_P)^2$ and $(n_o' - n_P)^2$.

To increase the change in the focal length of the lens formed of the polymer dispersed liquid crystal layer 514, it is preferable for ff to have a larger value. At ff=1, however, the volume of the polymer reduces to zero; no polymer cell 518 can be formed. Hence, $$0.1 \leq ff \leq 0.999 \quad (18)$$

The smaller the value of ff, the more improved the transmittance τ is. Preferably, the aforesaid formula (17) should thus be replaced by $$4 \times 10^{-6} [\mu m]^2 \leq D \cdot t \leq \lambda \cdot 45 \ \mu m \cdot (1.585 - 1.45)^2 / (n_u - n_P)^2 \quad (19)$$

It is here noted that as can be seen from FIG. 34, the lower limit value of t is t=D, and the lower limit value of D·t is $(2 \times 10^{-3} \ \mu m)^2$, that is, $4 \times 10^{-6} \ [\mu m]^2$ because the value of D is 2 nm or greater as already mentioned.

It is understood that where D is greater than the range of 10 nm to 5 nm, the optical properties of a substance can be approximated by the index of refraction, as stated in Tadashi Mukai, "Iwanami's Science Library Volume 8—There Planetoids Coming", page 58, Iwanami Shoten, 1994. As D exceeds 500λ, scattering of light becomes geometric, and so scattering of light at the interface between the polymer forming the polymer cell 518 and the liquid crystal molecule 517 increases pursuant to Fresnel reflection formula. In practical application, therefore, D should be $$7 \ nm \leq D \leq 500\lambda \quad (20)$$

Figure 38:
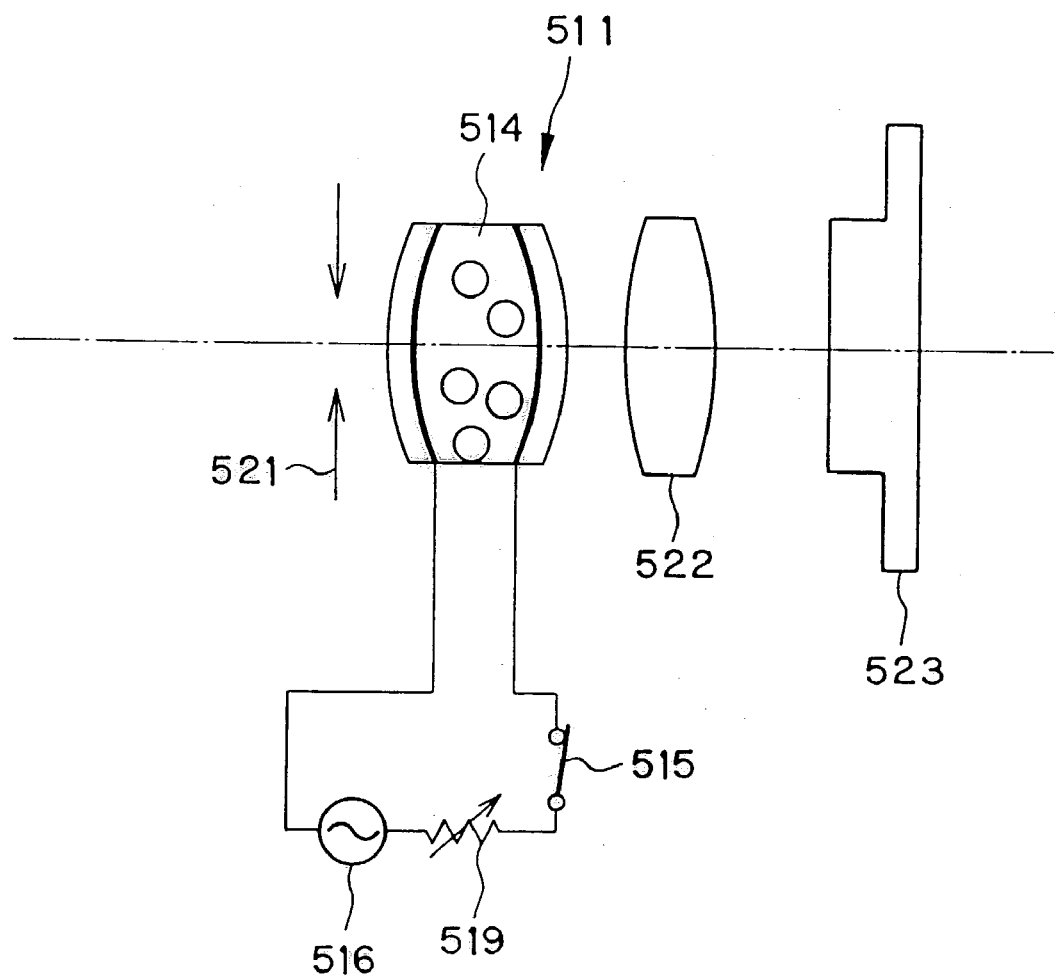
FIG. 38 is illustrative of the arrangement, of one example of the image pickup optical system for digital cameras, in which the variable-focus lens is used.

FIG. 38 is illustrative of the construction of an image pickup optical system for digital cameras, wherein the variable-focus lens 511 shown in FIG. 37 is used. In this image pickup optical system, an image of an object (not shown) is formed on a solid-state image pickup device 523 comprising a CCD as an example through a diaphragm 521 and variable-focus lenses 511 and 522. In FIG. 38, the liquid crystal molecules are not shown.

With such an image pickup optical system, an AC voltage applied on the polymer dispersed liquid crystal layer 514 of the variable-focus lens 511 is adjusted by means of the variable resistor 519 to change the focal length of the variable-focus lens 511, so that continuous focusing can be performed at an object distance from infinity up to 600 mm as an example without movement of the variable-focus lenses 511 and 512 in the optical axis direction.

Example 1 of Variable-Focus Diffraction Optical Element

Figure 39:
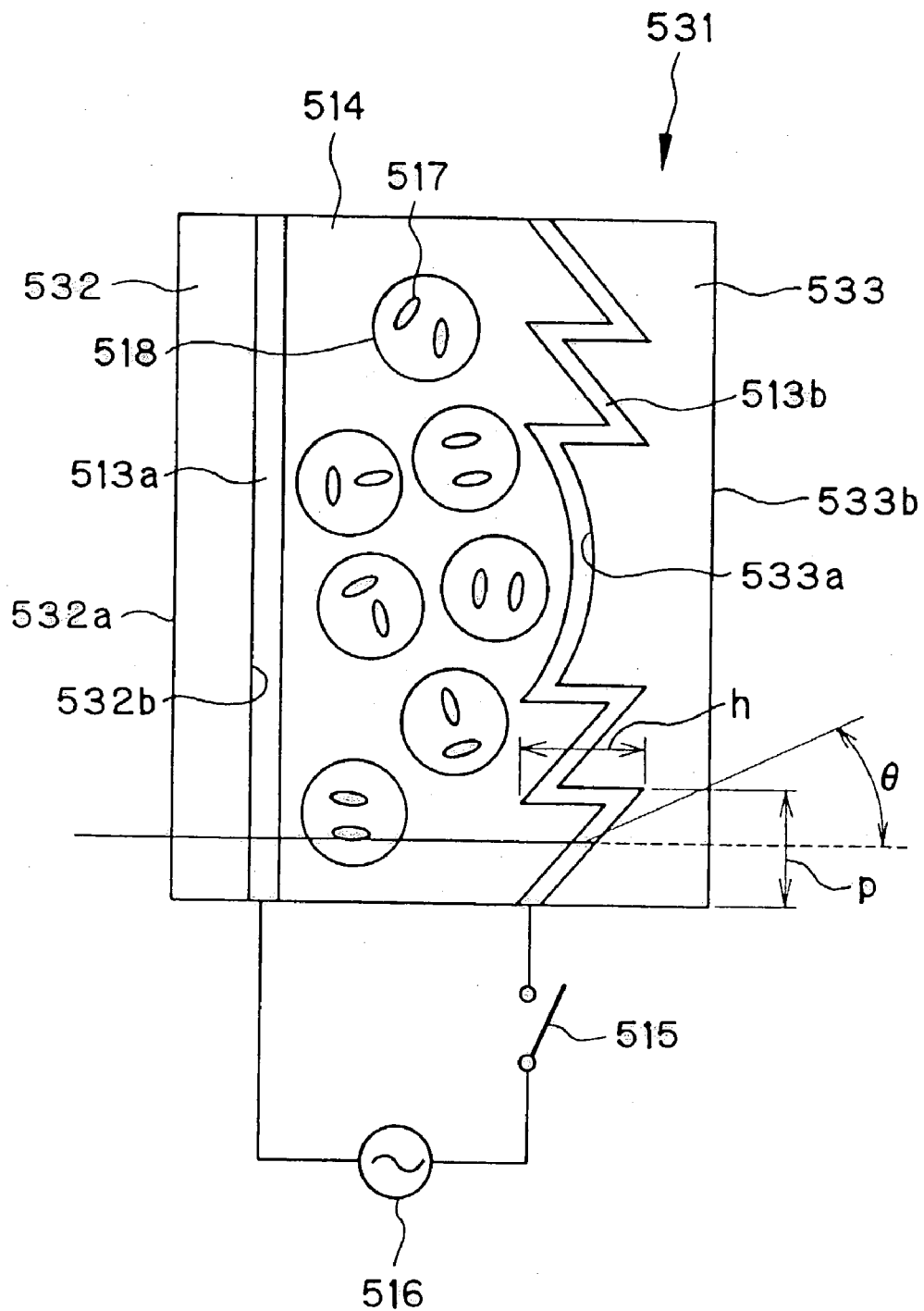
FIG. 39 is illustrative of the construction of one example of the variable-focus diffraction optical system.

FIG. 39 is illustrative of one exemplary construction of the variable-focus diffraction optical element functioning as the optical element having variable optical properties.

This variable-focus diffraction optical element 531 comprises a first transparent substrate 532 having a first surface 532a and a second surface 532b which are parallel with each other and a second transparent substrate 533 having a third surface 533a provided thereon with a ring diffraction grating having a groove depth of the order of wavelength of light and having sawtooth shape in section and a fourth surface 433b that is flat, so that incident light emerges from the element through the first and second transparent substrates 532 and 533. Between the first and second transparent substrates 532 and 533, the polymer dispersed liquid crystal layer 514 is interposed while transparent electrodes 513a and 513b are located, as explained with reference to FIG. 34. The transparent electrodes 513a and 513b are connected to an AC power source 516 via a switch 515, so that an AC voltage can be applied on the polymer dispersed liquid crystal layer 514.

In such an arrangement, a ray incident on the variable-focus diffraction optical element 531 leaves while deflected by an angle θ that satisfies $$p \sin \theta = m\lambda \quad (21)$$

Here p is the grating pitch of the third surface 533a and m is an integer. Let h be the groove depth, $n_{33}$ be the refractive index of the transparent substrate 533 and k be an integer. If the following equations (22) and (23)

$$h(n_A - n_{33}) = m\lambda \quad (22)$$

$$h(n_B - n_{33}) = k\lambda \quad (23)$$

are satisfied, the diffraction efficiency becomes 100% at the wavelength λ, thereby preventing flaring. In equation (22) $n_A$ is the refractive index of the polymer dispersed liquid crystal polymer 514 at no AC applied voltage, and in equation (23) $n_B$ is the refractive index of the polymer dispersed crystal polymer 514 at an applied AC voltage.

By finding a difference between both sides in equations (22) and (23), $$h(n_A - n_B) = (m - k)\lambda \quad (24)$$

is obtained. Therefore, if, for instance, λ=500 nm, $n_A$=1.55 and $n_B$=1.5, then $$0.05h = (m-k) \cdot 500 \ nm$$

If m=1 and k=0, then $$h = 10,000 \ nm = 10 \ \mu m$$

In this case, the refractive index $n_{33}$ of the transparent substrate 533 may be $n_{33}$=1.5, as found from the aforesaid equation (22). If the grating pitch at the peripheral area of the variable-focus diffraction optical element 531 is p=10 μm, then θ≈2.87° at which a lens having an F-number of 10 is obtainable.

Such a variable-focus diffraction optical element 531 has an optical path length that is variable as the application of voltage on the polymer dispersed liquid crystal layer 514 is held on or off; for instance, it may be located at a portion of a lens system at which light beams are not parallel for focusing purposes or so as to vary the focal length of the lens system, etc.

It is noted that in this example, the aforesaid equations (22), (23) and (24) may practically be replaced by $$0.7m\lambda \leq h(n_A - n_{33}) \leq 1.4m\lambda \quad (25)$$

$$0.7k\lambda \leq h(n_B - n_{33}) \leq 1.4k\lambda \quad (26)$$

$$0.7(m-k)\lambda \leq h(n_A - n_B) \leq 1.4(m-k)\lambda \quad (27)$$

Example 2 of the Variable-Focus Lens

Figure 40:
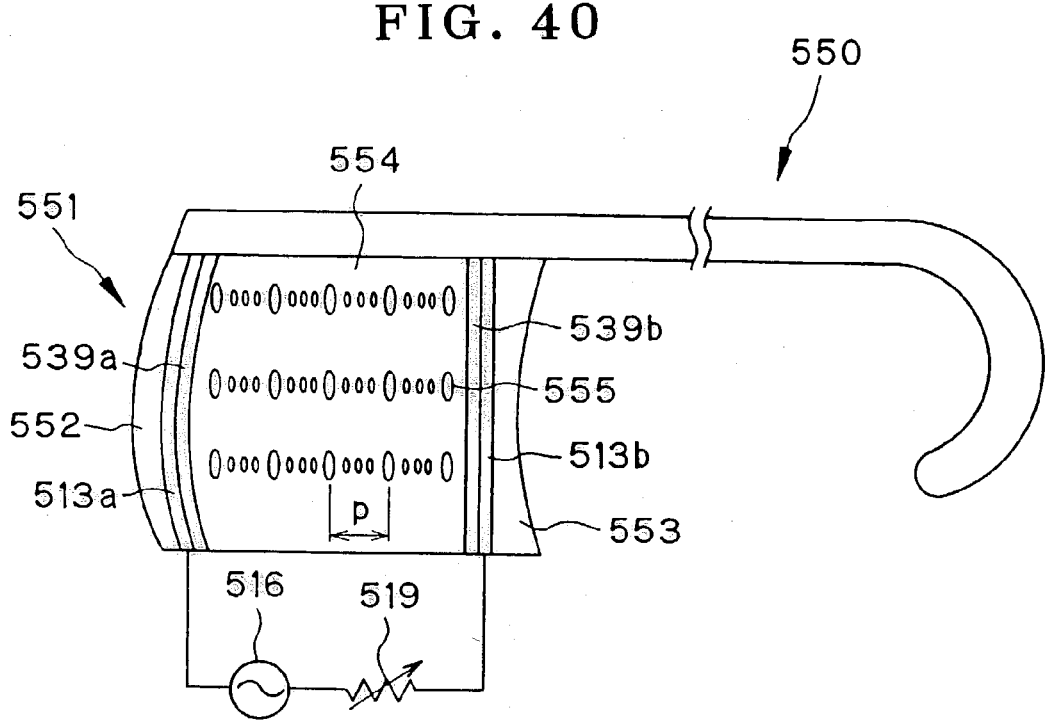
FIG. 40 is illustrative of variable-focus glasses comprising variable-focus lenses using twisted nematic liquid crystals.
Figure 41:
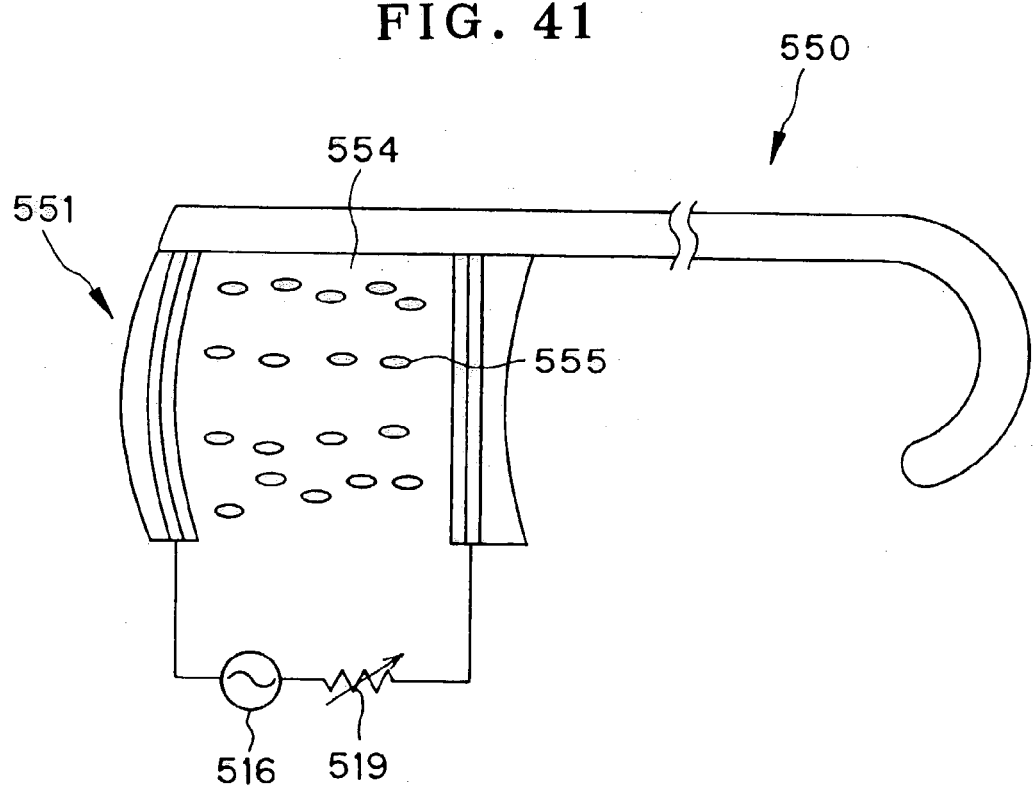
FIG. 41 is illustrative of how liquid crystal molecules line up when higher voltage is applied on the twisted nematic liquid crystal layer shown in FIG. 40.

There is also a variable-focus lens using a twisted nematic liquid crystal. FIGS. 40 and 41 are illustrative in section of one exemplary construction of variable-focus spectacles 550. The variable-focus lens 551 is constructed of lenses 552 and 553, orientation films 539a and 539b mounted on the inside surfaces of these lenses via transparent electrodes 513a and 513b, and a twisted nematic liquid crystal layer 554 interposed between these orientation films. The transparent electrodes 513a and 513b are connected to an AC power source 516 via a variable resistor 519, so that an AC voltage can be applied on the twisted nematic liquid crystal layer 554.

In such an arrangement, as the voltage applied on the twisted nematic liquid crystal layer 554 is increased, the liquid crystal molecules 555 line up in a homeotroic fashion as shown in FIG. 41 and, hence, the twisted nematic liquid crystal layer 554 is lower in refractive index and longer in focal length than the twisted nematic state at a low applied voltage as shown in FIG. 40.

It is here noted that the spiral pitch P of the liquid crystal molecules 555 in the twisted nematic state shown in FIG. 40 must be on the same level as or by far lower than the wavelength λ of light. For instance, it is thus preferred that $$2 \text{ nm} \leq P \leq 2\lambda/3 \tag{28}$$

It is here noted that the lower limit value of this condition is determined depending on the size of the liquid crystal molecule 555, and the upper limit value is required to ensure that when incident light is natural light, the twisted nematic liquid crystal layer 554 behaves as an isotropic medium in the state of FIG. 40. Unless this upper limit value is satisfied, the variable-focus lens 551 becomes a lens having varying focal length depending on the direction of polarization, only to yield a blurred image due to the formation of a double image.

Example 1 of the Variable Deflection Angle Prism

Figure 42A:
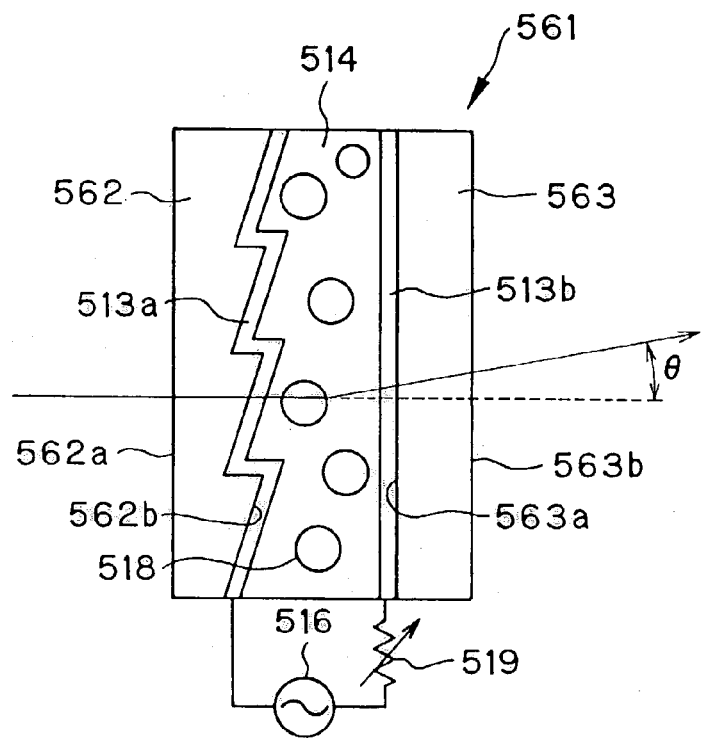
FIGS. 42(a) and 42(b) are illustrative of the constructions of two examples of the variable deflection angle prism.
Figure 42B:
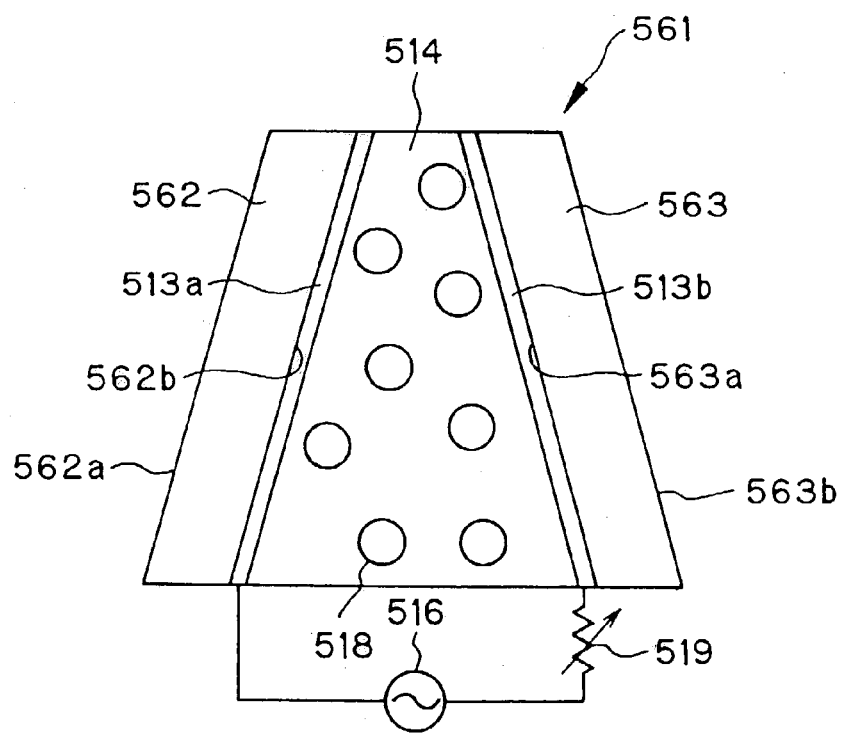

FIG. 42(a) is illustrative of one exemplary construction of the variable deflection angle prism functioning as the optical element having variable optical properties. This variable deflection angle prism 561 comprises a first transparent substrate 562 that is located on the entrance side of the prism and has a first surface 562a and a second surface 562b, and a second transparent substrate 563 in a plane-parallel plate form, which is located on the exit side of the prism and has a third surface 563a and a fourth surface 563b. The inside (second) surface 562b of the entrance-side transparent substrate 562 is configured in a Fresnel form, and between the transparent substrate 562 and the exit-side transparent substrate 563 there is provided a polymer dispersed liquid crystal layer 514 while transparent electrodes 513a and 513b are located, as explained with reference to FIG. 34. The transparent electrodes 513a and 513b are connected to an AC power source 516 via a variable resistor 519, so that an AC voltage is applied on the polymer dispersed liquid crystal layer 514 to control the angle of deflection, θ, of light transmitting through the variable deflection angle prism 561 and thereby control the direction of deflection of the transmitted light. As shown in FIG. 42(a), the inside surface 562b of the transparent substrate 562 is configured in a Fresnel form. As shown in FIG. 42(b) as an example, however, it is acceptable to relatively incline the inside surfaces of the transparent substrates 562 and 563, as is the case with an ordinary prism. Alternatively, it is acceptable to configure the prism in such a diffraction grating form as shown in FIG. 21. The aforesaid formulae (21) to (27) go true for such a diffraction grating-like prism.

Figure 43:
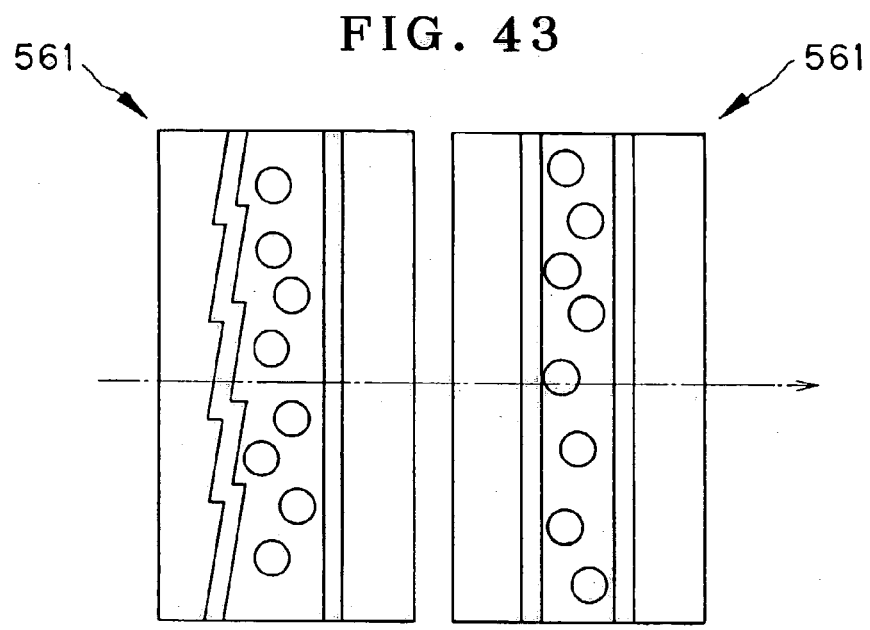
FIG. 43 is illustrative of how the variable deflection angle prism of FIGS. 42(a) and 42(b) is used.

The variable deflection angle prism 561 having such construction, for instance, may effectively be used for prevention of shaking of TV cameras, digital cameras, film cameras, binoculars, etc. Preferably in this case, the direction of diffraction (deflection) of the variable deflection angle prism 561 should be set in a vertical direction. To make further improvements in performance, it is preferable to use two variable deflection angle prisms 561, each shown in FIG. 42(a), while the direction of deflection of each prism 561 is set in a different direction in such a way that, as shown typically in FIG. 43, the angle of diffraction varies in horizontally and vertically diagonal directions. In FIGS. 42 and 43, the liquid crystal molecules are not shown.

Example 3 of the Variable-Focus Lens

Figure 44:
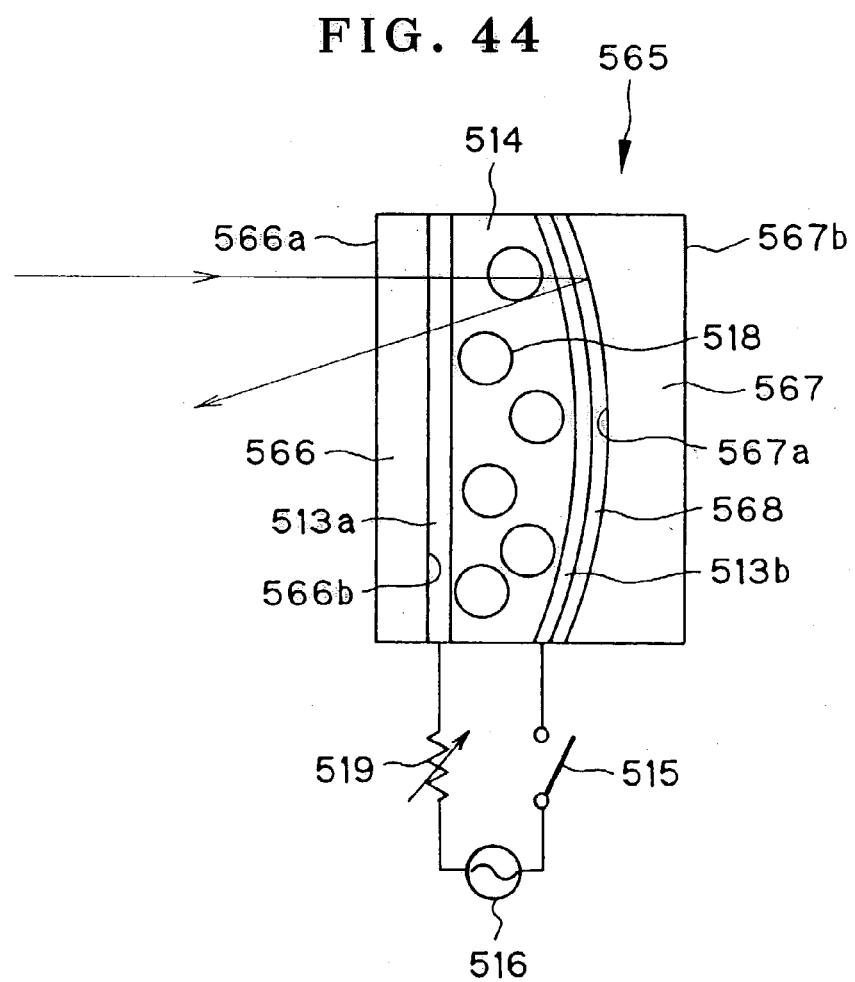
FIG. 44 is illustrative of the construction of one example of the variable-focus mirror as a variable-focus lens.

FIG. 44 is illustrative of an example wherein the variable-focus lens is used as a variable-focus mirror in an optical system. This variable-focus mirror 565 comprises a first transparent substrate 566 having a first surface 566a and a second surface 566b and a second transparent substrate 567 having a third surface 567a and a fourth surface 567b. The first transparent substrate 566 is configured in a plane plate or lens form with the inside (second) surface 566b provided with a transparent electrode 513a, and the inside (third) surface 567a of the second transparent substrate 567 is configured in a concave surface form provided thereon with a reflecting film 568. In addition, the reflecting film 568 is provided thereon with a transparent electrode 513b. Between the transparent electrodes 513a and 513b, the polymer dispersed liquid crystal layer 514 is provided as explained with reference to FIG. 34. The transparent electrodes 513a and 513b are then connected to an AC power source 516 via a switch 515 and a variable resistor 519, so that an AC voltage can be applied on the polymer dispersed liquid crystal layer 514. In FIG. 44, the liquid crystal molecules are not shown.

According to such an arrangement, a light ray entered from the transparent substrate 566 side takes an optical path that is turned back by the reflecting film (reflecting surface) 568 through the polymer dispersed liquid crystal layer 514, so that the light ray can act twice on the polymer dispersed liquid crystal layer 514. In addition, by varying the voltage applied on the polymer dispersed liquid crystal layer 514, the focal position of reflected light can be varied. In this case, the light ray incident on the variable-focus mirror 565 transmits twice through the polymer dispersed liquid crystal layer 514; each of the aforesaid formulae holds true for this example on condition that t is indicative of a thickness twice as large as the polymer dispersed liquid crystal layer 514. It is noted that if the inside surface of the transparent substrate 566 or 567 is configured in such a diffraction grating form as shown in FIG. 39, it is then possible to reduce the thickness of the polymer dispersed liquid crystal layer 514 and thereby achieve further reductions in scattered light.

While the example has been explained on the presumption that to prevent deterioration in the liquid crystals, the AC voltage is applied on the liquid crystal layer using the AC power source 516 as a power source, it is acceptable to apply DC voltage on the liquid crystal layer using a DC power source. Changes in the direction of the liquid crystal molecules are achievable not only by changing the applied voltage but also by changing the frequency of the electric field applied on the liquid crystal layer, the intensity and frequency of the magnetic filed applied on the liquid crystal layer or the temperature of the liquid crystal layer, etc. In the foregoing explanation of the example, some polymer dispersed liquid crystal layers are in a state close to solid rather than liquid. In this case, one of the lenses 512a and 512b shown in FIG. 34, one of the transparent substrates 532 and 533 shown in FIG. 49, one of the lenses 552 and 553 shown in FIG. 40, the transparent substrate 563 shown in FIG. 42(a), one of the transparent substrates 562 and 563 shown in FIG. 42(b), and one of the transparent substrates 566 and 567 shown in FIG. 44 may be dispensed with.

The merits of the optical elements of such types as explained with reference to FIGS. 34 to 44, wherein the focal length, etc. of the optical elements vary with changes in the refractive index of the medium forming the polymer dispersed liquid crystal layer, are that mechanical designs are facilitated, mechanical structures are simplified, etc.

Example 4 of the Variable-Focus Lens

Figure 45:
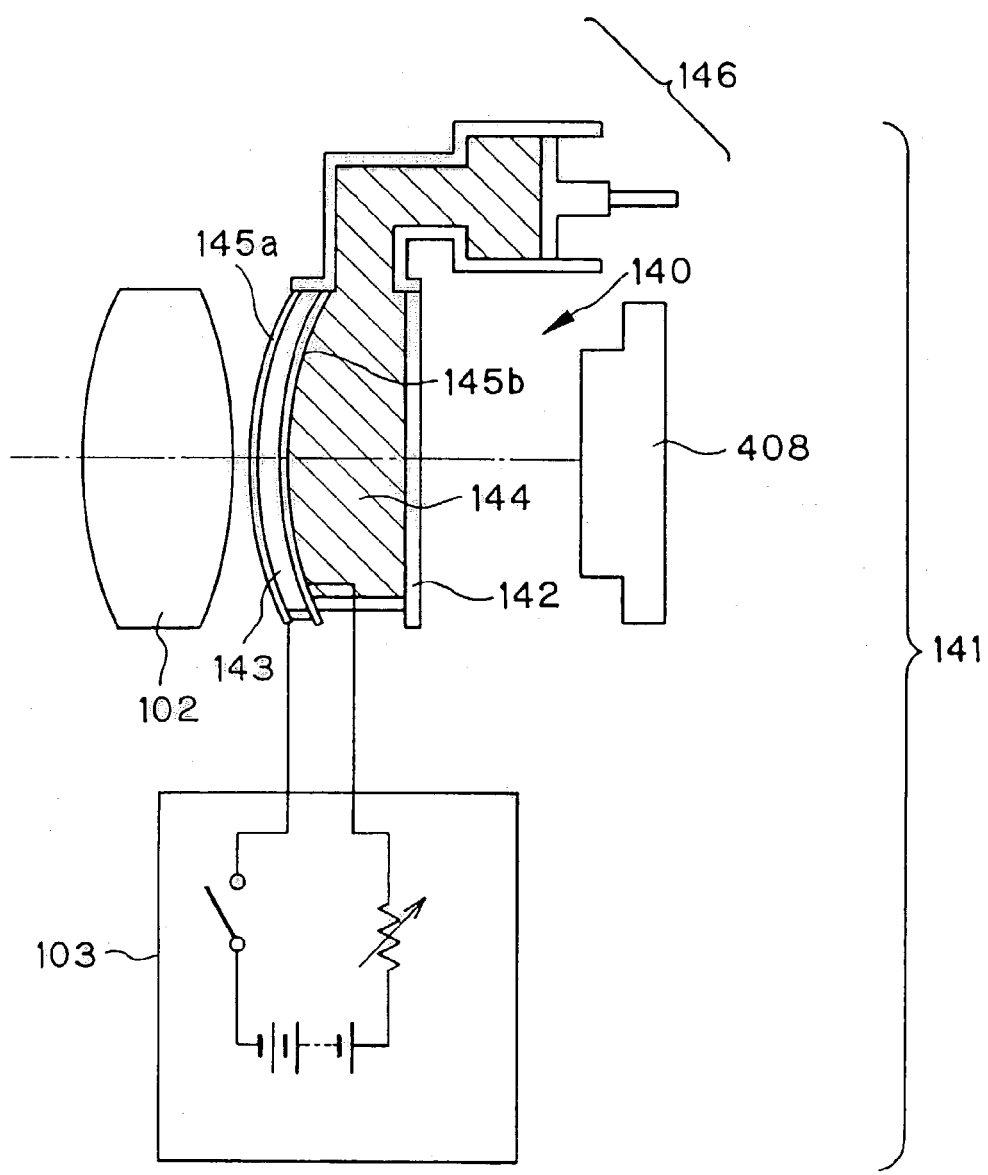
FIG. 45 is illustrative of the image pickup unit 141 used as the optical apparatus of the invention, and the optical system for the image pickup unit 141, in which the variable-focus lens 140 is used.

FIG. 45 is illustrative in schematic of one exemplary construction of the image pickup unit 141 constructed by using a variable-focus lens 140 in the image pickup optical system of the optical apparatus of the invention. The image pickup unit 141 may be used as the image pickup optical system of the invention.

This example is directed to an image pickup lens made up of a lens 102 and a variable-focus lens 140. This image pickup lens is used together with a solid-state image pickup device 408 to set up the image pickup unit 141. The variable-focus lens 140 is composed of a plane plate form of transparent member 142, a piezoelectric synthetic resin or other soft transparent substance 143 sandwiched between a pair of transparent electrodes 145a and 145b, and a light-transmitting fluid or jelly-like substance 144 sandwiched between the transparent member 142 and the transparent electrode 145b.

For the fluid or jelly-like substance 144, silicone oil, elastic rubber, jelly, water or the like may be used. Voltage is applied via a circuit 103 on the transparent electrodes 145a and 145b with the transparent substance 143 sandwiched between them, so that the transparent substance 143 is transformed due to its piezoelectric effect to vary the focal length of the variable-focus lens 140. It is noted that the circuit 103 has therein a power source, a variable resistor, a switch, etc. As the aforesaid transparent substance 143 is transformed, pressure is applied on the fluid or jelly-like substance 144 via a cylinder 146 so that the fluid or jelly-like substance 144 is transformed following the transformation of the transparent substance 143.

Accordingly, even at a varying object distance, focusing can be performed without moving the image pickup optical system with a motor or the like. Thus, this example is much more improved in terms of size, weight and power consumptions.

In FIG. 45, reference numerals 145a and 145b represent the transparent electrodes, and 146 stands for the cylinder for storing the fluid or jelly-like substance 144. For the material for the transparent substance 143, polymer piezoelectric materials such as polyurethane, silicone rubber, acryl elastomer, PZT, PLZT and poly-(vinylidene fluoride) (PVDF), copolymers such as vinylidene cyanide copolymers and vinylidene fluoride-trifluoroethylene copolymers, etc. may be used.

Use of organic materials having piezoelectricity, synthetic resins having piezoelectricity, elastomer materials having piezoelectricity, etc. is preferable because large transformation of the lens surface of the variable-focus lens 140 is achievable. Transparent piezoelectric materials are preferably used for the transparent substance 143 of the variable-focus lens 140.

Figure 46:
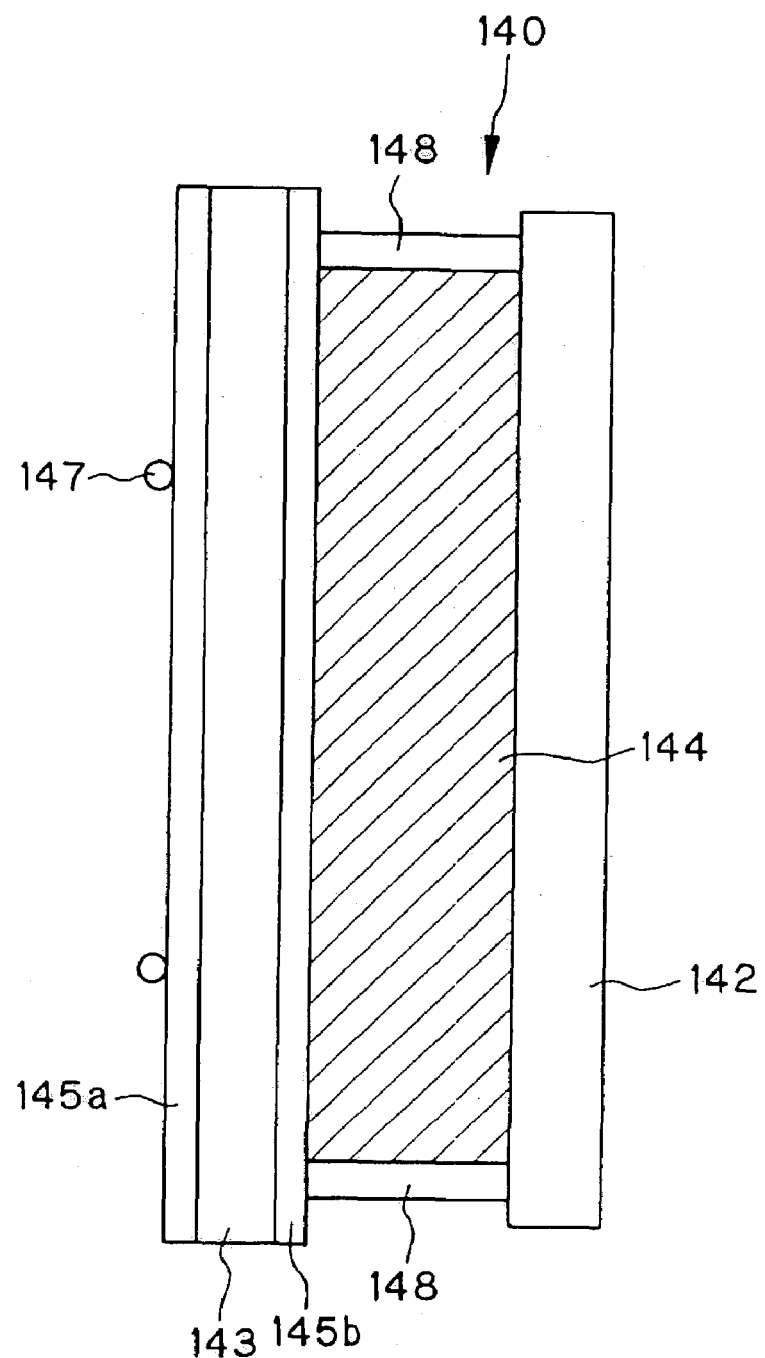
FIG. 46 is illustrative of a modification to the variable-focus lens of FIG. 45.

It is noted that the cylinder 146 may be removed from the variable-focus lens 140 of FIG. 45. Instead, as shown in FIG. 46, there are provided a support member 147 and a transformable member 148 for closing up the fluid or jelly-like substance 144 on their peripheral side.

Figure 47:
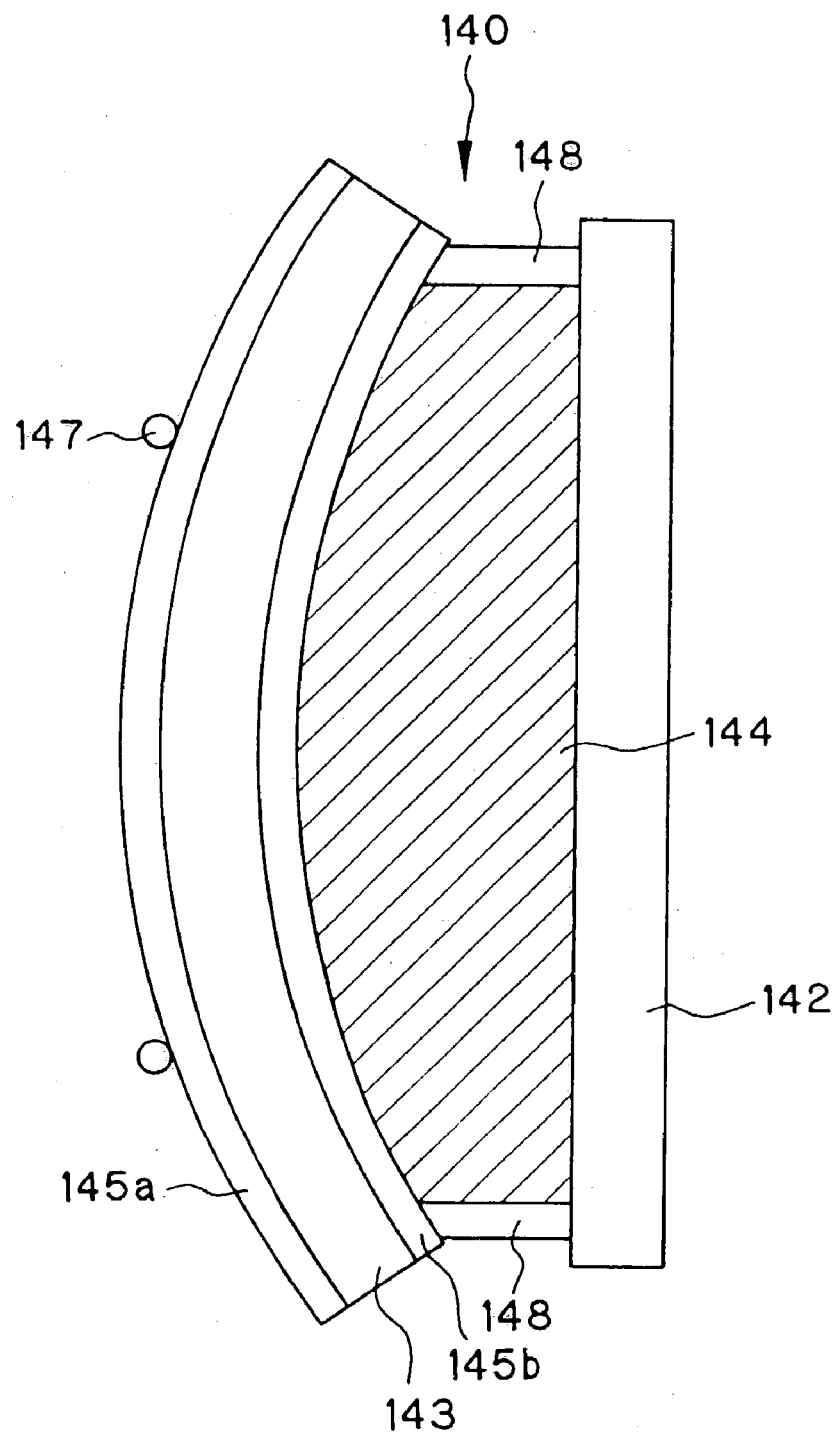

The support member 147 comprises a zonal member fixed to the transparent member 142 at a given space therefrom. Between the support member 147 and the transparent member 142 there is provided the aforesaid substance 144 closed up with the transparent member 142, the electrode 145b and the aforesaid member 148. This substance 144 is transformed following the transformation of the transparent substance 143 between the pair of transparent electrodes 145a and 145b. The transparent substance 143 is closed up at its peripheral portion. According to this example, voltage is applied on the transparent substance 143 via the transparent electrodes 145a and 145b to transform the same. Even so, the transformable member 148 is transformed in such a way that the whole volume of the fluid or jelly-like substance 144 remains invariable, as shown in FIG. 47. This is the reason why that cylinder can be dispensed with. In FIGS. 46 and 47, reference numeral 148 stands for the transformable member formed of an elastic member, an accordion form of synthetic resin or metal, or the like.

In the examples of FIGS. 45 and 47, the opposite application of voltage causes the transparent substance 143 to be transformed in the opposite direction, resulting in the formation of a concave lens.

It is noted that when an electrostrictive material such as acryl elastomer or silicone rubber is used for the transparent substance 143, it is preferable to laminate the transparent substance 143 onto the transparent substrate and electrostrictive material.

Example 5 of Variable-Focus Lens

Figure 48:
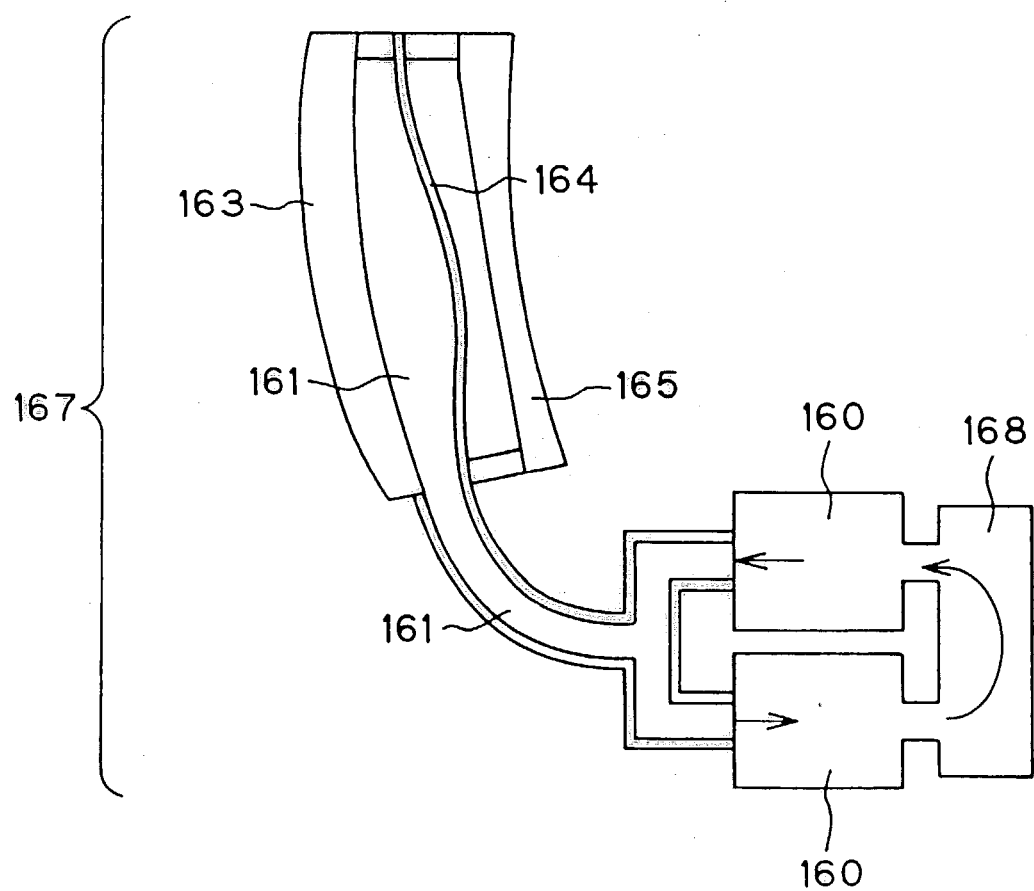
FIG. 48 is illustrative in schematic of yet another example of the variable-focus lens, that is, the variable-focus lens 167 to and from which the fluid 161 is fed or removed by a micropump for transformation of the lens surface.

FIG. 48 is illustrative in schematic of a further example of the variable-focus lens, that is, a variable-focus lens 167 wherein a micropump 160 is used to feed or remove fluid 161 to or from the same, thereby transforming the lens surface of the variable-focus lens 167.

The micropump 160, for instance, is a power-driven, miniature pump fabricated by micromachining. The fluid 161 is sandwiched between a transparent substrate 163 and a transparent elastic member 164. The elastic member 164 provides a lens surface that is transformed by the fluid 161. In FIG. 48, reference numeral 165 stands for a transparent substrate for protection of the elastic member 164; however, this transparent substrate 165 is not necessarily required.

Exemplary pumps fabricated by micromachining include those harnessing thermal transformation, piezoelectric materials, and electrostatic force.

For instance, two micropumps, each shown in FIG. 33, may be used as is the case with the micropump 160 used for the variable-focus lens 160 shown typically in FIG. 48.

In this arrangement, as the fluid 161 is fed by driving the miropump 160 to transform the elastic member 164, the shape of the lens surface changes in response to light transmitting through the transparent substrate 163, fluid 161 and elastic member 164, so that the focal position of the lens varies.

Some variable-focus lenses making use of electrostatic force, piezoelectric effect, etc. often require high driving voltage. In this case, it is preferable to set up a control system using a boosting transformer, a piezoelectric transformer, etc. Particular preference is given to a multilayer piezoelectric transformer because size reductions are achievable.

Example 6 of the Variable-Focus Lens

Figure 49:
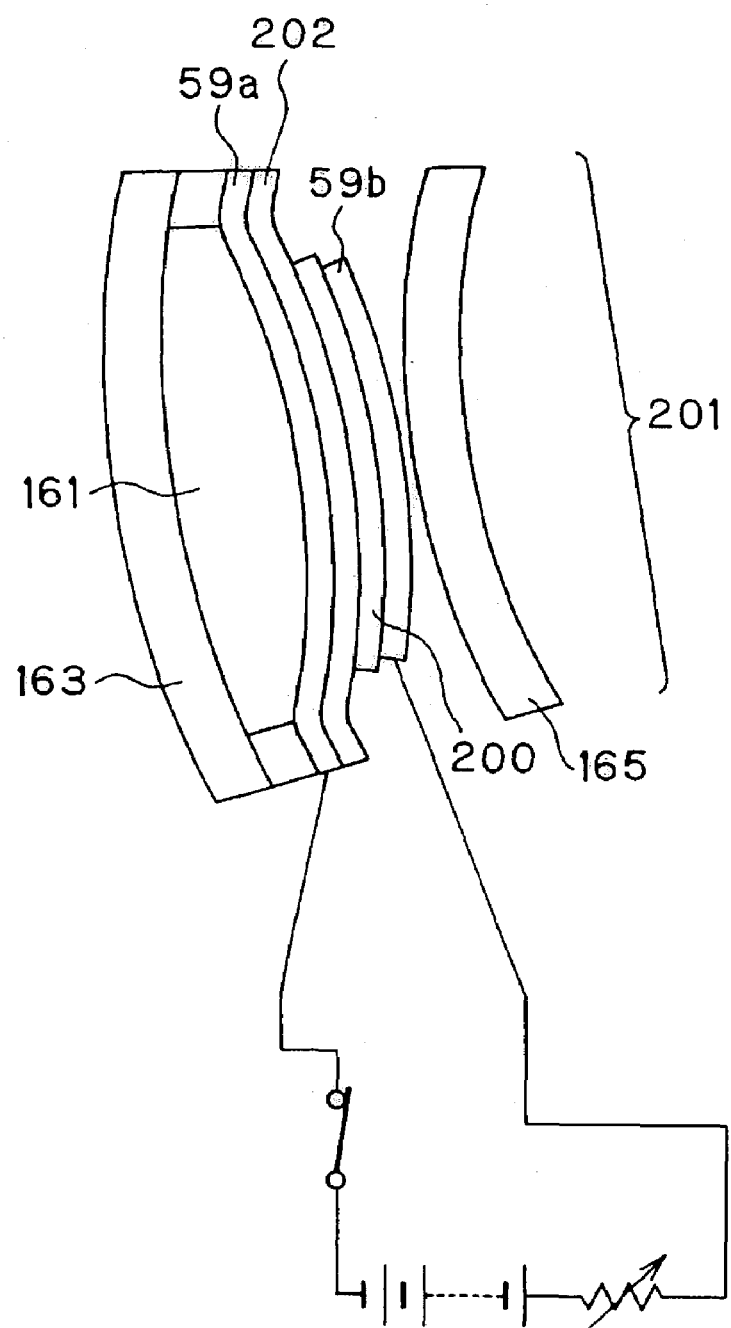
FIG. 49 is illustrative in schematic of another example of the optical element having variable optical properties, that is, the variable-focus lens 201 using the piezoelectric material 200.

FIG. 49 is illustrative of a further example of the variable-focus lens having variable optical properties, that is, a variable-focus lens 201 wherein a piezoelectric material 200 is used instead of the elastic member 164 of FIG. 48. In this example, the fluid 161 is closed up between a transparent substrate 163 and a transparent electrode 59a.

A material similar to the transparent substance 143 is used for the piezoelectric material 200, which is provided on a transparent, soft substrate 202. Preferably in this case, synthetic resins or organic materials should be used for the substrate 202.

In this example, voltage is applied on the piezoelectric material 200 via two transparent electrodes 59a and 59b, so that the piezoelectric material 200 is transformed, acting as a convex lens in FIG. 49.

Figure 50:
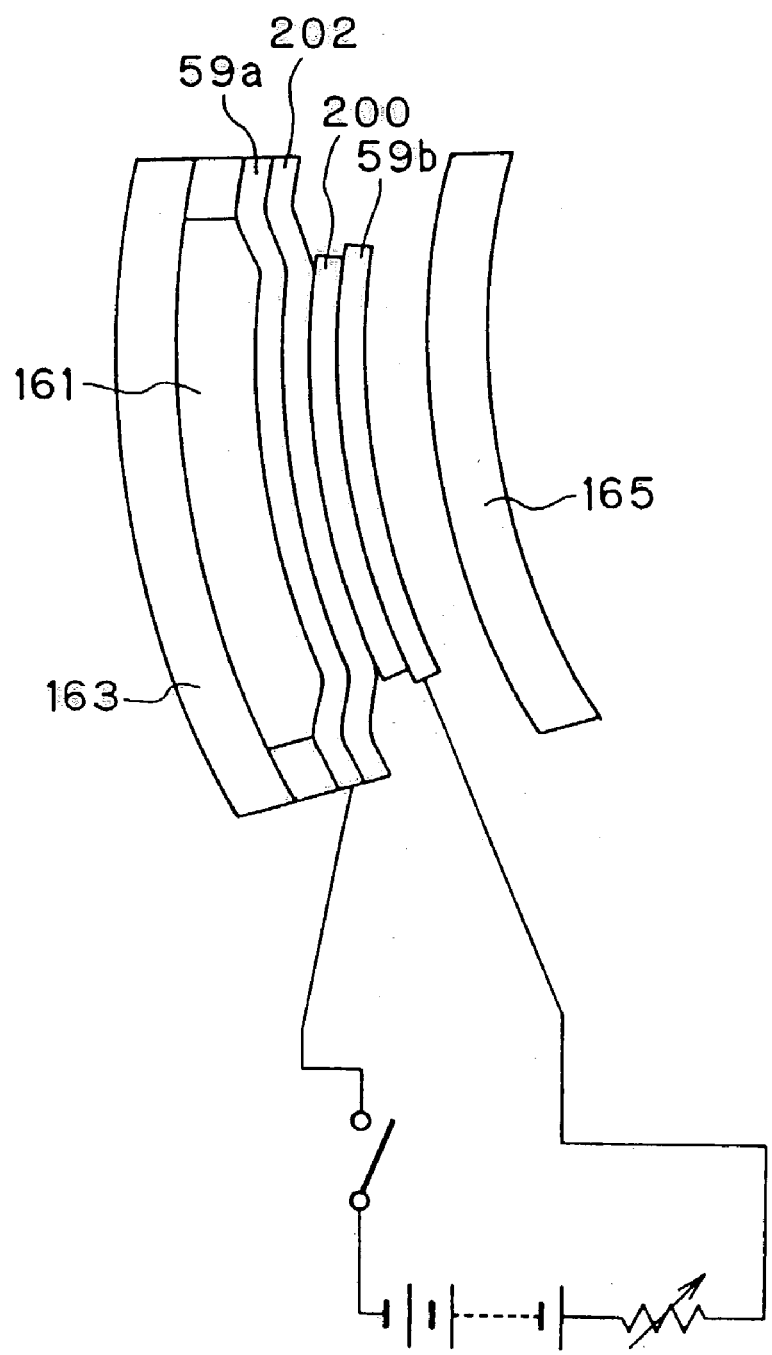
FIG. 50 is illustrative of the state of a modified variable-focus lens to FIG. 49.

Alternatively, it is acceptable that the substrate 202 is previously configured in a convex form while the size of at least one of the two transparent electrodes 59a and 59b differs from that of the substrate 202. For instance, one transparent electrode 59b is made smaller than the substrate 202. When voltage is put off in this state, only opposite portions of the two electrodes 59a and 59b are transformed in a concave form, as shown in FIG. 50, acting as a concave lens and so a variable-focus lens.

At this time, the substrate 202 is transformed in such a way that the volume of the fluid 161 remains invariable, offering a merit that any reservoir can be dispensed with.

A major merit of this example is that a portion of the substrate 202 that retains the fluid 161 can be transformed by means of the piezoelectric material, so that any reservoir can be dispensed with.

It is noted that although common to the example of FIG. 48, the transparent substrates 163 and 165 may each be configured as a lens or a plane.

Example 7 of the Variable-Focus Lens

Figure 51:
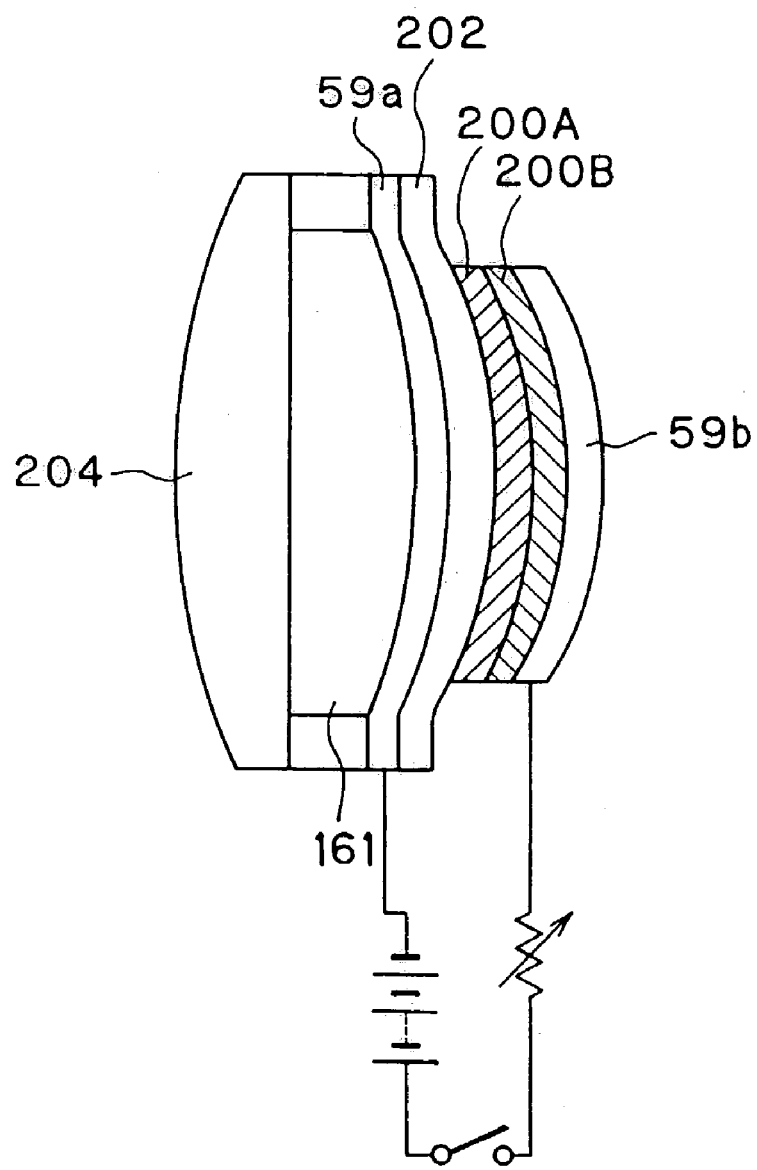
FIG. 51 is illustrative of yet another example of the optical element having variable optical properties, that is, a variable-focus lens using two thin sheets 200A and 200B each formed of a piezoelectric material.

FIG. 51 is illustrative in schematic of a further example of the variable-focus lens having variable optical properties, that is, a variable-focus lens wherein two thin sheets 200A and 200B formed of a piezoelectric material are used instead of the piezoelectric material 200 of FIG. 50.

This variable-focus lens has a merit of using the thin sheets 200A and 200B while the directivity of the piezoelectric material is reversed, thereby increasing the amount of transformation and achieving a wide variable-focus range.

In FIG. 51, reference numeral 204 stands for a lens form of transparent substrate, and 161 represents fluid.

In this example, too, the right-hand transparent electrode 59b in FIG. 51 is made smaller than the substrate 202.

It is noted that if, in the examples of FIGS. 49, 50 and 51, the substrate 202, piezoelectric material 200 and thin sheets 200A and 200B are configured to have uneven thickness, it is then possible to control the manner of transformation at an applied voltage.

This is convenient for correction of lens aberrations, etc.

Example 8 of the Variable-Focus Lens

Figure 52:
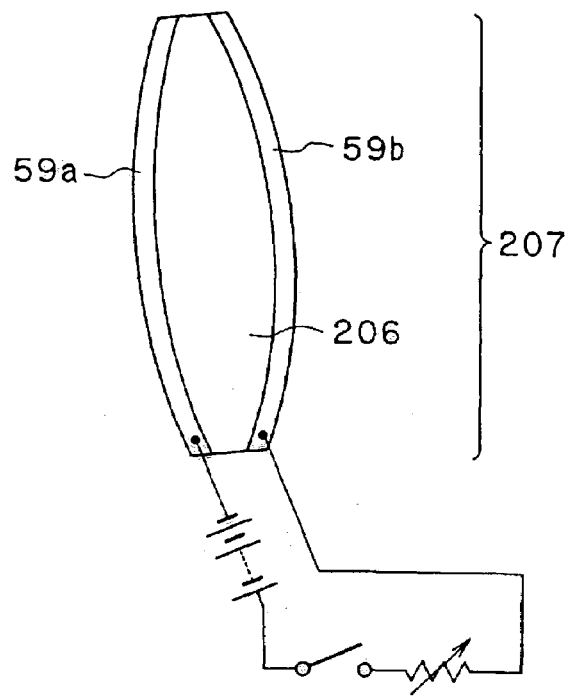
FIG. 52 is illustrative in schematic of yet another example of the variable-focus lens.

FIG. 52 is illustrative in schematic of a further example of the variable-focus lens.

This variable-focus lens 207 is made up of a pair of transparent electrodes 59a and 59b and an electrostrictive material 206 such silicone rubber or acryl elastomer, which is sandwiched between them.

Figure 53:
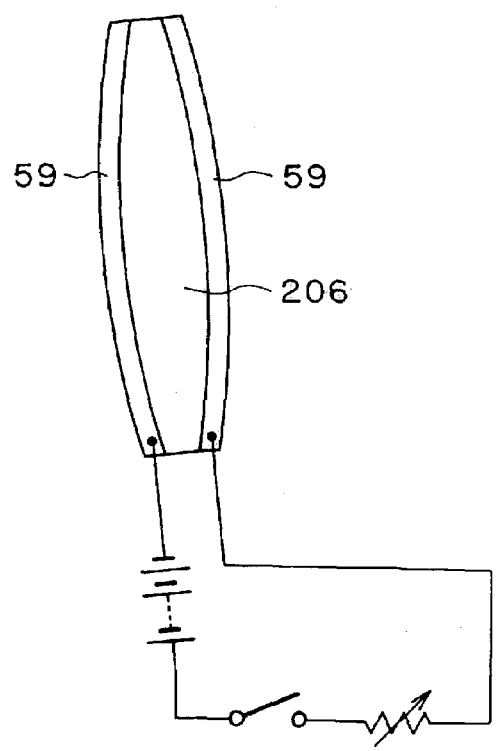
FIG. 53 is illustrative of the state of the variable-focus lens of FIG. 52.

According to the arrangement of this example, the lens 207 inflates at its middle portions at a low applied voltage as shown in FIG. 52, acting as a convex lens. At a high applied voltage, the electrostrictive material 206 elongates vertically but contracts horizontally as shown in FIG. 53, increasing in focal length and acting as a variable-focus lens.

A merit of this variable-focus lens is that power consumptions can be reduced because of no need of a large power source.

Commonly to the variable-focus lenses of FIGS. 45 to 53, variable focus is achievable through changes in the shape of the medium acting as a lens. Merits of such lenses over variable-focus lenses having varying refractive indices are that the range of focal length changes, their sizes, etc. can be selected without restraint.

Example 9 of the Variable-Focus Lens

Figure 54:
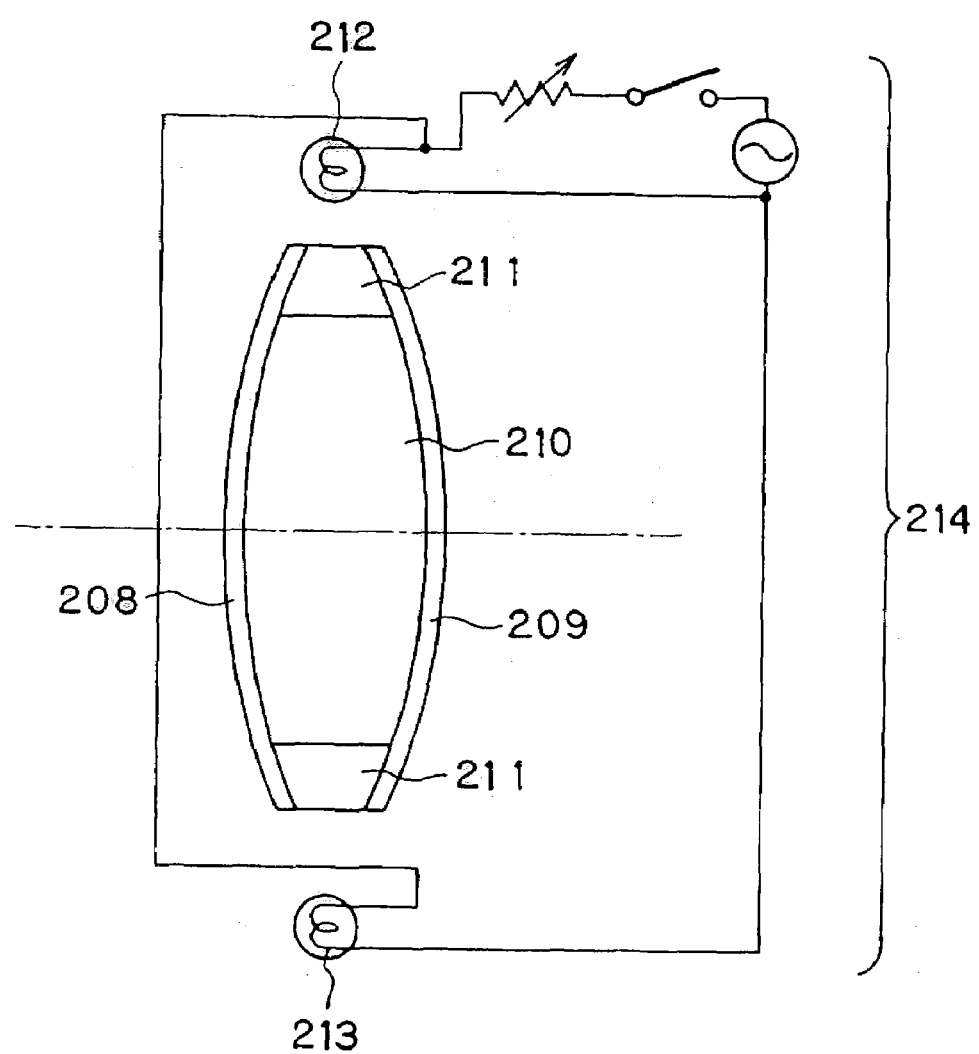
FIG. 54 is illustrative in schematic of a further example of the optical element having variable optical properties, that is, the variable-focus lens harnessing photonic effect.

FIG. 54 is illustrative in schematic of a further example of the variable-focus lens having variable optical properties, that is, a variable-focus lens making use of photomechanical effect.

This variable-focus lens 214 is built up of azobenzene 210 sandwiched between transparent elastic members 208 and 209. The azobenzene 210 is irradiated with light by way of transparent spacers 211.

In FIG. 54, reference numerals 212 and 213 stand for light sources having wavelengths $\lambda 1$ and $\lambda 2$, respectively, such as LEDs or semiconductor lasers.

Figure 55A:
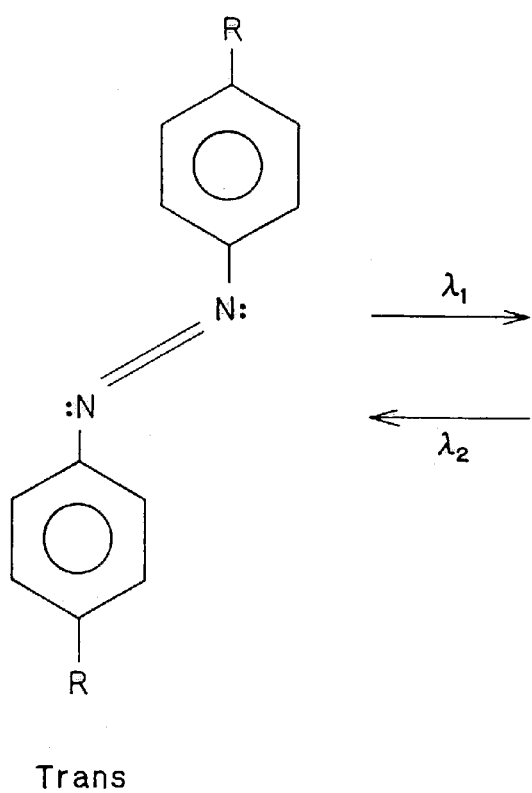
FIGS. 55(*a*) and 55(*b*) are illustrative of the structures of trans-form azobenzene and cis-form azobenzene, respectively, both used for the variable-focus lens of FIG. 54.
Figure 55B:
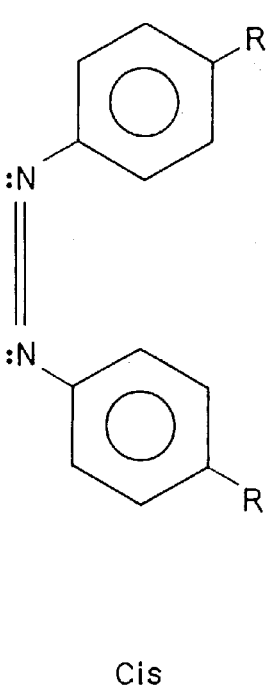

In the instant example, as the trans-form azobenzene shown in FIG. 55(a) is irradiated with light having the center wavelength $\lambda 1$, the azobenzene 210 changes to cis-form azobenzene shown in FIG. 55(b), resulting in volume decreases. Consequently, the variable-focus lens 214 becomes thin and so the convex lens action becomes slender.

As the cis-form azobenzene 210 is irradiated with light having the center wavelength $\lambda 2$, on the other hand, the azobenzene 210 changes from cis to trans-form, resulting in volume increases. Consequently, the variable-focus lens 241 becomes thick and so the convex lens action increases.

In this way, this optical element 214 acts as a variable-focus lens.

From variable-focus lens 214, there is no light leakage that ensures high efficiency, because light is totally reflected at the boundaries between the transparent elastic members 208, 209 and air. It is here noted that light used for the lens may have wavelengths from visible to infrared wavelength, and that mixtures of azobenzene with other liquids may be used as the azobenzene 210.

Example 9 of the Variable-Shape Mirror

Figure 56:
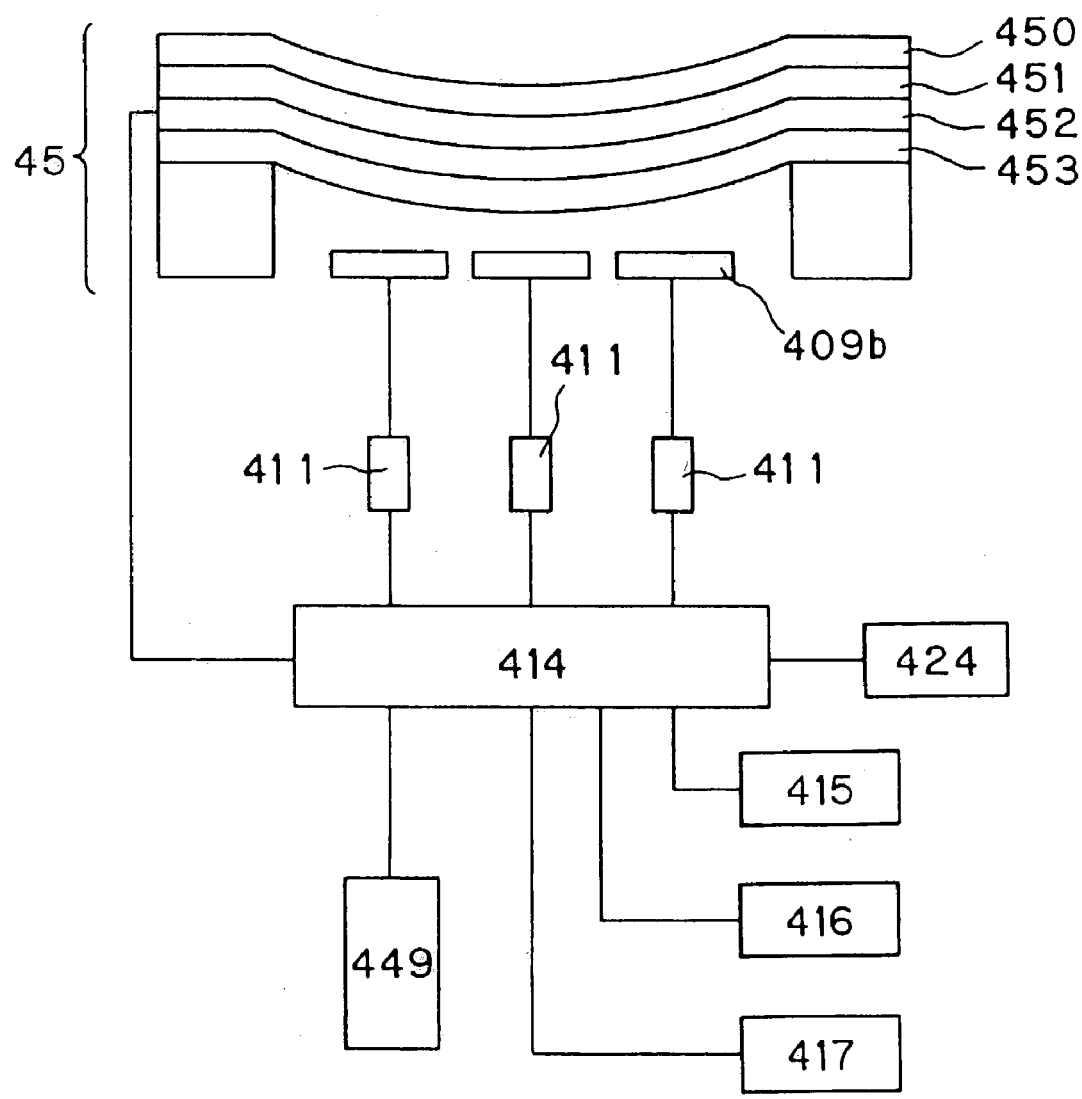
FIG. 56 is illustrative in schematic of a further example of the variable-shape mirror.

FIG. 56 is illustrative in schematic of a further example of the variable-shape mirror. This example is now explained with reference to a digital camera. In FIG. 56, reference numeral 411 is a variable resistor, 414 a computing unit, 415 a temperature sensor, 416 a humidity sensor, 417 a distance sensor, and 424 a shake sensor.

This variable-shape mirror 45 comprises a plurality of divided electrodes 409b spaced away from an electrostrictive material 453 comprising an organic material such as acryl elastomer. On the electrostrictive material 453 there are provided an electrode 452 and a transformable substrate 451 in this order. On the substrate 451 there is an aluminum or other metallic reflecting film 450 that reflects incident light. Thus, the transformable layer of the variable-shape mirror 45 has a four-layer structure.

A merit of this arrangement over an arrangement wherein the divided electrodes 409b are integral with the electrostrictive material 453 is that the surface shape of the reflecting film (reflecting surface) 450 is so smooth that aberrations are unlikely to occur optically.

It is here noted that the locations of the transformable substrate 451 and electrode 452 may be reversed.

In FIG. 56, reference numeral 449 stands for a scaling or zooming button for an associated optical system. The variable-shape mirror 45 is controlled via the computing unit 414 in such a way that the reflecting film 450 can be transformed by pressing down the button 449 for scaling or zooming purposes.

It is acceptable to use the already mentioned piezoelectric materials such as barium titanate instead of the electrostrictive materials comprising organic material such as acryl elastomer.

Finally, the definitions of the terms used herein are collectively explained.

By the term "optical apparatus" is intended an apparatus including either an optical system or an optical element. This apparatus is not always required to function by itself, that is, it may form a part of the apparatus assembly.

The optical apparatus, for instance, includes image pickup apparatus, viewing apparatus, display apparatus, illumination apparatus, and signal processors.

Specific examples of the image pickup apparatus are film cameras, digital cameras, robots' eyes, lens inter-changeable digital single-lens reflex cameras, TV cameras, moving-image recorders, electronic moving-image recorders, camcorders, VTR cameras and electronic endoscopes. Digital cameras, card type digital cameras, TV cameras, VTR cameras, moving-image recording cameras, etc. are all examples of the electronic image pickup apparatus.

Specific examples of the viewing apparatus are microscope, telescopes, spectacles, binoculars, loupes, fiber scopes, finders and view finders.

Specific examples of the display apparatus are liquid crystal displays, view finders, game machines (the Play Station series manufactured by SONY), video projectors, liquid crystal projectors, head mounted displays (HMDs), PDAs (personal digital assistants) and cellular phones.

Specific examples of the illumination apparatus are cameras' flashes, cars' headlights, endoscopes light sources, and microscope light sources.

Specific examples of the signal processor are cellar phones, personal computers, game machines, read/write devices for optical discs, and computing units for optical computers.

It is noted that the optical systems of the invention, because of being of compact size and light weight, can effectively be applied to electronic image pickup apparatus and signal processors, especially image pickup system of digital cameras and cellular phones.

The image pickup device, for instance, refers to CCDs, pickup tubes, solid-state image pickup devices, and photographic films.

A plane-parallel plate is included in one of prisms, and a diopter change is included in changes in an observer. Subject changes include a change in the distance of an object that is the subject, movement of the object, motion, vibration and shaking of the object, etc.

The extended curved surface, by definition, includes every surface such as a spherical surface; a plane; a rotationally symmetric aspheric surface; a spherical surface, a plane and a rotationally symmetric aspheric surface decentered with respect to an optical axis; an aspheric surface having planes of symmetry; an aspheric surface having only one plane of symmetry; an aspheric surface having no plane of symmetry; a free-form surface; and a surface including an undifferentiable line or point. That is, the extended curved surface includes every surface that has some influences on light whether it is a reflecting surface or a refracting surface.

These surfaces are generally called the extended curves surface.

The optical element having variable optical properties includes a variable-focus lens, a variable-shape mirror, a polarizing prism having a variable surface shape, a prism having a variable apex angle and a variable diffraction optical element having a variable light deflection action, i.e., a variable HOE and a variable DOE.

The variable-focus lens includes a variable lens having a variable amount of aberrations but having an invariable focal length, and so does the variable-shape mirror.

In short, an optical element having variable light defection actions such as reflection, refraction and diffraction of light is referred to as the optical element having variable optical properties.

The information transmission apparatus refers to an apparatus that can enter and transmit some information such as cellular phones; remote controllers for fixed telephone sets, game machines, televisions, radio-cassette players and stereos; personal computers; keyboards, mouses and touch panels for personal computers.

TV monitors, personal computer monitors and displays provided with an image pickup apparatus are also included in that term.

The information transmission apparatus is included in the signal processor.

According to the present invention as explained above, there can be provided an image pickup apparatus that has low power consumptions, ensures noiseless operations and fast responses and contributes to cost reductions due to simplified mechanical structure, and, albeit having a small outside diameter and compact size, is capable of focusing and zooming.

What we claim is:

1. An optical apparatus, comprising:
  a climbing type autofocusing function,
  an optical system, and
  an optical element having variable optical properties, which element changes from a first state to a fourth state, wherein:
  said optical element having variable optical properties changes from a second state to a third state for focusing, and
  to change from the first state to the second state and from the third state to the fourth state, said optical element having variable optical properties has an amount of change in its focal length required to change focus of said optical system by at least one-third of Sd determined by the following condition (370):

$$Sd = k \times P \times Fno \tag{370}$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction.

2. A zoom optical system, comprising:
  an optical element having variable optical properties, and
  a moving optical element group, wherein:
  said moving optical element group has a zooming function, and said optical element having variable optical properties is a reflection type optical element and possesses a focusing function, which comprises a first optical element group located in front of said optical element having variable optical properties.

3. The zoom optical system according to claim 2, wherein said moving optical element group has negative power.

4. The zoom optical system according to claim 2, which comprises:
a second optical element group located in the rear of said optical element having variable optical properties or an air separation located in the rear of said optical element having variable optical properties, and
a third optical element group located in the rear of said moving optical element group.

5. The zoom optical system according to claim 2, which satisfies the following condition (301)

$$0.3 < |\beta v| < 6 \tag{301}$$

where $\beta v$ is a magnification of said moving optical element group.

6. The zoom optical system according to claim 2, which satisfies the following condition (305):

$$\beta vw \cdot \beta vT < 5 \tag{305}$$

where $\beta vw$ is a magnification of said moving optical element group at a wide-angle end of said optical system, and $\beta vT$ is a magnification of said moving optical element group at a telephoto end of said optical system.

7. The zoom optical system according to claim 2, which satisfies the following condition (311):

$$-3 < fv/f < 15 \tag{311}$$

where fv is a focal length of said moving optical element group, and f is a focal length of said zoom optical system from which said optical element having variable optical properties is removed.

8. The zoom optical system according to claim 2, which satisfies the following condition (316):

$$f1/f < 0 \tag{316}$$

where f1 is a focal length of said first optical element group, and f is a focal length of said zoom optical system from which said optical element having variable optical properties is removed.

9. The zoom optical system according to claim 2, which satisfies the following condition (335):

$$39° < \Phi < 55° \tag{335}$$

where $\Phi$ is an angle of incidence of an axial chief ray on said optical element having variable optical properties.

10. The optical apparatus according to claim 2, wherein said moving optical element group has negative refracting power.

11. An optical system, comprising:
an optical axis;
an optical element having variable optical properties has a zooming or focusing function, wherein said optical element having variable optical properties is a reflection type optical element; and
an image formation plane, wherein the image formation plane tilts with respect to the optical axis,
wherein upon zooming or focusing, said optical element having variable optical properties moves in a given direction.

12. An optical system, comprising:
an optical element having variable optical properties has a zooming or focusing function, wherein said optical element having variable optical properties is a reflection type optical element; and
upon zooming or focusing, said optical element having variable optical properties moves in a given direction,
wherein a direction of movement of said optical element having variable optical properties is substantially vertical to a surface of said optical element having variable optical properties.

13. The optical system according to claim 12, which has a compensator function.

14. An optical system, comprising:
an optical element having variable optical properties and moving in a given direction, wherein said optical system satisfies the following condition:

$$0 |x|/f < 1$$

where x is a variable maximum amount of movement of said optical element having variable optical properties, and f is a focal length of said optical system from which the optical element having variable properties is removed.

15. The optical system according to claim 14, which comprises an optical element located adjacent to an optical element having variable optical properties, wherein said optical element having variable optical properties moves in such a given direction that the position thereof relative to said optical element changes.

16. A zoom optical system, comprising:
an optical element having variable optical properties,
moving two optical element groups, and
an optical element group interposed between said moving optical element groups, wherein:
said optical element having variable optical properties has a focusing function or a compensator function,
said moving two optical element groups have refracting power of the same sign and move in the same amount of movement, and
a sign of the refracting power of said optical element group is opposite to the sign of the refracting power of said moving optical element groups.

17. The zoom optical system according to claim 16, wherein said moving two optical element groups have positive refracting power.

18. The zoom optical system according to claim 17, wherein:
said moving optical element groups are a second optical element group, and a fourth optical element group, and
an optical element group interposed between said moving optical element groups is a third optical element group and satisfies the following conditions (340), (342) and (344):

$$0.3 < |f2/f| < 10 \tag{340}$$

$$0.15 < |f3/f| < 6 \tag{342}$$

$$0.15 < |f4/f| < 7 \tag{344}$$

where f2 is a focal length of said second optical element group, f3 is a focal length of said third optical element group, f4 is a focal length of said fourth optical element group, and f is a focal length of said optical system from which said optical element having variable optical properties is removed.

19. The zoom optical system according to claim 18, which further comprises a first optical element group, and satisfies the following condition (347):

$$f1/f < 0 \text{ or } f1/f > 5 \tag{347}$$

where f1 is a focal length of said first optical element group, and f is a focal length of said optical system from which said optical element having variable optical properties is removed.

20. The zoom optical system according to claim 16, wherein said moving two optical element groups have negative refracting power.

21. The zoom optical system according to claim 16, which comprises an optical element group having negative refracting power, located in front of said optical element having variable optical properties.

22. The zoom optical system according to claim 16, wherein:
said optical element having variable optical properties possesses a focusing function, and
said optical element having variable optical properties is located in front of said moving two optical element groups.

23. The zoom optical system according to claim 16, which comprises a rotationally symmetric lens.

24. A zoom optical system, comprising:
an optical element having variable optical properties, and
a moving optical element group, wherein:
said moving optical element group has a zooming function, and
said optical element having variable optical properties is a reflection type optical element and possesses a focusing function, which comprises a rotationally symmetric lens.

25. An optical apparatus, comprising:
a climbing type autofocusing function,
an optical system, and
an optical element having variable optical properties, which element changes from a first state to a fourth state, wherein:
said optical element having variable optical properties changes from a second state to a third state for focusing, and
to change from the first state to the second state and from the third state to the fourth state, said optical element having variable optical properties has an amount of change in its focal length required to change focus of said optical system by at least one-third of Sd determined by the following condition (370):

$$Sd = k \times P \times Fno \tag{370}$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, which comprises a rotationally symmetric lens.

26. A zoom optical system, comprising:
one optical element group,
an optical element having variable optical properties,
a moving optical element group, and
an image formation plane, wherein only the moving optical element group moves with respect to the image formation plane,
wherein said optical element having variable optical properties is a reflection type optical element.

27. A zoom optical system, comprising:
two optical element groups;
an optical element having variable optical properties; and
a moving optical element group,
wherein said optical element having variable optical properties is a reflection type optical element,
wherein one of said two optical element groups is a fourth optical element group interposed between said moving optical element group and an image plane of said zoom optical system and satisfies the following condition (322):

$$0.1 < |\beta 4| < 1.3 \tag{322}$$

where β4 is a magnification of said fourth optical element group.

28. A zoom optical system, comprising:
one optical element group;
an optical element having variable optical properties; and
a moving optical element group,
wherein said optical element having variable optical properties is a reflection type optical element,
wherein said one optical element group is a second optical element group interposed between said optical element having variable optical properties and said moving optical element group, and satisfies the following condition (324):

$$-0.2 < -Hv/fv \tag{324}$$

where fv is a focal length of said moving optical element group, and Hv is a front focal position of an optical system comprising said moving optical element group combined with said second optical element group.

29. A zoom optical system, comprising:
one optical element group;
an optical element having variable optical properties; and
a moving optical element group,
wherein said optical element having variable optical properties is a reflection type optical element,
wherein said one optical element group is a second optical element group interposed between said optical element having variable optical properties and said moving optical element group, and satisfies the following condition (327):

$$0 \leq |(Dkv + Hv)/fv| < 3 \tag{327}$$

where Dkv is a length as calculated on an air basis from said optical element having variable optical properties to said moving optical element group, and Hv is a front focal position of an optical system comprising said moving optical element group combined with said second optical element group.

30. A zoom optical system, comprising:
one optical element group;
an optical element having variable optical properties; and
a moving optical element group,
wherein said optical element having variable optical properties is a reflection type optical element,
wherein said one optical element group is a first optical element group, and satisfies the following condition (330):

$$0 < (Dok - Fbo)/fv < 5 \tag{330}$$

where Dok is a distance from a final surface in said first optical element group to said optical element having variable optical properties, and Fbo is a rear focal position of said first optical element group as measured from the final surface in said first optical element group.

31. A zoom optical system, comprising:
an optical element having variable optical properties, and
a moving optical element group, wherein:
said moving optical element group has a zooming function, and said optical element having variable optical properties is a reflection type optical element and possesses a focusing function, which comprises an aperture stop located in the rear of said optical element having variable optical properties.

32. An optical apparatus, comprising:
a climbing type autofocusing function,
an optical system, and
an optical element having variable optical properties, which element changes from a first state to a fourth state, wherein:
said optical element having variable optical properties changes from a second state to a third state for focusing, and
to change from the first state to the second state and from the third state to the fourth state, said optical element having variable optical properties has an amount of change in its focal length required to change focus of said optical system by at least one-third of Sd determined by the following condition (370):

$$Sd = k \times P \times Fno \quad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, which comprises an aperture stop located in the rear of said optical element having variable optical properties.

33. An optical apparatus, comprising:
an optical element having variable optical properties is located in the phototaking optical path and driven by static electricity, wherein:
upon phototaking, a reflecting surface of said optical element having variable optical properties assumes a concave surface within a distance range of an object to be phototaken.

34. An optical apparatus, comprising:
an optical element having variable optical properties and driven by static electricity, wherein:
upon phototaking, a reflecting surface of said optical element having variable optical properties assumes a concave surface within a distance range of an object to be phototaken; and
a climbing type autofocusing function, wherein:
said autofocusing function comprises processes of changing focus with respect to an object, detecting a high frequency component of a phototaken object image, and judging the high frequency component reaching a maximum as attaining focus.

35. An optical apparatus, comprising:
an optical element having variable optical properties and driven by static electricity, wherein:
upon phototaking, a reflecting surface of said optical element having variable optical properties assumes a concave surface within a distance range of an object to be phototaken; and
a climbing type autofocusing function, wherein:
said autofocusing function comprises processes of changing focus with respect to an object, detecting a high frequency component of a phototaken object image, and judging the high frequency component reaching a maximum as attaining focus which, upon changing focus with respect to an object, includes a state where a surface shape of said optical element having variable optical properties takes on a plane.

36. An optical apparatus, comprising:
a climbing type autofocusing function,
an optical system, and
an optical element having variable optical properties, which element changes from a first state to a fourth state, wherein:
said optical element having variable optical properties changes from a second state to a third state for focusing, and
to change from the first state to the second state and from the third state to the fourth state, said optical element having variable optical properties has an amount of change in its focal length required to change focus of said optical system by at least one-third of Sd determined by the following condition (370):

$$Sd = k \times P \times Fno \quad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, wherein:
said optical element having variable optical properties is an element that is driven by static electricity, and
upon phototaking, a reflecting surface of said optical element having variable optical properties assumes a concave surface within a distance range of an object to be phototaken.

37. An optical apparatus, comprising:
an optical element having variable optical properties, the optical elements being constructed and arranged to deflect light such that the light deflection of the optical element is variable, and
an active type autofocusing function.

38. An optical apparatus, comprising:
an optical element having variable optical properties and driven by static electricity, wherein:
upon phototaking, a reflecting surface of said optical element having variable optical properties assumes a concave surface within a distance range of an object to be phototaken,
an image pickup device, and
an optical element located nearest to an object, wherein said optical element and said image pickup device are fixed in place.

39. A zoom optical system, comprising:
an optical element having variable optical properties, and
a moving optical element group, wherein:
said moving optical element group has a zooming function, and
said optical element having variable optical properties is a reflection type optical element and possesses a focusing function, which comprises:
an image pickup device, and
an optical element located nearest to an object, wherein said optical element and said image pickup device are fixed in place.

40. An optical apparatus, comprising:
a mirror, and
a moving optical element group, wherein:
said moving optical element group has a zooming function, and a climbing type autofocusing function, and
said moving optical element group having variable optical properties located in the phototaking optical path.

41. An optical apparatus, comprising:
a climbing type autofocusing function,
an optical system, and
an optical element having variable optical properties, which element changes from a first state to a fourth state, wherein:
said optical element having variable optical properties changes from a second state to a third state for focusing, and
to change from the first state to the second state and from the third state to the fourth state, said optical element having variable optical properties has an amount of change in its focal length required to change focus of said optical system by at least one-third of Sd determined by the following condition (370):

$$Sd = k \times P \times Fno \qquad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, wherein a moving optical element is provided by said moving optical element group alone.

42. An optical apparatus, comprising:
a climbing type autofocusing arrangement;
an optical system; and
an optical element having variable optical properties, which element changes from a first state to a fourth state, wherein:
said optical element has variable optical properties and changing from a second state to a third state for focusing, and
to change from the first state to the second state or from the third state to the fourth state, said optical element having variable optical properties has an amount of change in its focal length required to change focus of said optical system by at least one-third of Sd determined by the following condition (370):

$$Sd = k \times P \times Fno \qquad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction.

43. An optical apparatus, comprising:
a mirror, and
a moving optical element group, wherein:
said moving optical element group has a zooming function, and a climbing type autofocusing function,
an image pickup device, and
an optical element located nearest to an object, wherein said optical element and said image pickup device are fixed in place.

44. An optical apparatus, comprising:
a climbing type autofocusing function,
an optical system, and
an optical element having variable optical properties, which element changes from a first state to a fourth state, wherein:
said optical element having variable optical properties changes from a second state to a third state for focusing, and
to change from the first state to the second state and from the third state to the fourth state, said optical element having variable optical properties has an amount of change in its focal length required to change focus of said optical system by at least one-third of Sd determined by the following condition (370):

$$Sd \times k \times P \times Fno \qquad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, which comprises a moving optical element.

45. An optical system, comprising:
a climbing type autofocusing arrangement;
an optical system; and
an optical element having variable optical properties, which element changes from a first state to a fourth state, wherein:
said optical element has variable optical properties and changing from a second state to a third state for focusing, and
to change from the first state to the second state or from the third state to the fourth state, said optical element having variable optical properties has an amount of change in its focal length required to change focus of said optical system by at least one-third of Sd determined by the following condition (370):

$$Sd = k \times P \times Fno \qquad (370)$$

where Sd is a focal depth of said optical system, Fno is an F-number of the optical system, k is a constant between 2 and 3, and $P=\sqrt{(Px \cdot Py)}$ wherein Px is a size in μm of one pixel of an image pickup device in an x-direction and Py is a size in μm of one pixel of the image pickup device in a y-direction, wherein the change from said second state to said third state comprises a compensator function.

46. An optical system, comprising:
a reflection type optical element having variable optical properties, wherein:
said reflection type optical element having variable optical properties has a zooming, focusing or compensator function, and
said reflection type optical element having variable optical properties comprises a central portion and a peripheral portion, wherein said central area transforms while said peripheral portion remains fixed upon zooming or focusing.

47. An optical system, comprising:
a reflection type optical element having variable properties, and
an optical element located adjacent to said reflection type optical element having variable optical properties, wherein:
said reflection type optical element having variable optical properties has a zooming, focusing or compensator function, and said reflection type optical element having variable optical properties moves in such a given direction that the position thereof relative to said optical element changes upon zooming or focusing.

48. A zoom optical system, comprising:
an optical element group,
a reflection type optical element having variable optical properties, the reflection type optical element having a surface shape that is variable, and a moving optical element group, wherein:

said reflection type optical element having variable optical properties is fixed in position relative to an image-formation plane of said zoom optical system.

49. An optical system, comprising:

an optical element having variable optical properties, wherein said optical element having variable optical properties has a zooming, focusing or compensator function, wherein said optical element having variable optical properties is such that a central area transforms upon zooming or focusing, wherein said optical element having variable optical properties is fixedly located relative to an image-formation position of said optical system, and wherein said optical element having a deformable optical surface located on only one side of said optical element.

50. An optical apparatus comprising:

a mirror, and a moving optical element group, wherein:

said moving optical element group has a zooming function, and a climbing type autofocusing function, wherein a lens located nearest to the object side is a double-concave lens.

51. A zoom optical system, comprising:

an optical axis;

one optical element group;

an optical element having variable optical properties;

a moving optical element group; and an image formation plane, wherein the image formation plane tilts with respect to the optical axis, wherein said optical element having variable optical properties is a reflection type optical element.

* * * * *